(12) United States Patent
Sasaki et al.

(10) Patent No.: US 7,764,828 B2
(45) Date of Patent: Jul. 27, 2010

(54) METHOD, APPARATUS, AND COMPUTER PROGRAM FOR PROCESSING IMAGE

(75) Inventors: Daichi Sasaki, Tokyo (JP); Osamu Watanabe, Tokyo (JP); Teruyuki Nakahashi, Tokyo (JP); Ryo Kawamura, Tokyo (JP)

(73) Assignee: Sony Corporation (JP)

( * ) Notice: Subject to any disclaimer, the term of this patent is extended or adjusted under 35 U.S.C. 154(b) by 1028 days.

(21) Appl. No.: 11/296,846

(22) Filed: Dec. 7, 2005

(65) Prior Publication Data
US 2006/0188144 A1  Aug. 24, 2006

(30) Foreign Application Priority Data
Dec. 8, 2004  (JP)  ............................ P2004-354946

(51) Int. Cl.
*G06K 9/00* (2006.01)
*G06T 13/00* (2006.01)

(52) U.S. Cl. ...................... 382/154; 382/118; 345/473
(58) Field of Classification Search ................ 382/154
See application file for complete search history.

(56) References Cited

U.S. PATENT DOCUMENTS

| | | | | |
|---|---|---|---|---|
| 4,872,056 A | * | 10/1989 | Hicks et al. | 348/584 |
| 5,572,635 A | * | 11/1996 | Takizawa et al. | 345/426 |
| 5,687,307 A | * | 11/1997 | Akisada et al. | 345/428 |
| 5,867,588 A | * | 2/1999 | Marquardt | 382/118 |
| 5,936,628 A | * | 8/1999 | Kitamura et al. | 345/420 |
| 6,072,496 A | * | 6/2000 | Guenter et al. | 345/419 |
| 6,181,806 B1 | * | 1/2001 | Kado et al. | 382/118 |
| 6,215,898 B1 | * | 4/2001 | Woodfill et al. | 382/154 |
| 6,297,825 B1 | * | 10/2001 | Madden et al. | 345/419 |
| 6,434,277 B1 | * | 8/2002 | Yamada et al. | 382/285 |
| 6,453,052 B1 | * | 9/2002 | Kurokawa et al. | 382/100 |
| 6,483,520 B1 | * | 11/2002 | Uchi et al. | 345/619 |
| 6,529,206 B1 | * | 3/2003 | Ohki et al. | 345/619 |
| 6,574,356 B1 | * | 6/2003 | Lee et al. | 382/131 |
| 6,633,289 B1 | | 10/2003 | Lotens et al. | |
| 6,674,484 B1 | * | 1/2004 | Boland et al. | 348/580 |

(Continued)

FOREIGN PATENT DOCUMENTS

DE    197 57 773 A1    7/1999

(Continued)

OTHER PUBLICATIONS

W. Lee, Won-Sook; Magnenat-Thalmann, Nadia: "Fast Head Modeling for Animation", Journal Image and Vision Computing, vol. 18, No. 4, Mar. 2000, pp. 355-364, XP002377004.

(Continued)

*Primary Examiner*—Vikkram Bali
*Assistant Examiner*—Michelle Entezari
(74) *Attorney, Agent, or Firm*—Lerner, David, Littenberg, Krumholz & Mentlik, LLP

(57) ABSTRACT

An image processing apparatus for generating a three-dimensional model of a three-dimensional object from an image displaying the object in two dimensions includes a three-dimensional model generator operable to generate the three-dimensional model of the object from the image, and an extender operable to extend a lateral region of the three-dimensional model in a depth direction orthogonal to the two dimensions.

21 Claims, 45 Drawing Sheets

U.S. PATENT DOCUMENTS

| | | | |
|---|---|---|---|
| 6,731,287 B1 * | 5/2004 | Erdem | 345/473 |
| 6,865,291 B1 * | 3/2005 | Zador | 382/166 |
| 7,019,749 B2 * | 3/2006 | Guo et al. | 345/473 |
| RE39,342 E * | 10/2006 | Starks et al. | 345/419 |
| 7,123,254 B2 * | 10/2006 | Toyama et al. | 345/419 |
| 7,127,109 B1 * | 10/2006 | Kim | 382/210 |
| 7,218,774 B2 * | 5/2007 | Liu | 382/154 |
| 7,508,961 B2 * | 3/2009 | Chen et al. | 382/118 |
| 2002/0013684 A1 * | 1/2002 | Toyama et al. | 703/2 |
| 2002/0082082 A1 * | 6/2002 | Stamper et al. | 463/32 |
| 2002/0150287 A1 * | 10/2002 | Kobayashi | 382/154 |
| 2003/0031381 A1 | 2/2003 | Ho et al. | |
| 2003/0103064 A1 * | 6/2003 | Knighton et al. | 345/660 |
| 2003/0117392 A1 | 6/2003 | Harvill | |
| 2003/0198404 A1 * | 10/2003 | Frisken et al. | 382/285 |
| 2003/0206171 A1 * | 11/2003 | Kim et al. | 345/473 |
| 2004/0170337 A1 * | 9/2004 | Simon et al. | 382/254 |
| 2004/0217957 A1 * | 11/2004 | Anderson | 345/426 |
| 2004/0233222 A1 * | 11/2004 | Lee et al. | 345/621 |
| 2005/0063472 A1 * | 3/2005 | Vella et al. | 375/240.22 |

FOREIGN PATENT DOCUMENTS

| | | | |
|---|---|---|---|
| EP | 1 246 132 | A | 10/2002 |
| EP | 1 260 940 | A2 | 11/2002 |
| JP | 4-199474 | A | 7/1992 |
| JP | 8-077334 | A | 3/1996 |
| JP | 8-147494 | A | 6/1996 |
| JP | 8-329278 | A | 12/1996 |
| JP | 9-006964 | A | 1/1997 |
| JP | 9-305798 | A | 11/1997 |
| JP | 10-255017 | A | 9/1998 |
| JP | 11-191162 | A | 7/1999 |
| JP | 11-219422 | A | 8/1999 |
| JP | 2000-339498 | A | 12/2000 |
| JP | 2001-084390 | A | 3/2001 |
| JP | 2001-109907 | A | 4/2001 |
| JP | 2001-209799 | A | 8/2001 |
| JP | 2001-222725 | A | 8/2001 |
| JP | 2001-319245 | A | 11/2001 |
| JP | 2001522108 | T | 11/2001 |
| JP | 2001-357415 | A | 12/2001 |
| JP | 2002-032783 | | 1/2002 |
| JP | 2002-083286 | A | 3/2002 |
| JP | 2005-23488 | T | 8/2005 |
| WO | 94-23390 | A1 | 10/1994 |
| WO | WO-03/081536 | A1 | 10/2003 |

OTHER PUBLICATIONS

Blanz V. et al.: "A Morphable Model for the Synthesis of 3D Faces", Computer Graphics, Siggraph 99 Conference Proceedings, Los Angeles, CA, Aug. 8-13, 1999, Computer Graphics proceedings, SIGGRAPH, New York, NY: ACM, US, Aug. 8, 1999, pp. 187-194, XP001032901. ISBN: 0-201-48560-5.

Feng G. C. et al.: "Virtual View Face Image Synthesis Using 3D Spring-Based Face Model From a Single Image", Automatic Face and Gesture Recognition, 2000 Proceedings, Fourth IEEE International Conference on Grenoble, France Mar. 28-30, 2000, Los Alamitos, CA, USA, IEEE Comput. Soc, US, Mar. 28, 2000, pp. 530-535, XP010378310.

Wenyi Zhao et al.: "3D Model Enhanced Face Recognition," Image Processing, 2000 Proceedings, 2000 International Conference on Sep. 10-13, 2000, Piscataway, NJ, USA, IEEE, vol. 3, Sep. 10, 2000, pp. 50-53, XP010529400.

Yuencheng Lee et al., Association for Computing Machinery: "Realistic Modeling for Facial Animation", Computer Graphics Proceedings, Los Angeles, Aug. 6-11, 1995, Computer Graphics Proceedings (SIGGRAPH), New York, IEEE, US, Aug. 6, 1995, pp. 55-62, XP000546216.

Lam K-M et al. "Locating and Extracting the Eye in Human Face Images," Pattern Recognition, Elsevier, Kidlington, GB, vol. 29, No. 5, 1996, pp. 771-779, XP000601372.

Cootes T. F. et al. "Active Appearance Models," European Conference on Computer Vision, Berlin, DE, vol. 2, No. 1, 1998, pp. 484-498, XP000884426.

Pighin F. et al. "Synthesizing Realistic Facial Expressions From Photographs", Computer Graphics, SIGGRAPH 98 Conference Proceedings, Orlando, FL., Jul. 19-24, 1998, Computer Graphics Proceedings, SIGGRAPH, New York, NY: ACM, US, Jul. 19, 1998, pp. 75-84, XP002188569.

The Institution of Electrical Engineers, Stevenage, GB; Oct. 1991, Dipaola S.: "Extending the Range of Facial Types." XP002377013.

Yang Guang et al., "A Method of Human Short Hair Modeling and Real Time Animation," Computer Graphics and Applications, 2002, Proceedings of the 10th Pacific Conference on Computer Graphics and Applications, Beijing, China, Oct. 9-11, 2002, Los Alamitos, CA, USA, IEEE Comput. Soc., U.S., Oct. 9, 2002, pp. 435-438, XP010624931, ISBN: 0-7695-1784-6, Section 2, Modeling.

Vetter, T., "Synthesis of Novel Views From a Single Face Image," International Journal of Computer Vision, Kluwer Academic Publishers, Norwell, US, vol. 28, No. 2, Jun. 1998, pp. 103-116, XP000774202, ISSN: 0920-5691.

* cited by examiner

EYE AND MOUTH TEMPLATE (RIGHT) EYE TEMPLATE

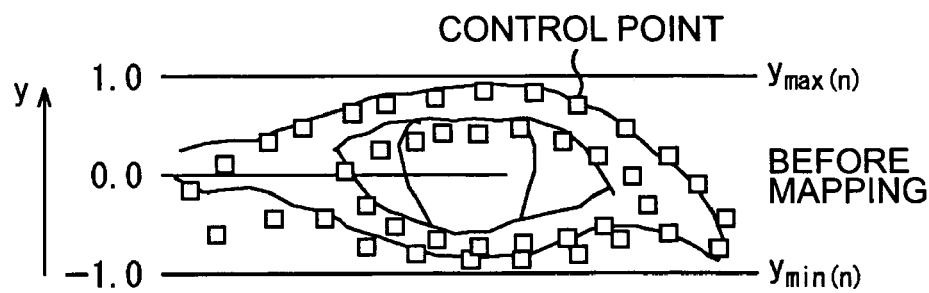
FIG. 16A  BEFORE MAPPING
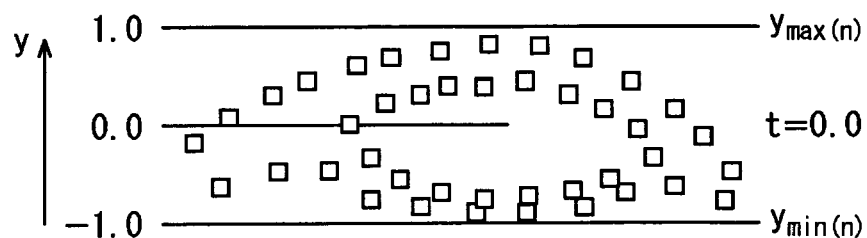
FIG. 16B  t=0.0
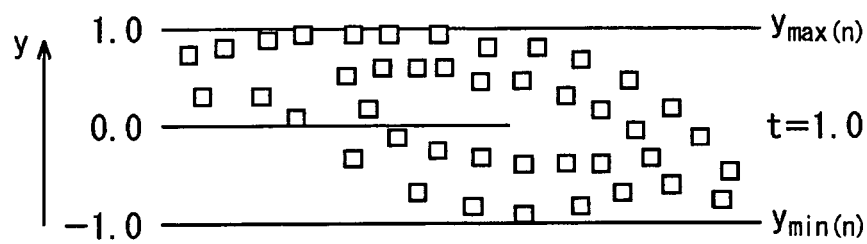
FIG. 16C  t=1.0
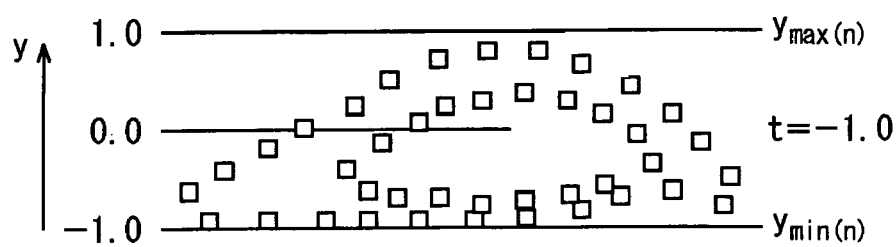
FIG. 16D  t=-1.0
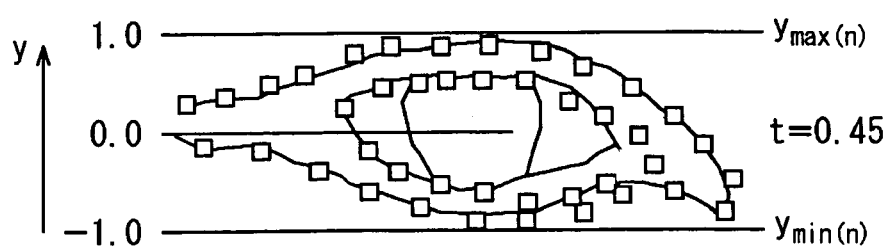
FIG. 16E  t=0.45

FEATURE POINT

FEATURE POINT

FEATURE POINT

METHOD, APPARATUS, AND COMPUTER PROGRAM FOR PROCESSING IMAGE

CROSS-REFERENCE TO RELATED APPLICATIONS

The present application claims priority from Japanese Patent Application No. JP 2004-354946 filed on Dec. 8, 2004, the disclosure of which is hereby incorporated by reference herein.

BACKGROUND OF THE INVENTION

The present invention relates to an image processing apparatus, an image processing method, and a computer program and, in particular, to an image processing apparatus, an image processing method, and a computer program for easily creating a realistic animation.

To generate a realistic human face in computer graphics, a faithful three-dimensional model of a face, namely, a three-dimensional configuration and texture are necessary. Methods are available for generating a faithful three-dimensional model of a face. In one method performed by Cyberware, an actual human face is 3D scanned. In another method, a model of a face is produced based on an actual face mode, and data of the face model is input using 3D pointer (as disclosed in Cyberware on-line documents searched Dec. 6, 2004 (URL: http//www.cyberware.com/)).

These methods, resulting in a realistic and highly precise three-dimensional (3D) model, are frequently used in movie manufacturing that requires computer graphics (CG) and game playing software manufacturing that typically requires reality. 3D scanners are typically costly, and scanning a whole face takes a long period of time. 3D pointers are also costly. Data inputting using a 3D pointer needs to be manually performed, and thus requires costs and time.

Since high-speed and low-cost central processing units and memories are currently available, processing digital image data typically large in quantity is relatively easily performed. In one of data processings, a 3D model is generated from a plurality of two-dimensional images captured at different angles. For example, another method of generating a realistic 3D model from 5 face images photographed at different angles is disclosed in "Synthesizing Realistic Facial Expressions from Photographs," Proceedings of SIGGRAPH 98, in Computer Graphics Proceedings, Annual Conference Series, 1998, authored by Frederic Pighin, Jamie Hecker, Dani Lischinski, Richard Szeliski, and David Salesin. This method generates a 3D model more easily than the method of Cyberware.

However, since a 3D face model is modified based on feature points of a face captured from a plurality of face images, a slight discrepancy takes place in the 3D model in an actual face displayed in original face images. More specifically, since the accuracy of the feature points captured from the plurality of face images is not high, it is difficult to specify a feature point, from among feature points captured at one angle, accurately corresponding to a feature point of a face image captured at another angle. Furthermore, as a result of lighting, even a 3D model of a face viewed in front gives the impression that the face model is different from the actual face.

Another technique is disclosed in "A morphable model for the synthesis of 3D faces," authored Blanz, V, and Vetter, T., Proceedings of ACM SIGGRAPH 99, in Computer Graphic Proceedings, Annual Conference Series, 1999. According to this technique, an accurate 3D model is reorganized by recursively modifying a 3D model face obtained using the method of Cyberware so that an error between a face portion of a single face image and rendering results of samples of the Cyberware 3D model is minimized.

This technique uses an algorithm in which a large number of samples of 3D model is used to recursively modify the 3D model. As a result, a long time is required before finally obtaining a 3D model.

Japanese Unexamined Patent Application Publication No. 2002-32783 discloses a technique of generating a 3D face model. In accordance with the disclosed technique, an appropriate three-dimensional configuration is added (fitted to) a single face image photographed fullface. A 3D face model having a high similarity to the face of a person actually photographed in a face image is relatively easily generated.

Since the single face image photographed fullface includes no lateral portions of the face (a lateral portion extending from the cheek to the ear, the head top portion, and the underside of the chin), a 3D model generated from the face image is thus limited to the face photographed fullface (the face area photographed in the face image). If such a 3D model is rotated to generate a CG viewed at an oblique angle (in a two-dimensional image), a lateral portion of the face not present in the 3D model appears in front, and an obliquely viewed CG is thus destroyed (appears unnatural).

It is contemplated that a lateral portion of the face is added to the 3D model generated from a single face image photographed fullface by combining a 3D model of the lateral portion of the face generated in a different method with the 3D model generated from the single face image photographed fullface.

The simplicity of the entire process is lost if the process of generating the 3D model of the lateral portion of the face is combined with the generation of the 3D model from the single face image photographed fullface. A mismatch can occur in a coupling portion between the 3D model generated from the single face image photographed fullface and the 3D model including the lateral portion of the face if the two models are synthesized.

Since the hair is fine, an accurate capturing is difficult even if the hair is scanned using a 3D scanner. In known techniques of generating a 3D face model, the hair is frequently unconsidered in the 3D face model.

The hair is accounted for in the 3D face model by synthesizing the texture of the hair of the face image with a 3D model after the 3D face model is generated. In accordance with this method, the hair style and the texture of the hair are difficult to reproduce. Since the 3D model of the face is generated in a manner such that the outline of the hair matches the outline of the face, no 3D model shape is present outside the outline of the face in the 3D model. However, the hair is also present in an area outside the outline of the face. If the hair of the face image is merely synthesized with the 3D model of the face, the hair in the area outside the outline of the face is unconsidered. As a result, the hair style and the texture of the hair in the face image cannot be obtained.

For example, there is a high need for realistic animations of a face in CG, such as a twinkle of an eye, opening or closing the lips, and tilting the head.

To create realistic animations of the face, a large number of accurate localized feature points of moving regions of a twinkling eye, opening and closing lips, and tilted head, for example, is required. To create a realistic twinkling of the eyes, a large number of accurate feature points along the outline of the eyeball exposed through the eye lids, and a large number of accurate feature points along the border between the eye socket and the eyelids need to be detected.

The feature point is conventionally used in face recognition and the generation of the 3D model of the face, and requirements for accuracy and the number of feature points are not so high.

A technique of detecting the feature point, called Active Appearance Models (AAM), is disclosed in a research paper entitled "Active Appearance Models," authored by T. F. Cootes, G. J. Edwards, and C. J. Taylor, Proc. Fifth European Conf. Computer Vision, H. Burkhardt and B. Neumann, eds, vol. 2. pp. 484-498, 1998. In accordance with this technique, a face image is warped, and the number of dimensions is reduced through principal component analysis, and the amount of information of the face image is reduced to some degree. The feature point is thus detected. In accordance with the AAM technique, information is extracted by applying the principal component analysis to each of the feature point and the texture of the face displayed in the image. A single face is expressed by a principal component parameter. By varying the principal component parameter, information concerning the feature point and the texture is roughly restored to even a new face.

The AAM reduces the amount of information of the face image to some degree to change an original face image into an indistinct image. Since the feature point is detected from the indistinct image, a general feature point rather than a localized feature is thus obtained. The method of detecting the feature point based on the AAM can be used in the generation of the 3D model, but is not suitable for realistic animations requiring a highly accurate feature point.

In accordance with the technique disclosed in the paper "Synthesizing Realistic Facial Expressions from Photographs," the feature point obtained from a plurality of face images is used in the generation of the 3D model. A slight discrepancy taking place between the 3D model and the actual face displayed in the original face image in this technique is reduced by specifying a large number of feature points at a high accuracy level to each of a plurality of face images.

However, it is difficult to specify a large number of feature points at a highly accurate level to each of the plurality of face images photographed at different angles. Even if such feature points are specified, a resulting CG is not accompanied by a visible precision of the 3D model. The 3D model does not necessarily match the image of the person viewed fullface in the face image. A known unnaturally looking CG thus results.

SUMMARY OF THE INVENTION

No elementary technologies have been provided to easily create realistic animations.

It is thus desirable to easily create realistic animations.

In accordance with one embodiment of the present invention, an image processing apparatus for generating a three-dimensional model of a three-dimensional object from an image displaying the object in two dimensions, includes a three-dimensional model generating unit operable to generate the three-dimensional model of the object from the image; and an extending unit operable to extend a lateral region of the three-dimensional model in a depth direction orthogonal to the two dimensions.

In accordance with another embodiment of the present invention, an image processing method includes generating the three-dimensional model of the object from the image; and extending a lateral region of the three-dimensional model in a depth direction orthogonal to the two dimensions.

In accordance with yet another embodiment of the present invention, a recording medium is recorded with a computer program for causing a computer to execute a method of generating a three-dimensional model, the method including generating the three-dimensional model of the object from the image; and extending a lateral region of the three-dimensional model in a depth direction orthogonal to the two dimensions.

In accordance with yet another embodiment, an image processing apparatus includes a three-dimensional model generating unit operable to generate a model of a face as a three-dimensional model from an image displaying the face in two dimensions; a mapping unit operable to map a previously prepared hair model to the image; a non-hair portion detecting unit operable to detect a portion of the image having no hair; a Z value modifying unit operable to modify a Z value representing the position in a depth direction orthogonal to the two dimensions of a region mapped to the non-hair portion of the hair model mapped to the image; and a synthesizing unit operable to synthesize the hair model having the modified Z value with the model of the face.

In accordance with yet another embodiment of the present invention, an image processing method includes generating a model of a face as a three-dimensional model from an image displaying the face in two dimensions; mapping a previously prepared hair model to the image; detecting a portion of the image having no hair; modifying a Z value representing the position in a depth direction orthogonal to the two dimensions of a region mapped to the non-hair portion of the hair model mapped to the image; and synthesizing the hair model having the modified Z value with the model of the face.

In accordance with yet another embodiment of the present invention, a recording medium is recorded with a computer program for causing a computer to execute a method of generating a model of a face as a three-dimensional model from an image displaying the face in two dimensions, the method including generating the model of the face as the three-dimensional model from the image; mapping a previously prepared hair model to the image; detecting a portion of the image having no hair; modifying a Z value representing the position in a depth direction orthogonal to the two dimensions of a region mapped to the non-hair portion of the hair model mapped to the image; and synthesizing the hair model having the modified Z value with the model of the face.

In accordance with yet another embodiment of the present invention, an image processing apparatus includes a first fitting unit which fits a position and a size of a template of a predetermined region of a face to a face displayed in an image; and a second fitting unit for fitting a shape of the template to the face displayed in the image and for determining a feature point of the predetermined region of the face from the template having the position and the size fitted to the face displayed in the image by changing the shape of the template within a range of shapes of the predetermined region, with a plurality of parameters defining the shape of the template being based on at least one parameter of a number smaller than the number of the plurality of parameters.

In accordance with yet another embodiment of the present invention, an image processing method includes fitting a position and a size of a template of a predetermined region of a face to a face displayed in an image; and fitting a shape of the template to the face displayed in the image and determining a feature point of the predetermined region of the face from the template having the position and the size fitted to the face displayed in the image by changing the shape of the template within a range of shapes of the predetermined region, with a plurality of parameters defining the shape of the template being modified based on at least one parameter of a number smaller than the number of the plurality of parameters.

In accordance with yet another embodiment of the present invention, a recording medium is recorded with a computer program for causing a computer to execute an image processing method, the image processing method including fitting a position and a size of a template of a predetermined region of a face to a face displayed in an image; and fitting a shape of the template to the face displayed in the image and determining a feature point of the predetermined region of the face from the template having the position and the size fitted to the face displayed in the image by changing the shape of the template within a range of shapes of the predetermined region, with a plurality of parameters defining the shape of the template being modified based on at least one parameter of a number smaller than the number of the plurality of parameters.

In accordance with embodiments of the present invention, a 3D model of the object displayed in the image is generated, and a lateral portion of the 3D model is extended in the Z direction as the direction of depth.

In accordance with embodiments of the present invention, the model of the face is generated from the image displaying the face. On the other hand, the hair model prepared beforehand is mapped to the image, and the non-hair portion is detected from the image. The Z value representing the position of the region of the hair model mapped to the image is modified. The hair model with the modified Z value is synthesized with the model of the face.

In accordance with embodiments of the present invention, the position and the size of the template in the predetermined region of the face are fitted to the face displayed in the image. By modifying the plurality of parameters defining the shape of the template based on at least one parameter of a number smaller than the number of the plurality of parameters, the shape of the template fitted to the face and having the position and the size thereof fitted to the face displayed in the image is changed within the range of the shape of the predetermined region, and is fitted to the face displayed in the image. The feature point of the predetermined region of the face is determined from the template having the position, the size, and the shape thereof fitted to the face displayed in the image.

In accordance with embodiments of the present invention, the 3D model is easily obtained. A high accuracy feature point is easily obtained from the image. Realistic animations are thus easily created.

BRIEF DESCRIPTION OF THE DRAWINGS

FIGS. 16A-16E illustrate a movement of a control point of the eye template;

DETAILED DESCRIPTION

Figure 1:
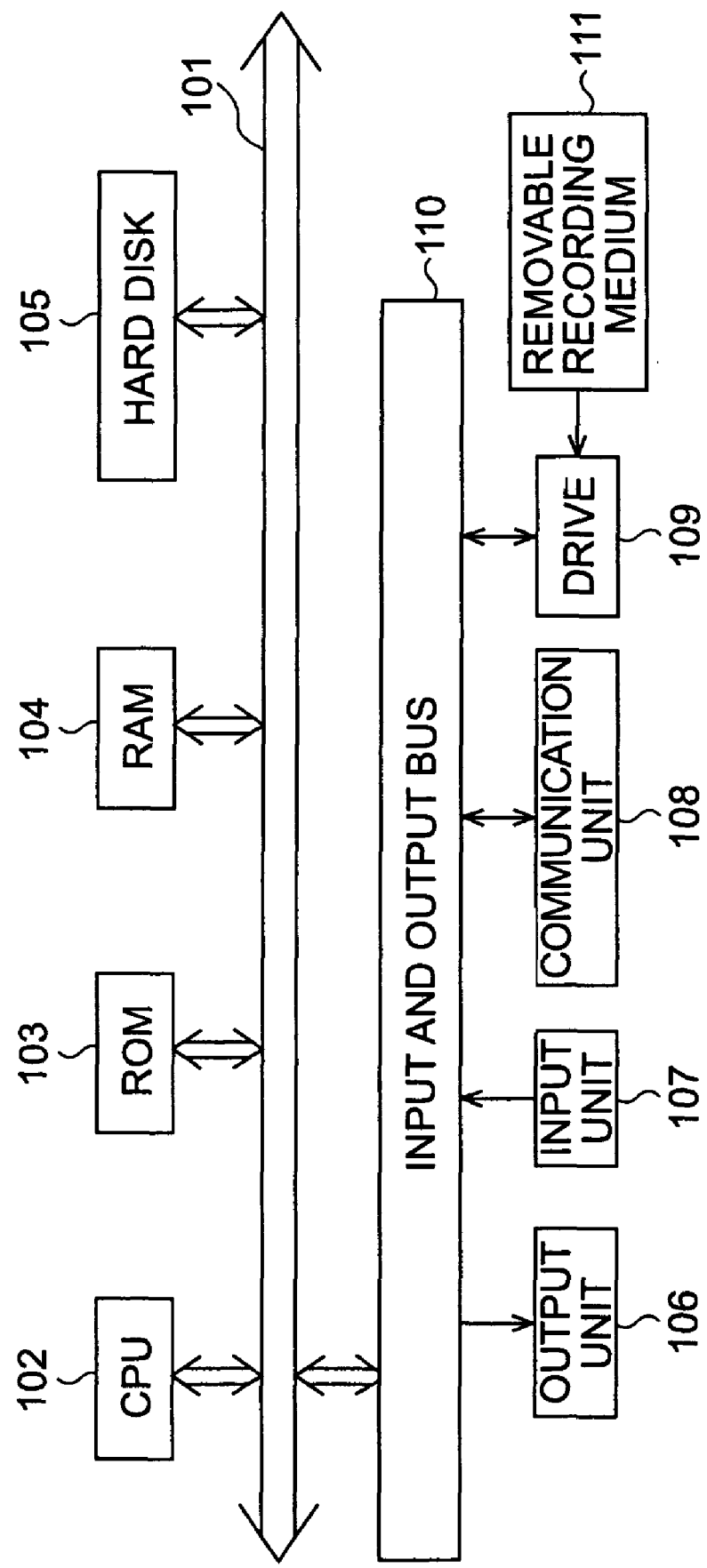
FIG. 1 is a block diagram illustrating the hardware structure of a computer.

Before describing an embodiment of the present invention, the correspondence between the features of the claims and the specific elements disclosed in an embodiment of the present invention is discussed below. This description is intended to assure that an embodiment supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An image processing apparatus (an image processing apparatus of FIG. 2, for example) of one embodiment of the present invention for generating a three-dimensional model of a three-dimensional object from a two-dimensional image displaying the object, includes a three-dimensional model generating unit (for example, a face model fitter 261 of FIG. 5) for generating, from the image, the three-dimensional model of the object displayed in the image, and an extending unit (for example, an extender 264 of FIG. 25) for extending, in a Z direction as the direction of depth, the lateral region of the three-dimensional model generated by the three-dimensional model generating unit.

The image processing apparatus further includes a mapping unit (for example, a mapping unit 271 of FIG. 25) for mapping, to the image, a hair model prepared beforehand, a non-hair portion detecting unit (for example, a non-hair portion detector 272 of FIG. 25) for detecting, from the image, a non-hair portion having no hair, a Z value modifying unit (for example, a Z value modifier 273 of FIG. 25) for modifying a Z value representing, in the Z direction, the position of a region mapped to the non-hair portion of the hair model mapped to the image, and a synthesizing unit (for example, a synthesizer 254 of FIG. 25) for synthesizing the hair model having the Z value modified by the Z value modifying unit with the face model.

The image processing apparatus further includes a filter (for example, a filter 274 of FIG. 25) for low-pass filtering the Z value of the hair model having the Z value modified by the Z value modifying unit.

The image processing apparatus includes a first fitting unit (for example, an eye feature point detector 202 of FIG. 11 performing step S202 of FIG. 13) for fitting a position and a size of a template of a predetermined region of a face to the face displayed in the image, and a second fitting unit (for example, the eye feature point detector 202 of FIG. 11 performing step S203 of FIG. 13) for fitting the shape of the template to the face displayed in the image by changing, within a range of shape of the predetermined region, the shape of the template having the position and the size fitted to the face displayed in the image, with a plurality of parameters, defining the shape of the template, being modified based on at least one parameter of the number smaller than the number of the plurality of parameters, and the three-dimensional model generating unit generates the face model of the face displayed in the image, based on a feature point of the face obtained from the template having the position, the size, and the shape thereof fitted to the face displayed in the image.

Figure 47:
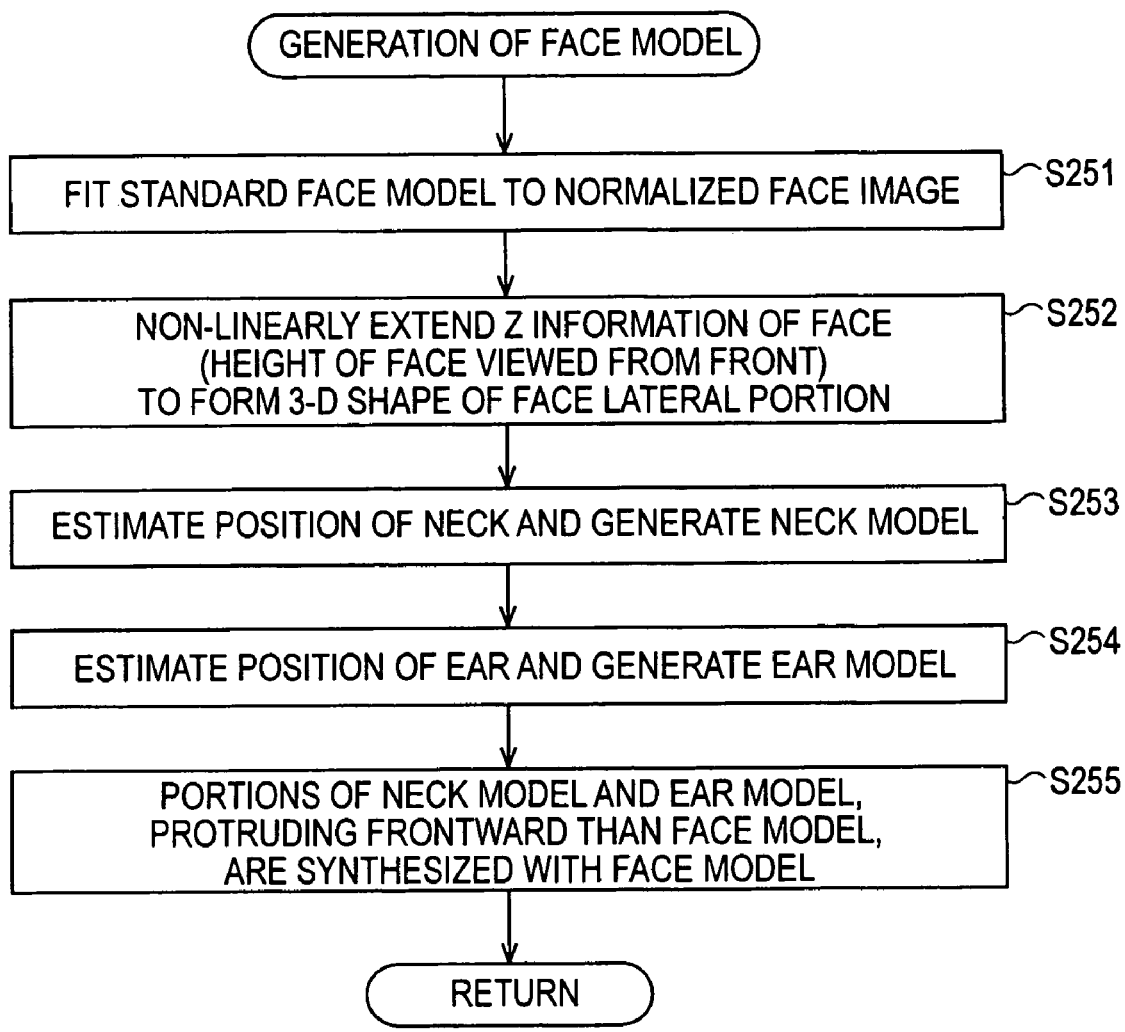
FIG. 47 is a flowchart of the process of a face model generator for generating a face model.

An image processing method of one embodiment of the present invention of generating a three-dimensional model of a three-dimensional object from a two-dimensional image displaying the object, includes steps of generating, from the image, the three-dimensional model of the object displayed in the image (for example, in step S251 of FIG. 47), and extending, in a Z direction as the direction of depth, the lateral region of the three-dimensional model generated in the three-dimensional model generating step (for example, in step S252 of FIG. 47).

A computer program of one embodiment of the present invention for causing a computer to generate a three-dimensional model of a three-dimensional object from a two-dimensional image displaying the object, includes program code for performing steps of generating, from the image, the three-dimensional model of the object displayed in the image (for example, in step S251 of FIG. 47), and extending, in a Z direction as the direction of depth, the lateral region of the three-dimensional model generated in the three-dimensional model generating step (for example, in step S252 of FIG. 47).

An image processing apparatus (for example, the image processing apparatus of FIG. 2) of one embodiment of the present invention for generating a model of a face as a three-dimensional model from a two-dimensional image displaying the face, includes a three-dimensional model generating unit (for example, the face model fitter 261 of FIG. 25) for generating, from the image, the face model as the three-dimensional model of the face displayed in the image, a mapping unit (for example, a mapping unit 271 of FIG. 25) for mapping, to the image, a hair model prepared beforehand, a non-hair portion detecting unit (for example, a non-hair portion detector 272 of FIG. 25) for detecting, from the image, a non-hair portion having no hair, a Z value modifying unit (for example, the Z value modifier 273 of FIG. 25) for modifying a Z value representing, in the Z direction as the direction of depth, the position of a region mapped to the non-hair portion of the hair model mapped to the image, and a synthesizing unit (for example, the synthesizer 254 of FIG. 25) for synthesizing the hair model having the Z value modified by the Z value modifying unit with the face model.

The image processing apparatus includes a filter (for example, the filter 274 of FIG. 25) for low-pass filtering the Z value of the hair model having the Z value modified by the Z value modifying unit.

Figure 48:
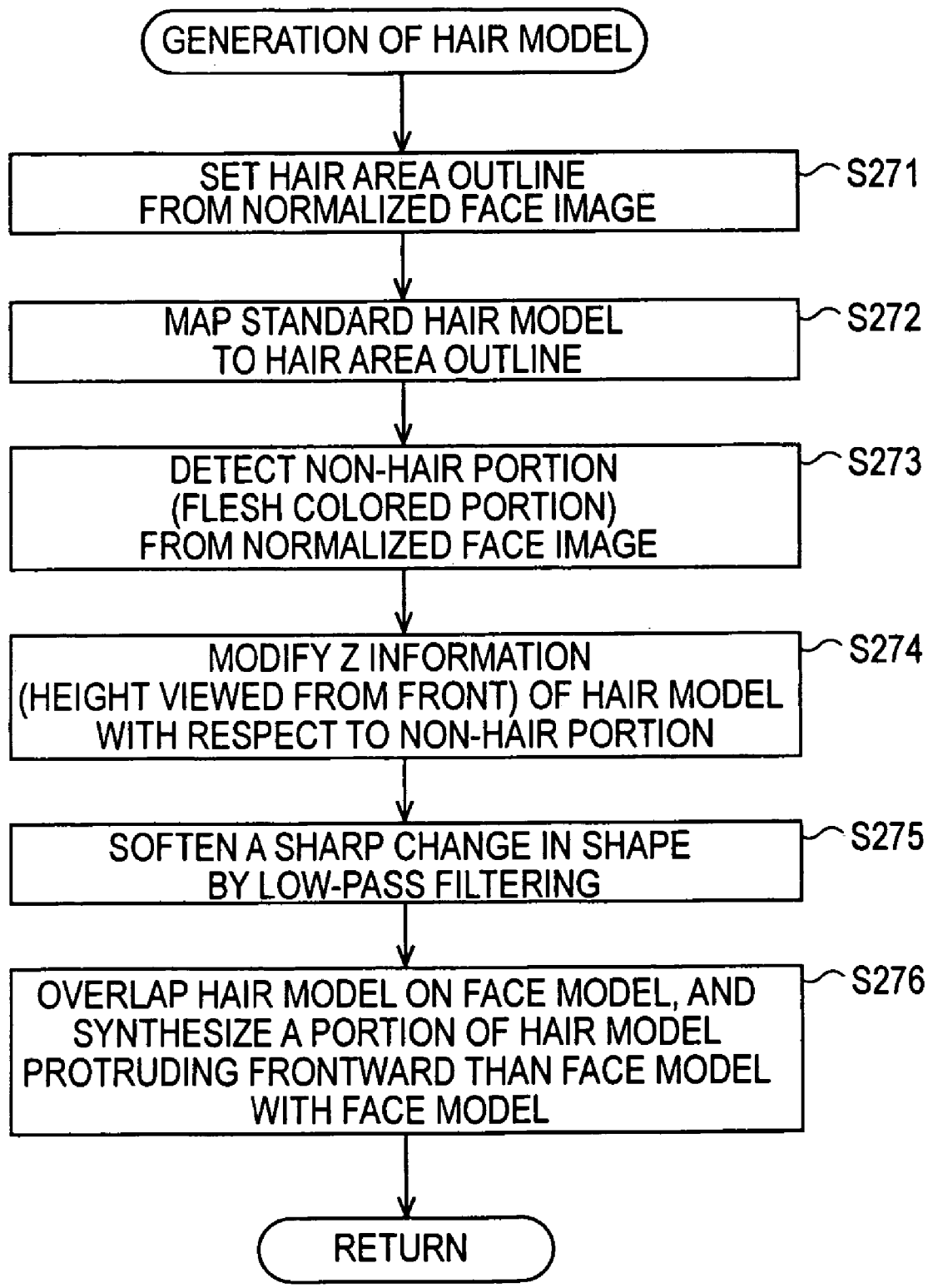
FIG. 48 is a flowchart of the process of a face model generator that generates a hair model and synthesizes the generated hair model with the face model.

An image processing method of the present invention of generating a model of a face as a three-dimensional model from a two-dimensional image displaying the face, includes steps of generating, from the image, the face model as the three-dimensional model of the face displayed in the image (for example, in step S251 of FIG. 47), mapping, to the image, a hair model prepared beforehand (for example, in step S272 of FIG. 48), detecting, from the image, a non-hair portion having no hair (for example, in step S273 of FIG. 48), modifying a Z value representing, in the Z direction as the direction of depth, the position of a region mapped to the non-hair portion of the hair model mapped to the image (for example, in step S274 of FIG. 48), and synthesizing the hair model having the Z value modified in the Z value modifying step with the face model (for example, in step S276 of FIG. 48).

A computer program of one embodiment of the present invention for causing a computer to generate a model of a face as a three-dimensional model from a two-dimensional image displaying the face, includes program code for performing steps of generating, from the image, the face model as the three-dimensional model of the face displayed in the image (for example, in step S251 of FIG. 47), mapping, to the image, a hair model prepared beforehand (for example, in step S272 of FIG. 48), detecting, from the image, a non-hair portion having no hair (for example, in step S273 of FIG. 48), modifying a Z value representing, in the Z direction as the direction of depth, the position of a region mapped to the non-hair portion of the hair model mapped to the image (for example, in step S274 of FIG. 48), and synthesizing the hair model having the Z value modified in the Z value modifying step with the face model (for example, in step S276 of FIG. 48).

An image processing apparatus (for example, the image processing apparatus of FIG. 2) of one embodiment of the present invention for determining a feature point of a three-dimensional face from a two-dimensional image displaying the face, includes a first fitting unit (for example, the eye feature point detector 202 of FIG. 11 performing step S202 of FIG. 13) for fitting a position and a size of a template of a predetermined region of the face to the face displayed in the image, and a second fitting unit (for example, the eye feature point detector 202 of FIG. 11 performing step 203 of FIG. 13) for fitting the shape of the template to the face displayed in the image and for determining a feature point of the predetermined region of the face from the template having a position, a size, and a shape thereof fitted to the face displayed in the image, by changing, within a range of shape of the predetermined region, the shape of the template having the position and the size fitted to the face displayed in the image, with a plurality of parameters, defining the shape of the template, being based on at least one parameter of the number smaller than the number of the plurality of parameters.

Figure 13:
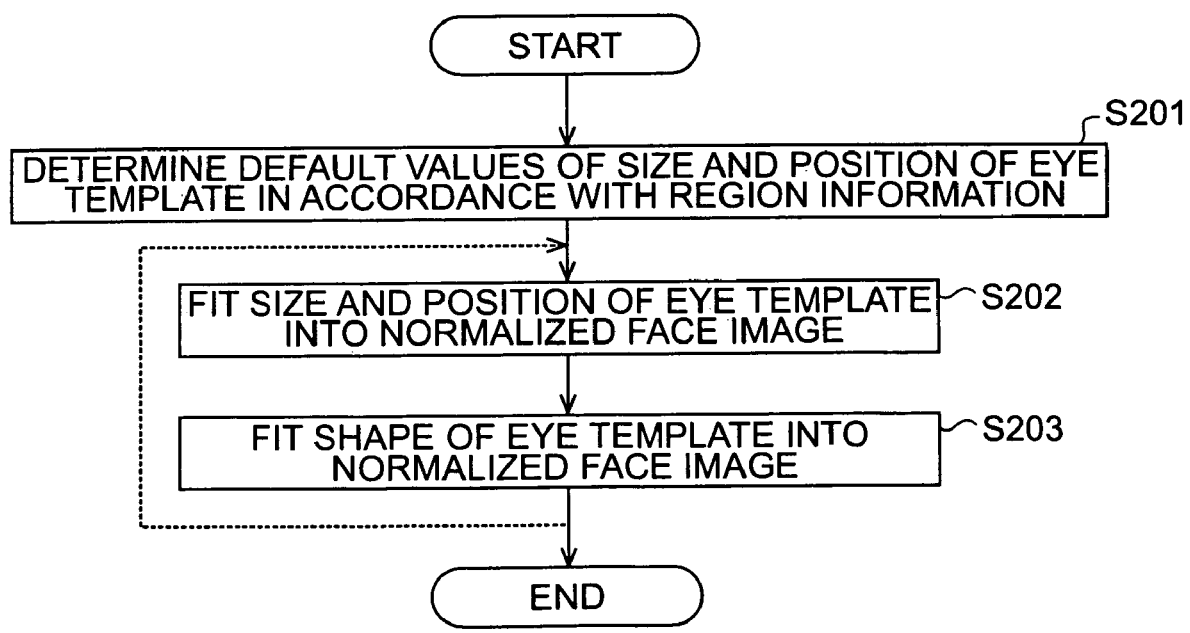
FIG. 13 is a flowchart illustrating the process of an eye feature point detector.

An image processing method of one embodiment of the present invention of determining a feature point of a three-dimensional face from a two-dimensional image displaying the face, includes a first fitting step of fitting a position and a size of a template of a predetermined region of the face to the face displayed in the image (for example, in step 202 of FIG. 13) and a second fitting step of fitting the shape of the template to the face displayed in the image and determining a feature point of the predetermined region of the face from the template having a position, a size, and a shape thereof fitted to the face displayed in the image by changing, within a range of shape of the predetermined region, the shape of the template having the position and the size fitted to the face displayed in the image, with a plurality of parameters, defining the shape of the template, being modified based on at least one parameter of the number smaller than the number of the plurality of parameters (for example, in step S203 of FIG. 13).

A computer program of one embodiment of the present invention for causing a computer to determine a feature point of a three-dimensional face from a two-dimensional image displaying the face, includes program code for performing a first fitting step of fitting a position and a size of a template of a predetermined region of the face to the face displayed in the image (for example, in step 202 of FIG. 13), and a second fitting step of fitting the shape of the template to the face displayed in the image and determining a feature point of the predetermined region of the face from the template having a position, a size, and a shape thereof fitted to the face displayed in the image by changing, within a range of shape of the predetermined region, the shape of the template having the position and the size fitted to the face displayed in the image, with a plurality of parameters, defining the shape of the template, being modified based on at least one parameter of the number smaller than the number of the plurality of parameters (for example, in step S203 of FIG. 13).

The embodiments of the present invention are described below with reference to the drawings.

FIG. 1 illustrates the hardware structure of a computer embodying an image processing apparatus of one embodiment of the present invention.

The computer includes a central processing unit (CPU) 102. An input and output interface 110 is connected to the CPU 102 via a bus 101. The CPU 102 receives an instruction via the input and output interface 110 when a user operates an input unit 107, composed of a keyboard, a mouse, a microphone, etc. In response, the CPU 102 executes a program stored in a read-only memory (ROM) 103. Furthermore, the CPU 102 loads, to a random-access memory (RAM) 104, one of a program stored in a hard disk 105, a program transmitted thereto from a satellite or via a network, received by a communication unit 108 and installed on the hard disk 105, and a program read from a removable recording medium 111 loaded on a drive 109 and installed on the hard disk 105 in order to execute the program. The CPU 102 performs processes in accordance with flowcharts to be discussed later and structures of block diagrams to be discussed later. The CPU 102 then outputs the process results thereof from the output unit 106, composed of a liquid-crystal display (LCD) and a loudspeaker, via the input and output interface 110, transmits the process results from the communication unit 108, or stores the process results onto the hard disk 105.

The program to be executed by the CPU 102 is recorded beforehand on one of the hard disk 105 and the ROM 103, as built-in recording media in the computer.

Alternatively, the program can be temporarily or permanently stored in the removable recording medium 111 such as one of a flexible disk, a compact-disk read-only memory (CD-ROM), a magneto-optical (MO) disk, a digital versatile disk (DVD), a magnetic disk, and a semiconductor memory. The removable recording medium 111 is supplied as so-called package software.

As described above, the program is installed to the computer from the removable recording medium 111. Alternatively, the program can be transmitted to the computer from a download site via an artificial satellite for digital satellite broadcasting in a wireless fashion, or transmitted to the computer from a download site via a network such as the Internet in a wired fashion. The computer receives such an incoming program by means of the communication unit 108 composed of one of a network interface card (NIC) and an interface complying with IEEE (Institute of Electrical and Electronics Engineers) 1394 or USB (universal serial bus), and then installs the program on the built-in hard disk 105.

In accordance with the embodiment of FIG. 1, the computer (CPU 102) executes an application program installed on the hard disk 105, thereby performing a modeling process and an animation process. In the modeling process, a three-dimensional (3D) model of a face is generated from a two-dimensional (2D) image displaying a face of a person as a 3D model object. In the animation process, a computer graphic (CG) image with the face region thereof moving is generated from the 3D model.

Figure 2:
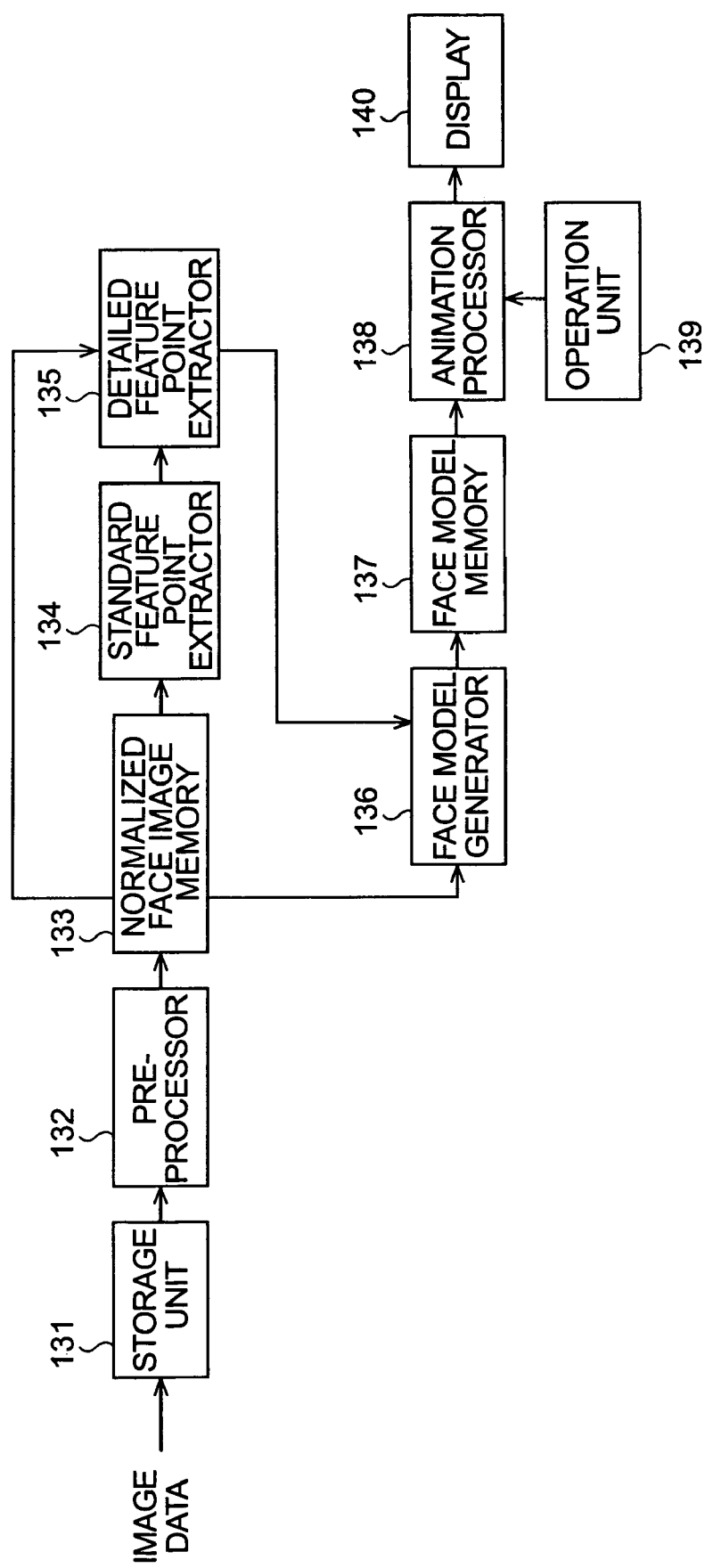
FIG. 2 is a block diagram illustrating an image processing apparatus in accordance with one embodiment of the present invention.

FIG. 2 illustrates an image processing apparatus in accordance with one embodiment of the present invention. The image processing apparatus is implemented by the computer of FIG. 1 that performs the program.

A storage unit 131 is supplied with a 2D image (image data) having a face image of a photographed person. The storage unit 131, corresponding to the RAM 104 of FIG. 1, temporarily stores a single frame of image bearing the human face (hereinafter also referred to as a face image).

One of an image photographed by a digital (still) camera, and an image provided by a scanner that scans photographs is stored onto the hard disk 105 via the communication unit 108, and then supplied to the storage unit 131.

A pre-processor 132 reads a single frame of face image stored in the storage unit 131 and performs a pre-process on the read face image. The pre-processor 132 then supplies a single frame image obtained as a result of pre-process (hereinafter referred to as a normalized face image as appropriate) to a normalized face image memory 133.

The normalized face image memory 133, corresponding to the RAM 104 of FIG. 1, temporarily stores data of a single frame of normalized face image supplied from the pre-processor 132.

A standard feature point extractor 134 extracts (detects) a feature point from the normalized face image stored in the normalized face image memory 133, and determines an eye region and a mouth region photographed in the normalized face image. The standard feature point extractor 134 supplies information of the feature point, the eye region, and the mouth region to a detailed feature point extractor 135.

Based on the information of the feature point, the eye region, and the mouth region supplied from the standard feature point extractor 134, the detailed feature point extractor 135 extracts (detects) a feature point from the normalized face image stored in the normalized face image memory 133 and supplies the extracted feature point to a face model generator 136.

The feature point extracted from the normalized face image by the standard feature point extractor 134 is a general feature point extracted through the previously described AAM, and is sufficient if approximate positions of the eyes, the mouth, and the outline of the face photographed in the normalized face image are generally recognized. Stringently high accuracy and a large number of units are not required of the feature point. In contrast, the feature point extracted from the normalized face image by the detailed feature point extractor 135 is used to generate a computer graphic (CG) animation of a face to be described later, and has accuracy higher than and number more than the feature point extracted by the standard feature point extractor 134.

To discriminate between the feature point extracted by the standard feature point extractor 134 and the feature point extracted by the detailed feature point extractor 135, the feature point extracted by the standard feature point extractor 134 is referred to as a standard feature point while the feature point extracted by the detailed feature point extractor 135 is referred to as a detailed feature point.

Based on the single frame of normalized face image stored in the normalized face image memory 133 and the feature point supplied from the detailed feature point extractor 135, the face model generator 136 generates a face model as a 3D model of the face photographed in the normalized face image, and supplies the generated face model to a face model memory 137.

The face model memory 137, corresponding to the RAM 104 of FIG. 1, temporarily stores data of the face model supplied from the face model generator 136.

Based on the face model stored in the face model memory 137, an animation processor 138 generates data of a CG animation having a face region thereof moving in response to an operation of an operation unit 139, and supplies the CG animation to a display 140.

The operation unit 139, corresponding to the input unit 107 of FIG. 1, is controlled by a user, and supplies an operational signal responsive to an operation by the user to the animation processor 138.

The display 140, corresponding to the output unit 106 of FIG. 1, displays the CG animation supplied by the animation processor 138.

The operation of the image processing apparatus of FIG. 2 is described below with reference to a flowchart of FIG. 3.

The storage unit 131 stores beforehand a single frame of a face image of a person who has been photographed fullface. In step S101, the pre-processor 132 reads and pre-processes the single frame of face image stored in the storage unit 131. The pre-processor 132 supplies the single frame of normalized face image obtained as a result of the pre-process to the normalized face image memory 133 for storage, and processing proceeds from step S102 to step S103.

In step S103, the standard feature point extractor 134 extracts the standard feature point from the normalized face image stored in the normalized face image memory 133 using the AAM technique, and then determines an eye region and a mouth region. The standard feature point extractor 134 supplies information of the feature point, the eye region, and the mouth region to the detailed feature point extractor 135. Processing proceeds to step S104.

In step S104, the detailed feature point extractor 135 references the information of the standard feature point, the eye region, and the mouth region supplied from the standard feature point extractor 134, and the normalized face image stored in the normalized face image memory 133 and extracts feature points of particular regions of the normalized face image, namely, feature points of the eyes, the mouth, and the chin of the face photographed in the normalized face image. The extracted feature points are then supplied to the face model generator 136.

Processing proceeds from step S104 to step S105. The face model generator 136 generates a face model of the photographed face in the normalized face image, based on the single frame of normalized face image stored in the normalized face image memory 133 and the feature point supplied from the detailed feature point extractor 135. Processing proceeds to step S106. In step S1106, the face model generator 136 generates a hair model as a 3D model of the hair of the photographed person in the normalized face image, and synthesizes the face model generated in step S105. Processing proceeds to step S107.

In step S107, the face model generator 136 embeds (synthesizes) an eye model as a 3D model of eyes (eyeballs) and a tooth model as a 3D model of teeth (in the mouth) in the face model with the hair model synthesized therewith in step S106, based on the detailed feature point supplied from the detailed feature point extractor 135. The resulting face model is supplied to the face model memory 137 for storage, and processing proceeds to step S108.

In step S108, the animation processor 138 generates the data of the CG animation having the region of the face thereof moving in response to the operation of the operation unit 139, based on the face model stored in the face model memory 137, and supplies the generated data to the display 140. The display 140 thus displays the CG animation of the face displayed in the face image stored in the storage unit 131 and moving in response to the operation of the operation unit 139.

The face model stored in the face model memory 137 can be uploaded to a server on the Internet or transmitted to another apparatus. The face model stored in the face model memory 137 can also be stored onto the removable recording medium 111 via the drive 109 for distribution to third parties.

Figure 3:
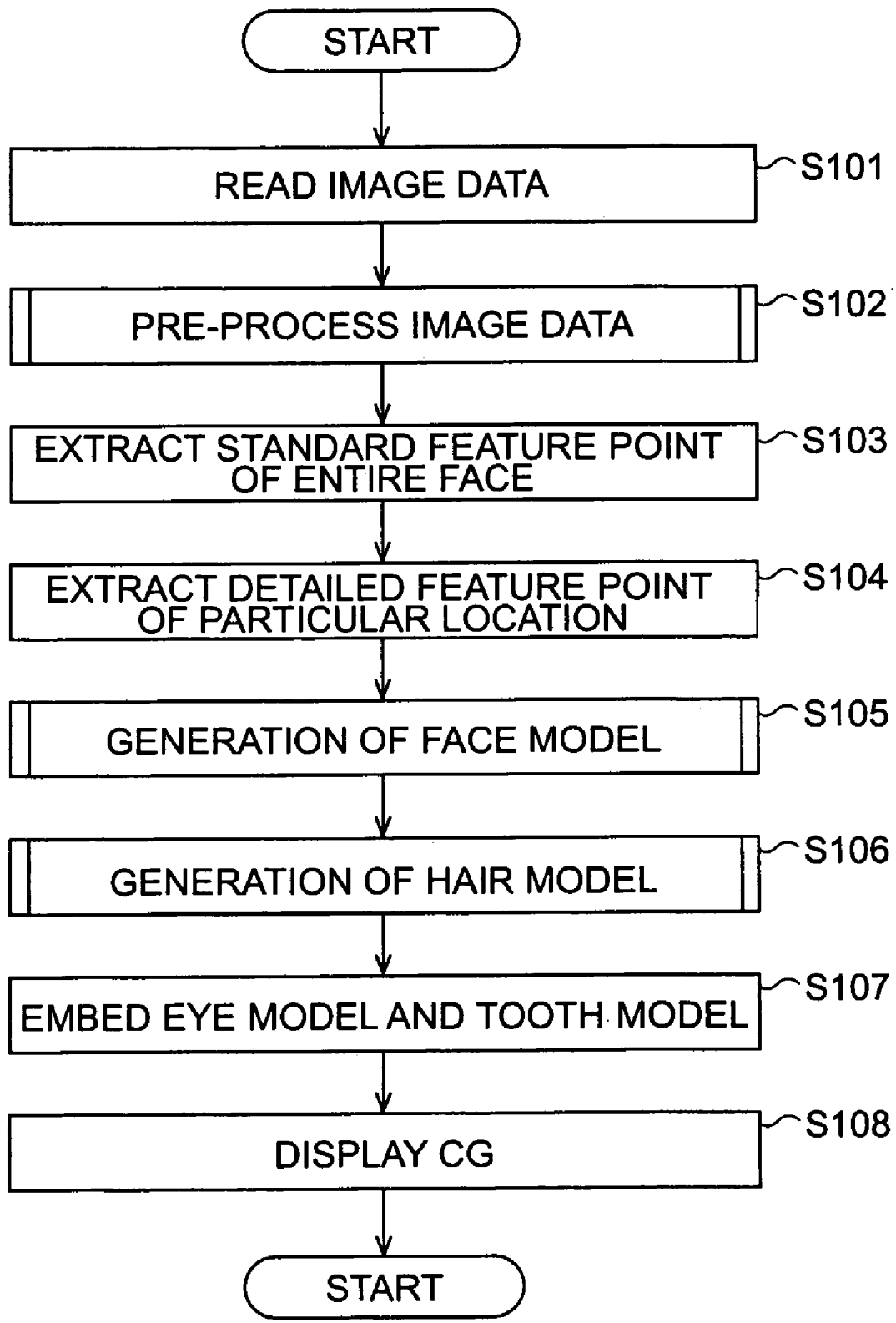
FIG. 3 is a flowchart illustrating the operation of the image processing apparatus.
Figure 4:
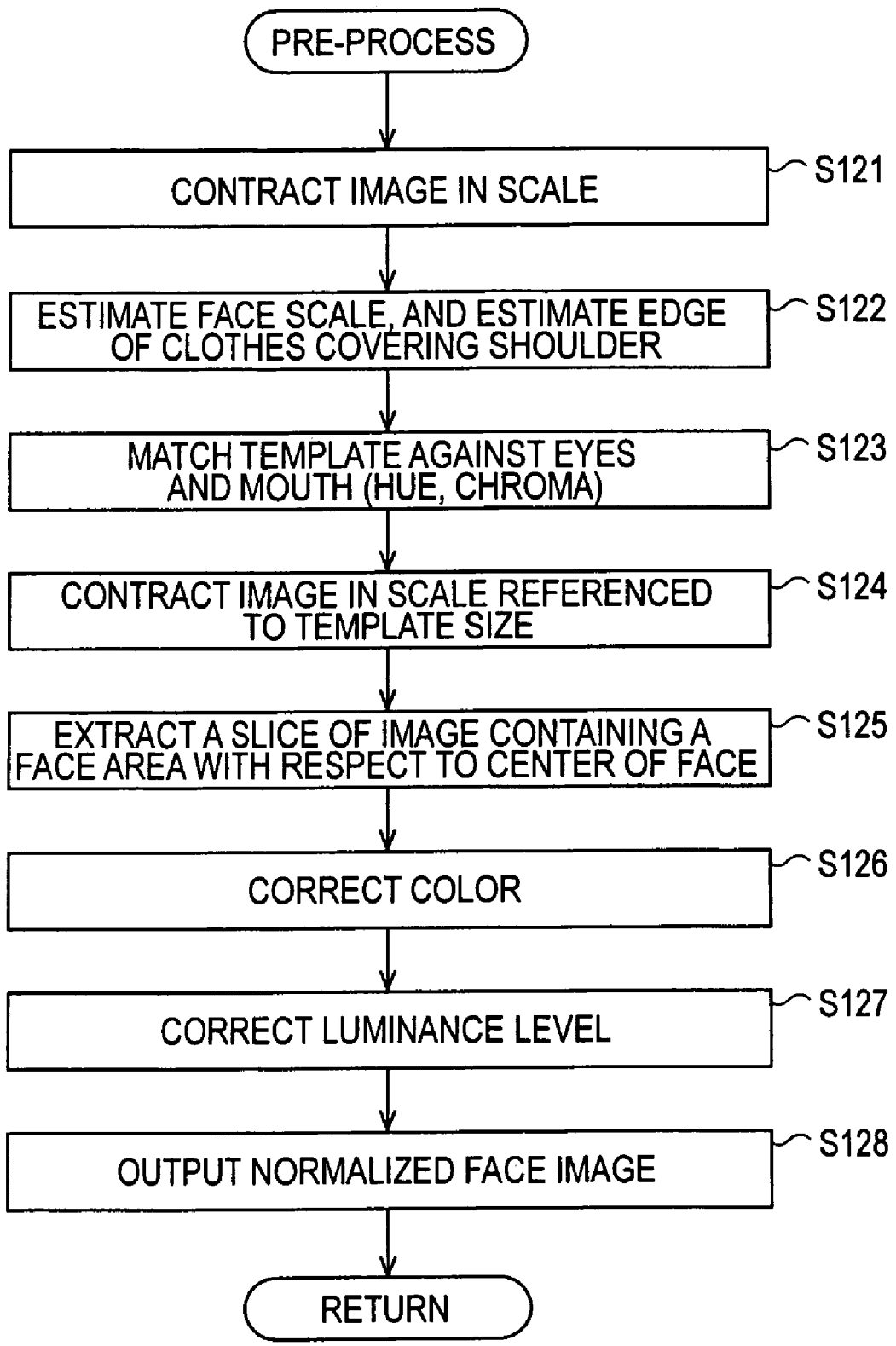
FIG. 4 is a flowchart illustrating a pre-process.

The pre-process performed by the pre-processor 132 in step S102 of FIG. 3 is described below with reference to a flowchart of FIG. 4.

In step S121, the pre-processor 132 contracts in scale the size of the one frame of face image stored in the storage unit 131 as necessary, and proceeds to step S122. If the face image stored in the storage unit 131 is an image photographed by a commercially available digital camera, workload in a subsequent process of becomes large. To reduce workload, the face image is reduced to a predetermined sized by low-pass filtering. In the low-pass filtering, pixels are decimated.

If the face image stored in the storage unit 131 is equal to a predetermined size or smaller, the process in step S121 is skipped.

The face image stored in the storage unit 131 has now a monochrome background such as gray background to facilitate discrimination of a portion of a photographed person (face) from the remaining portion.

Figure 5:
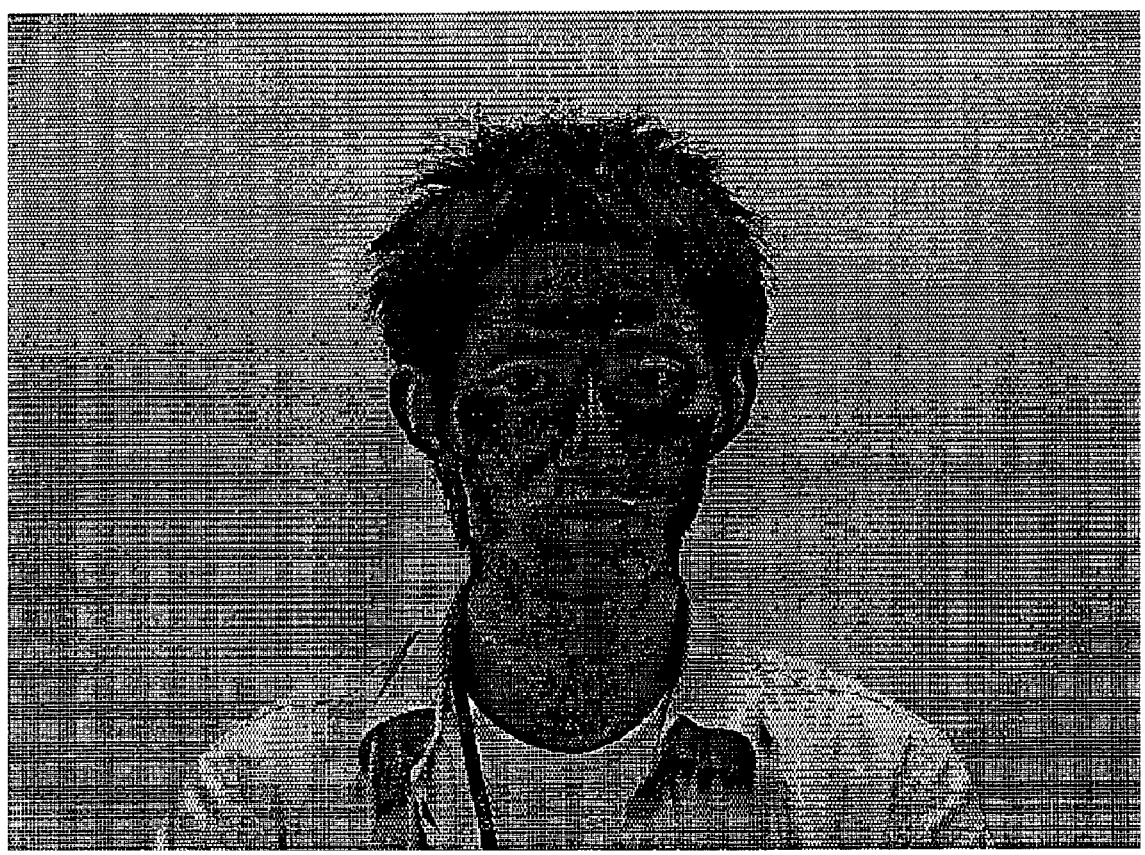
FIG. 5 illustrates a face image.

FIG. 5 illustrates an example of face image stored in the storage unit 131 and to be pre-processed by the pre-processor 132.

In step S122, the pre-processor 132 estimates the scale of the face of a rectangular area containing the portion of the photographed human face in the face image that is reduced to the predetermined size in step S121, and then estimates a border between the clothes covering the neck and the shoulders of the photographed person in the face image and the exposed portion of the neck and the face not covered with the clothes. The border is hereinafter simply referred to as the clothes edge.

Figure 6:
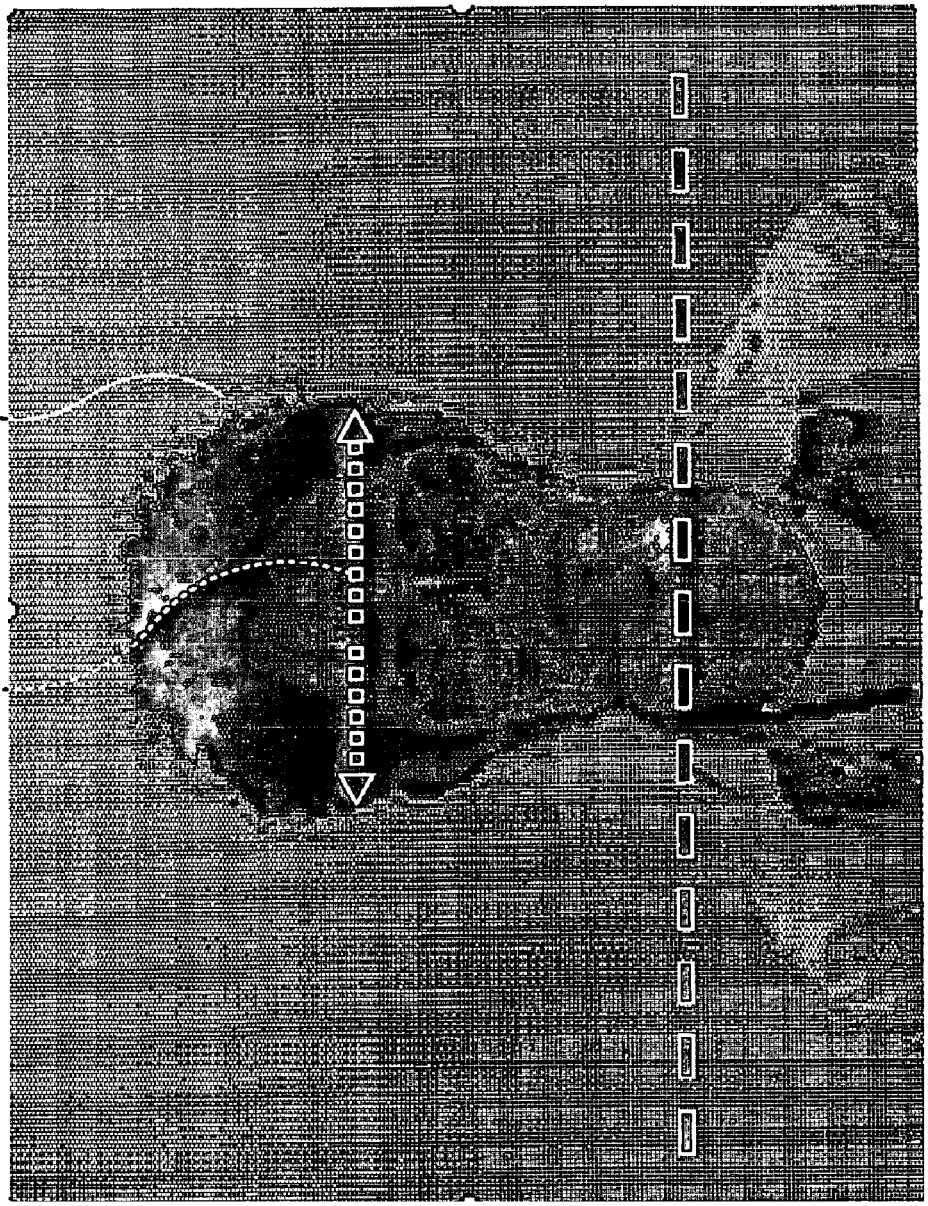
FIG. 6 illustrates a method of estimating a face scale and an edge of clothes.

A method of estimating the face scale and the clothes edge with reference to FIG. 6 is described below.

FIG. 6 illustrates a face image into which the face image of FIG. 5 is reduced in step S121.

If the face image has three red, green, and blue (RGB) values as pixel values, the pre-processor 132 detects a border between the person and the background (hereinafter referred to as a person edge as appropriate) from the face image based on the RGB values.

The pre-processor 132 detects an edge pixel of the face image at each row in a direction from the left side of the face image inward and in a direction from the right side of the image inward. More specifically, the pre-processor 132 determines a pixel of interest at a row of interest from the face image and calculates the sum of squares of differences between RGB values of the pixel of interest and RGB values of a pixel positioned next to the pixel of interest and more inside than the pixel of interest. The sum of squares of differences is also hereinafter referred to as an RGB squared error. By comparing the RGB squared error with a fixed threshold value (small threshold value) in an inward direction from the left edge of the face image and in an inward direction from the right edge of the face, the edge pixel is detected. The edge pixel is now a person edge pixel candidate.

The pre-processor 132 detects, as the edge pixel, a pixel having an RGB squared error, larger than the fixed threshold value, detected in the inward direction into the face image, and sets the edge pixel as the person edge candidate. The edge pixel can be a person edge but can also be an edge of some other object present in the background.

After detecting the first person edge candidate, the pre-processor 132 estimates that the area (horizontally arranged pixels) of the face image outside the person edge candidate is a background, and determines the RGB values representing the background (hereinafter referred to as a background RGB value as appropriate). The background RGB may be one of the mean value of the RGB values of the pixels of the background and the RGB value of any pixel in the background.

The pre-processor 132 then continuously detects the edge pixels further in the inward direction from the person edge candidate. The threshold value to be compared with the RGB squared error is a variable one in the pixels inside the person edge candidate first detected. For example, the more inside into the face image, the larger the threshold value becomes.

When a new edge pixel is detected, in other words, when the RGB squared error of a given pixel is larger than the variable threshold value, the pre-processor 132 determines a RGB value representing the pixel values of the pixels present between the current person edge candidate and the new edge pixel. The determined RGB value is hereinafter referred to as an outer representative RGB value. The outer representative RGB value may be the mean value of the RGB values of the pixels present between the current person edge candidate and the new edge pixel or the RGB value of any of the pixels present between the current person edge candidate and the new edge pixel (for example, one of the new edge pixels positioned outside of the face image).

The pre-processor 132 further determines the RGB values of the pixels of the face image inside the new edge pixel (hereinafter referred to as an inner representative RGB value). The inner representative RGB value can be the RGB value of an innermost pixel of the new edge pixels in the face image.

The pre-processor 132 determines a background similarity of the inner representative RGB value and a background similarity of the outer representative RGB value. The background similarity herein refers to the degree of similarity with the background. The background similarity of the inner representative RGB value can be the sum of squares of the differences between the RGB values of the inner representative RGB value and the background pixel RGB values. Similarly, the background similarity of the outer representative RGB value can be the sum of squares of the differences between the RGB values of the outer representative RGB value and the background pixel RGB values. In this case, the smaller the background similarity, the higher the similarity to the background is.

After determining the background similarity of the inner representative RGB value and the background similarity of the outer representative RGB value, the pre-processor 132 determines which of the inner representative RGB value and the outer representative RGB value has a higher similarity to the background RGB values.

If the outer representative RGB value has a higher similarity to the background RGB value than the inner representative RGB value, the pre-processor 132 updates the person edge candidate to the new edge pixel based on the determination that the area extending from the current person edge candidate to the new edge pixel is background. The pre-processor 132 continues to detect edge pixels.

If the inner representative RGB value has a higher similarity to the background RGB value than the outer representative RGB value, the pre-processor 132 continues to detect edge pixels. When the edge pixel detection having started with one of the left side and the right side of the face image is performed to the other side, the pre-processor 132 sets a pixel as currently being a person edge candidate to be a person edge.

The person edge of the face image of FIG. 5 is determined as shown in FIG. 6.

Upon determining the person edge, the pre-processor 132 scans the face image from top to bottom to observe the person edge. The pre-processor 132 thus estimates the face scale and the clothes edge.

When the face image is viewed downward from the top of the head as shown in FIG. 6, the area enclosed by the person edges is widened in width and reaches a peak at the level near the temple as represented by arrow-headed broken lines A. The area enclosed by the person edges is then narrowed toward the neck, and widened again from the neck to the shoulders.

When the face image is scanned from top to bottom to view the person edge, the face of the person displayed in the face image is present in a vertical extension (represented by an arrow-headed solid line B of FIG. 6) from the pixel row serving as the first detected person edge to the pixel row of the person edge starting to widen for the second time and in a horizontal extension (represented by the arrow-headed broken line A of FIG. 6) at the first detected person edge having a peak width from the left side to the right side of the face image. The shoulders of the person are displayed at the pixel row where the area enclosed by the person edge starts widening for the second time.

The pre-processor 132 scans the face image from top to bottom to observe the person edge. The pre-processor 132 measures the vertical length (represented by the arrow-headed solid line B of FIG. 6) from the first detected pixel of the person edge to the row of the pixels where the area enclosed by the person edges starts widening in width for the second time. The pre-processor 132 also measures the horizontal length (represented by the arrow-headed broken line A of FIG. A) at the first detected row having a maximum width from the left side to the right side of the person edge. The pre-processor 132 thus determines a rectangular area defined by the measured vertical length and the horizontal length. The pre-processor 132 estimates a rectangular area, which is obtained by multiplying the resulting rectangle in area by a predetermined number of times or by widening one of the vertical side and the horizontal side of the resulting rectangle by a predetermined size, as a face scale of a rectangular area containing the portion of the face of the photographed person in the face image.

The pre-processor 132 estimates, as the clothes edge, the pixel row where the area enclosed the person edges starts widening in width for the second time.

The subsequent step is performed based on the premise that the face is above the clothes edge.

Returning to FIG. 4, processing proceeds to step S123 after estimating the face scale and the clothes edge in step S122 as described above. The pre-processor 132 binarizes the face image in the face scale, and performs a template matching of the eyes and the mouth of the face displayed in the face scale on the resulting binarized image.

Based on the hue and chroma of the face image within the face scale, the pre-processor 132 generates a binarized image by setting the pixel value in a flesh color area in the face scale to be 1, for example, and the pixel value in the other color area to be 0, for example.

Figure 7:
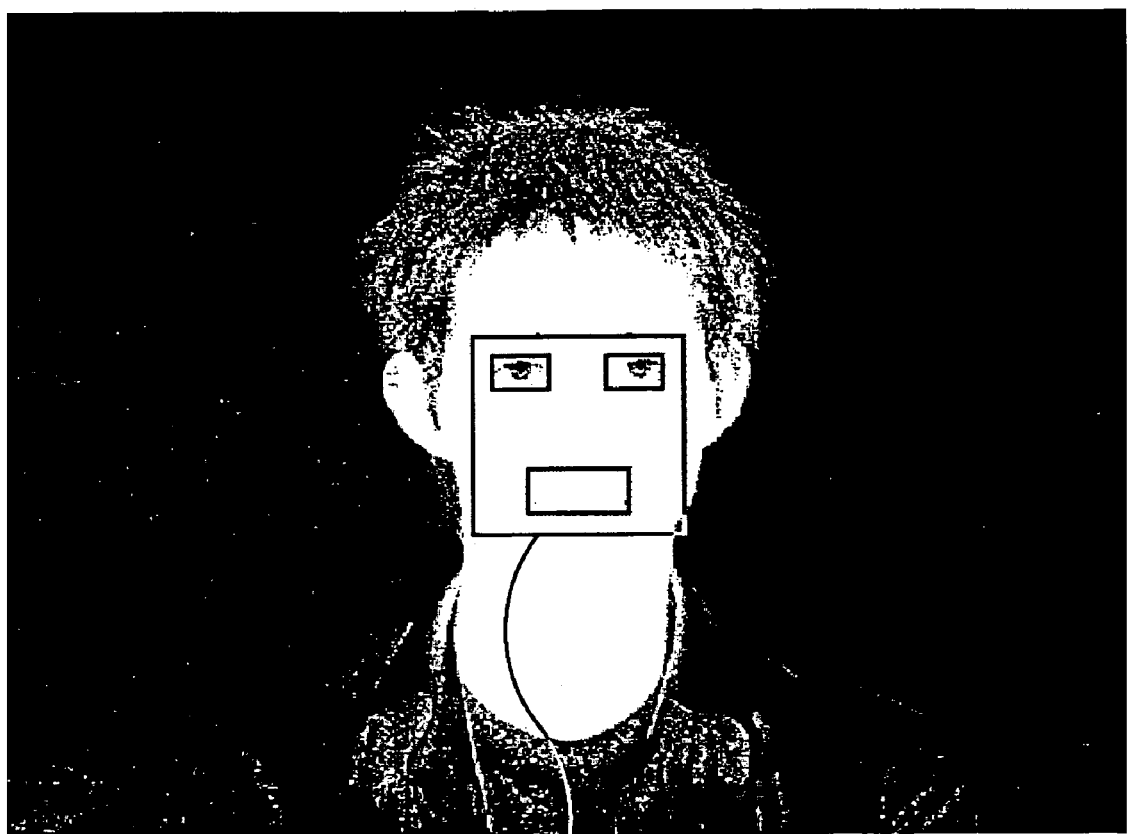
FIG. 7 illustrates a binarized image.

FIG. 7 illustrates a binarized image resulting from the face image of FIG. 6. In the binarized image of FIG. 7, a white portion represents a flesh color pixel having a pixel value of 1, while a black portion represents an other color portion having a pixel value of 0. Most area of the face has a pixel value of 1 representing the flesh color pixel, but dark eyes and reddish lips have a pixel value of 0.

Upon generating the binarized image, the pre-processor 132 performs the template matching of the eyes and the mouth of the face displayed in the face scale on the binarized image.

The pre-processor 132 holds a square eye-and-mouth template containing eye rectangular regions and a mouth rectangular region. As shown in FIG. 7, the eye-and-mouth template contains pixels arranged in a square. The pixel value is zero in the eye regions and the mouth region while the remaining region has a pixel value of 1. As shown in FIG. 7, the pre-processor 132 performs the template matching process. In the template matching process, the pre-processor 132 places the eye-and-mouth template on the face scale, and calculates the sum of squares of pixel value differences between the pixels of the eye-and-mouth template and the corresponding pixels of the face scale. This calculation is performed with the position and the size of the eye-and-mouth template with respect to the face scale.

The pre-processor 132 detects the position and the size of the eye-and-mouth template matching most closely the face scale, in other words, the position and the size of the eye-and-mouth template resulting in a minimum sum of squares. In the template matching process using the eye-and-mouth template, the size of the eye-and-mouth template can be varied in length in a horizontal direction and in a vertical direction with one direction independent from the other direction, or can be varied with similarity to the original square maintained. To simplify the process, the size of the eye-and-mouth template is herein varied with the similarity to the original square maintained.

The eye-and-mouth template with the position and the size thereof fitting most closely the face scale is referred to as a match eye-and-mouth template.

The eye-and-mouth template contains information that needs to be considered as the center of the face (hereinafter referred to as center information). The information that needs to be considered as the center of the face may be the center of gravity of the square of the eye-and-mouth template.

Returning to FIG. 4, the pre-processor 132 proceeds to step S124 after acquiring the eye-and-mouth template in step S123. The pre-processor 132 contracts (or expands) the face image (reduced in step S122) based on the match eye-and-mouth template. Processing proceeds to step S125.

The pre-processor 132 estimates the size of the face displayed in the face image based on the size of the match eye-and-mouth template. The pre-processor 132 reduces the face image so that the size of the face falls within a predetermined range with respect to a size appropriate for the generation of the 3D model and the CG animation.

In step S125, the pre-processor 132 extracts a square area centered on the center of (gravity of) the face from the face image reduced in step S124, for example, a square area of 512 pixels (in a horizontal direction) and 512 pixels (in a vertical direction). The center position of the face is recognized from the center information contained in the match eye-and-mouth template.

In order for the pre-processor 132 in step S125 to extract a square area of 512 pixels (in a horizontal direction) and 512 pixels (in a vertical direction) from the face image after being reduced in step S124, the face image needs to be reduced in step S124 so that an appropriate size fits into the square are of 512 pixels×512 pixels.

The face, photographed in an image (also referred to as a face image) extracted from the face image in step S125, has an appropriate size. After such a face image is obtained, processing proceeds from step S125 to step S126. The pre-processor 132 performs a color correction process on the face image obtained in step S125, and processing proceeds to step S127.

If the background of the face image is monochrome gray, the pre-processor 132 samples the area outside the person edge obtained in step S122, from the face image, in other words, the RGB value as the pixel value of each pixel forming the background. The pre-processor 132 determines a linear function for each red, green, and blue approximating the relationship between a deviation of the sampled RGB value with reference to the gray RGB value prepared beforehand and the RGB value of the pixel of the background of the face image. Based on the resulting linear function, the pre-processor 132 performs the color correction process on the entire image obtained in step S125.

In step S127, the pre-processor 132 corrects a luminance value (luminance level) of the color corrected image.

More specifically, the pre-processor 132 detects a minimum luminance value and a maximum luminance value from the entire color correction image. For example, if the luminance value is represented in 8 bits, the pre-processor 132 performs a linear conversion process on all pixel values of the color corrected image so that the minimum luminance value of the color corrected image is zero while the maximum luminance value being 255 (=$2^8$–1). The pre-processor 132 thus corrects the luminance value on the color corrected image.

Processing proceeds from step S127 to step S128. The pre-processor 132 supplies the normalized face image memory 133 (see FIG. 2) with the luminance-value corrected image as a normalized face image for storage and ends the pre-process. The pre-processor 132 includes, into the normalized face image, information concerning the person edge, the clothes edge, and the center of the face obtained from the eye-and-mouth template as appropriate, and then supplies the normalized face image memory 133 with the information for storage.

Figure 8:
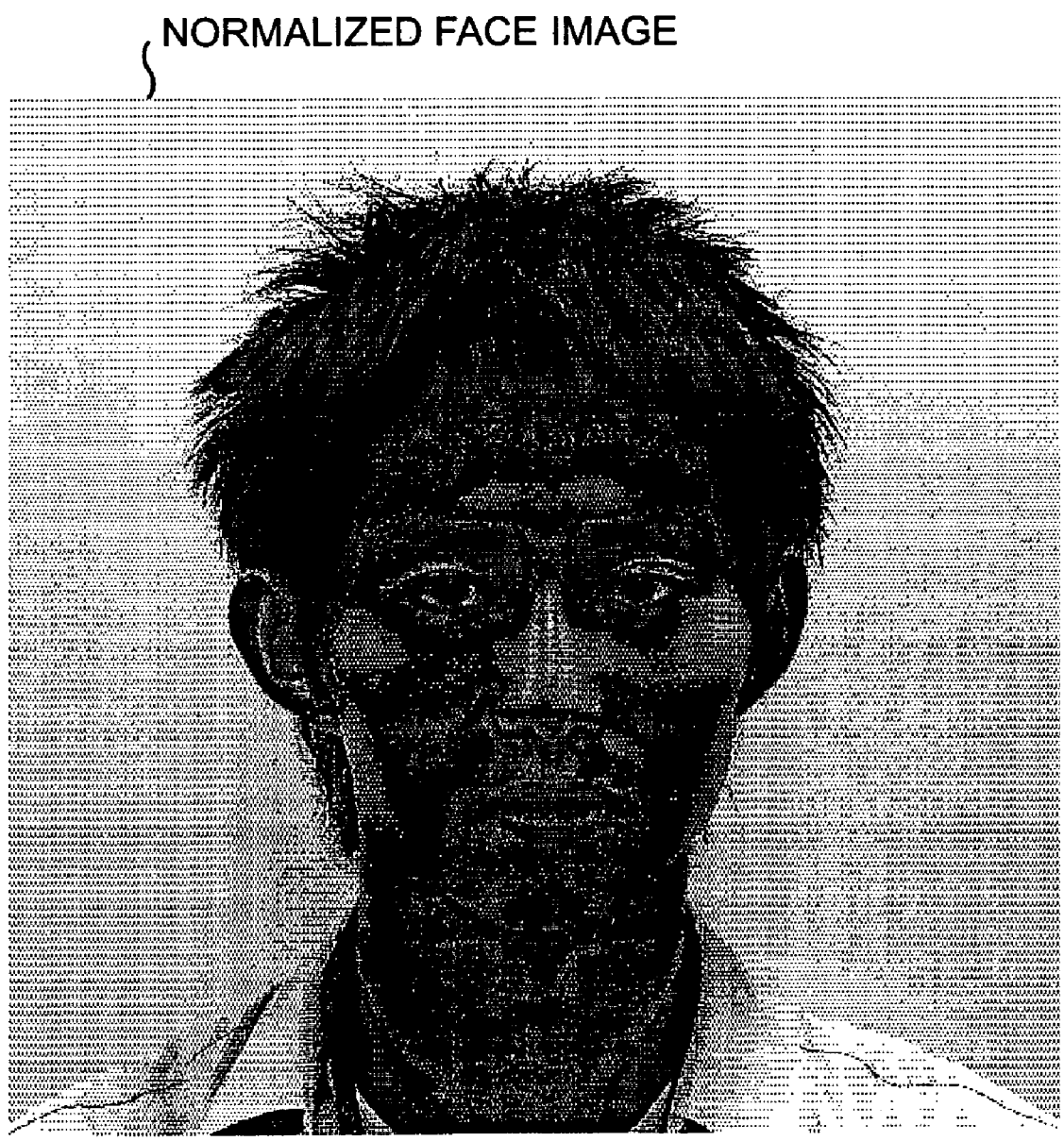
FIG. 8 illustrates a normalized face image.

FIG. 8 illustrates the normalized face image that is obtained by pre-processing the face image of FIG. 5.

If the square area of horizontal 512 pixels and vertical 512 pixels is extracted in step S125 as described above, the normalized face image becomes an image of 512 pixels by 512 pixels.

When the normalized face image memory 133 stores the normalized face image, the standard feature point extractor 134 extracts the standard feature point from the normalized face image stored in the normalized face image memory 133 using the AAM technique as previously discussed with reference step S103 of FIG. 3. The standard feature point extractor 134 also determines the eye regions and the mouth region of the eyes and the mouth displayed in the normalized face image from the standard feature point. The standard feature point extractor 134 supplies the detailed feature point extractor 135 with the information of the standard feature point and the eye regions and the mouth region.

Figure 9:
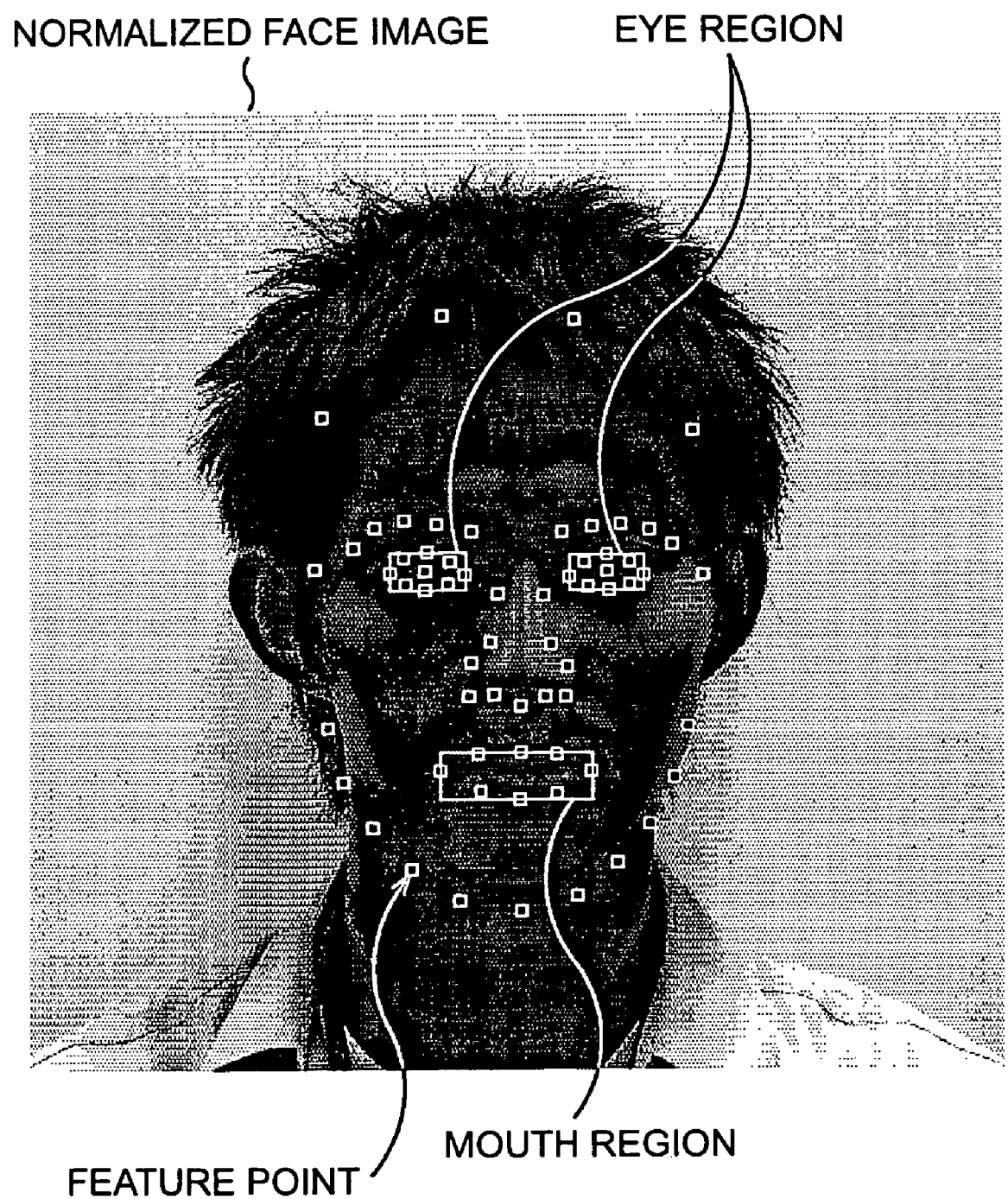
FIG. 9 illustrates a normalized face image.
Figure 10:
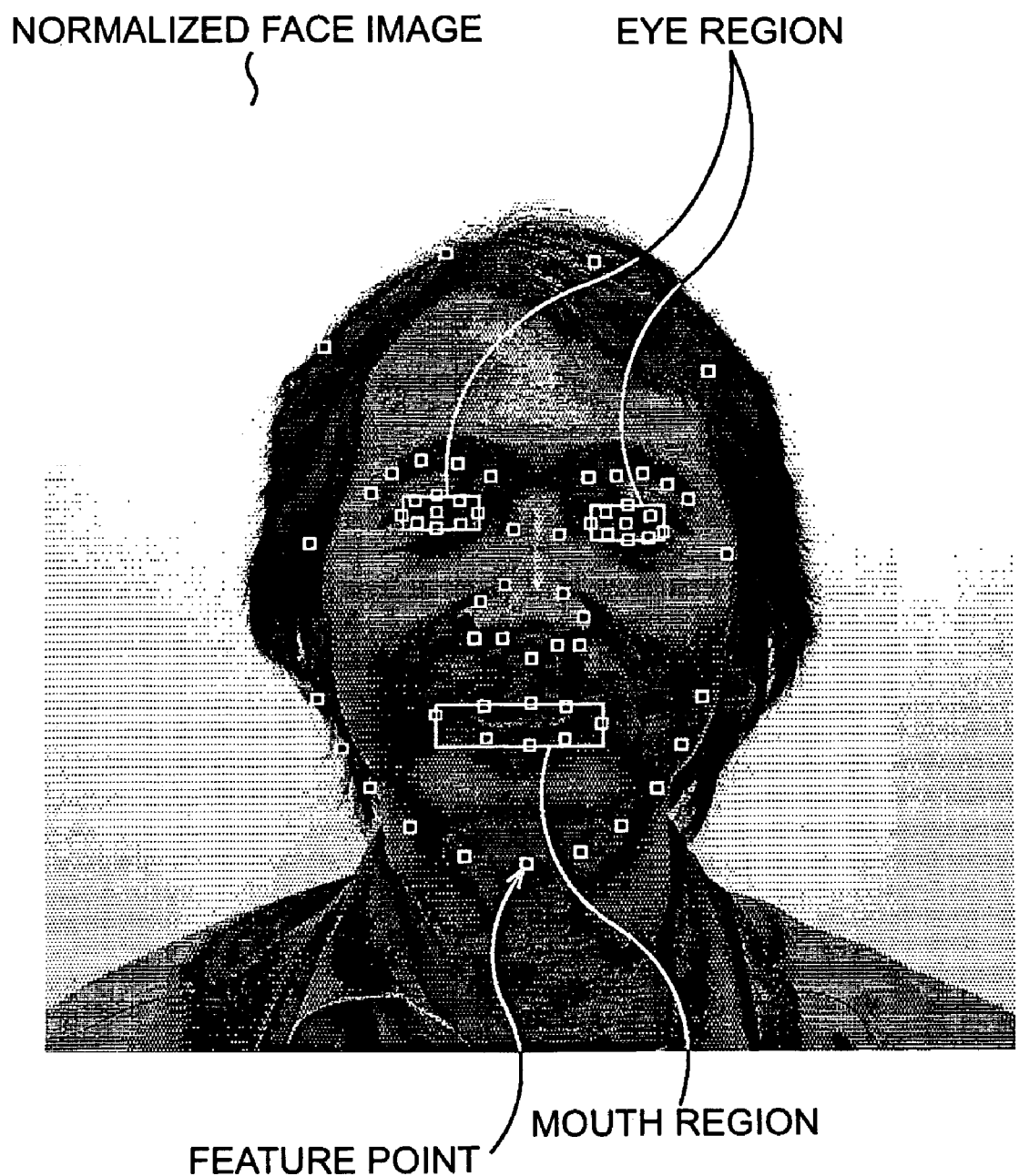
FIG. 10 illustrates a normalized face image.

FIG. 9 illustrates the standard feature points, the eye regions, and the mouth region obtained from the normalized face image of FIG. 8 by the standard feature point extractor 134. FIG. 10 illustrates standard feature points, eye regions, and a mouth region obtained from another normalized face image.

According to the AAM technique, the standard feature points representing the features of the eyes, the mouth, and the outlines of the face displayed in the normalized face image are obtained as represented by small square marks as shown in FIGS. 9 and 10. The standard feature point extractor 134 determines the eye regions, each being a square containing the eye, and the mouth region being a square containing the mouth, based on the feature points obtained from the normalized face image, and supplies the information of the eye regions and the mouth region together with the standard feature points to the detailed feature point extractor 135.

The standard feature point is an approximate feature point about the eyes, the mouth, and the outline of the face displayed in the normalized face image, and the eye regions and the mouth region obtained from the standard feature points indicate approximate positions of the eyes and the mouth.

Figure 11:
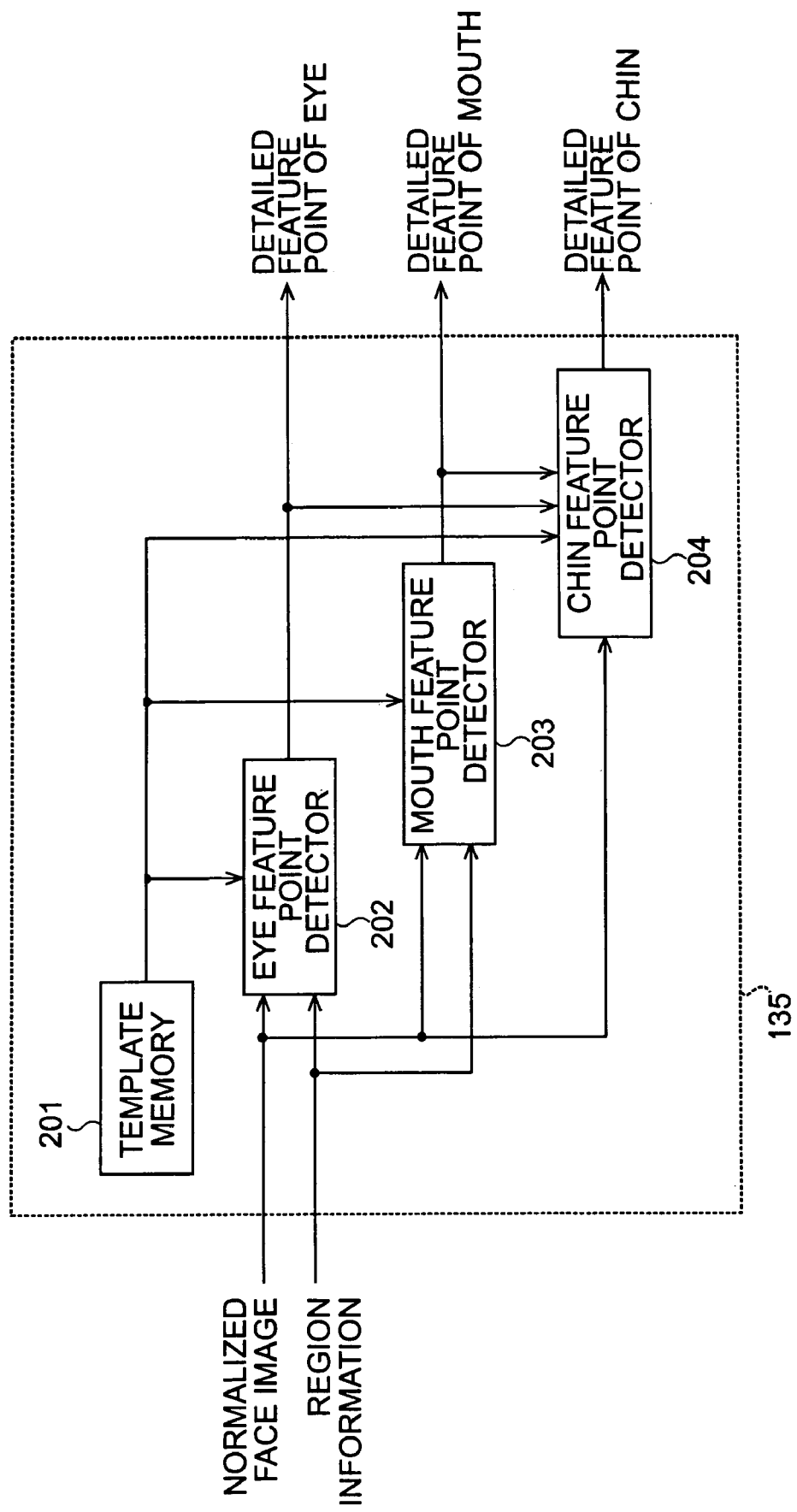
FIG. 11 is a block diagram illustrating a detailed feature point extractor.

FIG. 11 is a block diagram illustrating the structure of the detailed feature point extractor 135 of FIG. 2.

A template memory 201 stores templates of the eyes, the mouth, and the chin (outline of the face), and supplies the template (eye template) of the eyes to an eye feature point detector 202, the template of the mouth (mouth template) to a mouth feature point detector 203, and the template of the chin (chin template) to a chin feature point detector 204.

The eye feature point detector 202 receives the eye template from the template memory 201, while also receiving the normalized face image from the normalized face image memory 133 (see FIG. 2) The eye feature point detector 202 further receives information of the standard feature point, the eye regions, and the mouth region (hereinafter collectively referred to as region information) from the standard feature point extractor 134.

The eye feature point detector 202 detects (extracts) the detailed feature point of the eyes of the normalized face image, based on the normalized face image from the normalized face image memory 133, the region information from the standard feature point extractor 134, and the eye template from the template memory 201. The eye feature point detector 202 supplies the detected detailed feature point to the chin feature point detector 204 and the face model generator 136 (see FIG. 2).

The mouth feature point detector 203 receives the mouth template from the template memory 201, the normalized face image from the normalized face image memory 133 (see FIG. 2), and the region information from the standard feature point extractor 134.

The mouth feature point detector 203 detects (extracts) the detailed feature point of the mouth of the normalized face image, based on the normalized face image from the normalized face image memory 133, the region information from the standard feature point extractor 134, and the mouth template from the template memory 201. The mouth feature point detector 203 supplies the detected detailed feature point to the chin feature point detector 204 and the face model generator 136 (see FIG. 2).

The chin feature point detector 204 receives the chin template from the template memory 201, the detailed feature point of the eyes from the eye feature point detector 202, the detailed feature point of the mouth from the mouth feature point detector 203, and the normalized face image from the normalized face image memory 133 (see FIG. 2).

The chin feature point detector 204 detects (extracts) the detailed feature points of the outline of the face, in particular, the lower chin of the normalized face image, based on the normalized face image from the normalized face image memory 133, the chin template from the template memory 201, the detailed feature point of the eyes from the eye feature point detector 202, and the detailed feature point of the mouth from the mouth feature point detector 203. The chin feature point detector 204 supplies the detected detailed feature point to the face model generator 136 (see FIG. 2).

Figure 12:
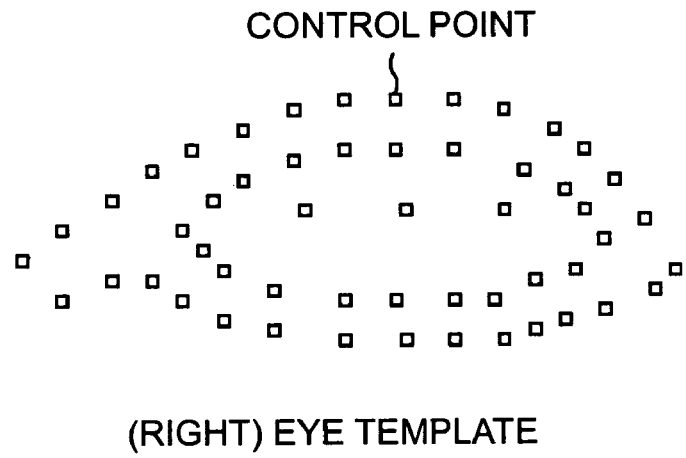
FIG. 12 illustrates an eye template.

FIG. 12 illustrates an example of the eye template stored in the template memory 201 of FIG. 11.

The eye template is composed, in the order from outside to inside, points along a border between the eye socket and the eyelids (hereinafter also referred to as an outer outline of the eye), points along an outline of the exposed portion of the eyeball through the opening of the eyelids (hereinafter also referred to an inner outline of the eye), and the center point of the pupil.

The points forming the eye template are hereinafter referred to as control points as appropriate. FIG. 12 represents the control points as square marks.

In the eye template, the number of control points on the outer outline of the eye is high enough to reproduce the border between the eye socket and the eyelids at a high accuracy level. As shown in FIG. 12, 30 controls points are employed.

In the eye template, the number of control points along the inner outline of the eye is high enough to reproduce the outline of the eyeball exposed from the eyelids at a high accuracy level. As shown in FIG. 12, 20 controls are employed.

In the eye template, the control point of the center of the eye is arranged at the center of the pupil.

The number of control points in the eye template are not limited to the above numbers. The number of control points along the inner outline of the eye is sufficient if the outline of the portion of the eyeball exposed between the eyelids is reproduced at an acceptable accuracy. Similarly, the number of control points along the outer outline of the eye is sufficient if the border between the eye socket and the eyelids is reproduced at an acceptable accuracy level.

The eye template of FIG. 12 is the template of the right eye (of the person displayed in the normalized face image). As the eye template of the right eye, the eye template of the left eye is also stored in the template memory 201.

The template memory 201 stores the mouth template and the chin template as the eye template of FIG. 12.

The mouth template is composed of control points arranged along a standard border between the upper lip and the lower lip of the mouth. The number of control points of the mouth template is high enough to reproduce the border between the upper lip and the lower lip at an acceptable accuracy level. The chin template is composed of control points arranged in a partial oval shape as a standard outline of the face. The number of control points arranged along the oval lower chin is high enough to reproduce the outline of the lower chin at an acceptable accuracy level.

The process of the eye feature point detector 202 of FIG. 11 is described below with reference to a flowchart of FIG. 13.

In step S201, the eye feature point detector 202 determines default values of the size and the position of the eye template from the template memory 201, based on the normalized face image from the normalized face image memory 133 of FIG. 2 and the eye regions of the region information from the standard feature point extractor 134.

More specifically, the eye feature point detector 202 expands or contracts the eye template with similarity to the original shape maintained so that the eye template is inscribed in the rectangular area represented by the information of the eye regions in the normalized face image. The size and the position of the eye template placed in the normalized face image in step S201 are default values thereof. The default values of the size and the position of the eye template are referred to as a default size and a default position, respectively.

Processing proceeds from step S201 to step S202. The eye feature point detector 202 gradually varies the size and the position of the eye template from the default size and the default position thereof so that the eye template fits the face displayed in the normalized face image. This process is referred to as a position/size fitting process.

In the position/size fitting process in step S202, the eye feature point detector 202 varies the size and the position of the eye template with the similarity thereof maintained to the original shape, and calculates an assessment function. The assessment function assesses the degree of fitness of how closely the eye template with the size and the position thereof varied fits the eyes of the face displayed in the normalized face image.

The eye feature point detector 202 can expand or contract the eye template with the similarity to the original shape maintained, thereby changing the size of the eye template. The eye feature point detector 202 can translate the control points of the entire eye template with the shape thereof maintained, thereby shifting the position of the eye template. In addition to the translation of the eye template, the eye feature point detector 202 can rotate the eye template about the control point at the centre of the pupil, thereby changing the position of the eye template.

The eye feature point detector 202 determines the size and the position of the eye template when the assessment function results in the most closely fitted value, in other words, when the assessment function becomes one of the maximum value and the minimum value thereof.

For example, the assessment function $f(p,s)$ of a given position p and a given size s is described as follows:

$$f(p,s)=(-A_1+A_2)+(B_1-B_2) \quad (1)$$

In equation (1), $A_1$ represents the sum of pixel values of $N_0$ pixels sampled from an area of a circle having a radius of $R_0$ centered on the control point at the center of the pupil in the normalized face image. The area of the circle corresponds to a portion of the dark eye portion. $A_2$ represents the sum of pixel values of $N_1$ pixels sampled from an area of a circle having a radius of $R_1$ centered on a point spaced rightward and leftward by distance $L_1$ from the control point at the center of the pupil in the normalized face image. The area of the circle corresponds to a portion of a white of the eye. Furthermore, $B_1$ represents the sum of pixel values of $N_2$ pixels sampled from an area of a circle having a radius of $R_2$ centered on each of the control points along the upper half of the outer outline of the eye in the normalized face image. The area of the circle corresponds to a portion of the eyelid. $B_2$ represents the sum of pixel values of $N_3$ pixels sampled from an area of a circle having a radius of $R_3$ centered on each of the control points along the upper half of the inner outline of the eye in the normalized face image. The area of the circle corresponds to a portion of the eyeball exposed between the eyelids.

In equation (1), $f(p,s)=(-A_1+A_2)+(B_1-B_2)$, $A_1$ and $B_2$, associated with negative signs, are sums of pixel values expected to be darker (smaller in pixel value), and $A_2$ and $B_1$, associated with positive signs, are expected to be lighter (larger in pixel value). If the assessment function is maximized, the position p and the size s of the eye template fit most closely the eyes of the face displayed in the normalized face image.

When $A_1$ and $A_2$ required to calculate the assessment function $f(p,s)$ are determined, the number of pixels, $N_0$, sampled from the area of the circle having a radius of $R_0$ centered on the control point at the center of the pupil in the normalized face image may or may not be equal to the number of pixels, $N_1$, sampled from the area of the circle having a radium of $R_1$ centered on each of points spaced by distance $L_1$ rightward and leftward from the control point at the center of the pupil in the normalized face image. All pixels present in the area of the circle having a radius of $R_0$ centered on the control point at the center of the pupil in the normalized face image can be sampled, and all pixels present in the area of the circle having a radius of $R_1$ centered on the points spaced by distance $L_1$ rightward and leftward from the control point at the center of the pupil in the normalized face image can be sampled.

Similarly, when $B_1$ and $B_2$ required to calculate the assessment function $f(p,s)$ are determined, the number of pixels, $N_2$, sampled from the area of the circle having a radius of $R_2$ centered on each of the control points along the upper half of the outer outline of the eye in the normalized face image may or may not be equal to the number of pixels, $N_3$, sampled from the area of the circle having a radius of $R_2$ centered on each of the control points along the upper half of the inner outline of the eye in the normalized face image. All pixels present in the area of the circle having a radius of $R_2$ centered on each of the control points along the upper half of the outer outline of the eye normalized face image can be sampled, and all pixels present in the area of the circle having a radius of $R_2$ centered on each of the control points along the upper half of the inner outline of the eye in the normalized face image can be sampled.

When the assessment function f(p,s) is calculated, the sampling of the pixels from the normalized face image may or may not be performed in accordance with a rule. For example, in one rule, sampling is performed every two pixels.

To reduce the effect of differences in the luminance value and contrast from normalized face image to normalized face image, the pixel value of a pixel expected to be dark is summed into $A_1$ and $B_2$ accompanied by negative signs, and the pixel value of a pixel expected to be light is summed into $A_2$ and $B_1$ accompanied by positive signs in the assessment function $f(p,s)=(-A_1+A_2)+(B_1-B_2)$.

In the above-described case, $B_1$ accompanied by a positive sign is the sum of pixel values of $N_2$ pixels sampled from the area of the circle having a radius of $R_2$ centered on each of the control points along the upper half of the outer outline of the eye. From among the control points along the upper half of the outer outline of the eye, the pixel value of a pixel, sampled from an area of a circle $R_2$ centered on a control point in the vicinity of the eye corner, and expected to be dark, can be summed into $B_2$ accompanied by a negative sign rather than $B_1$ accompanied by a positive sign.

In the above case, the size and the position of the eye template with the assessment function providing one of the maximum value and the minimum value are determined as the size and the position fitting most closely the normalized face image. In another embodiment, the size and the position of the eye template with the assessment function thereof becoming above or below a predetermined value are determined as the size and the position fitting most closely the normalized face image. In yet another embodiment, the size and the position of the eye template with a difference between a preceding assessment function and a current assessment function rising above or falling below a predetermined threshold are determined as the size and the position fitting most closely the normalized face image.

Processing proceeds from step S202 to step S203. The eye feature point detector 202 changes the shape of the eye template with respect to the size and the position of the eye template determined in step S202. The eye feature point detector 202 thus performs a shape fitting process to fit the shape of the eye template to the eyes of the face displayed in the normalized face image.

In step S202, the eye feature point detector 202 varies the size and the position of the eye template, thereby fitting the eye template to the eyes of the face displayed in the normalized face image. In step S203, the eye feature point detector 202 performs a shape fitting process. In the shape fitting process, the eye feature point detector 202 changes to fit the shape of the eye template to the eyes of the face displayed in the normalized face image.

More specifically, in a first shape fitting operation, the eye feature point detector 202 shifts a plurality of control points corresponding to the corner of the eye, from among the control points along the outer outline of the eye template up, down, rightward, or leftward so that a line connecting the plurality of control points match the outline of the eye corner in the normalized face image as close as possible.

In a second shape fitting operation, the eye feature point detector 202 shifts a plurality of upper control points, from among the control points along the outer outline of the eye template, up or down to cause a line connecting the plurality of upper control points to match, as close as possible, the upper outline of the eye socket in the normalized face image. The eye feature point detector 202 shifts, a plurality of lower control points, from among the control points along the outer outline of the eye template, up or down to cause a line connecting the plurality of lower control points to match, as close as possible, the lower outline of the eye socket in the normalized face image.

In a third shape fitting operation, the eye feature point detector 202 shifts a plurality of control points closer to the nose, from among the control points along the outer outline of the eye template, up, down, rightward, or leftward in position to cause a line connecting the plurality of control points to match, as close as possible, the outline of the eye socket closer to the nose in the normalized face image.

In a fourth shape fitting operation, the eye feature point detector 202 shifts a plurality of control points closer to the corner of the eye, from among the control points along the inner outline of the eye template, up, down, rightward, or leftward in position to cause a line connecting the plurality of control points to match, as close as possible, the outline of the white of the eye on the side of the corner of the eye on the exposed eyeball in the normalized face image. The eye feature point detector 202 shifts a plurality of control points closer to the nose, from among the control points along the inner outline of the eye template, up, down, leftward, and rightward in position to cause a line connecting the plurality of control points to match, as close as possible, the outline of the white of the eye closer to the nose on the exposed eyeball in the normalized face image.

In a fifth fitting operation, the eye feature point detector 202 shifts a plurality of upper control points, from among the control points along the inner outline of the eye template, up or down in position to cause a line connecting the plurality of upper control points to match, as close as possible, the upper outline of the eyeball exposed from the eyelids in the normalized face image. The eye feature point detector 202 shifts a plurality of lower control points, from among the control points along the inner outline of the eye template up or down in position to cause a line connecting the plurality of lower control points match, as close as possible, the lower outline of the eyeball exposed from the eyelids in the normalized face image.

In the first through fifth fitting operations, an assessment function assessing the degree of fitness of how closely the eye template fits the eyes of the face displayed in the normalized face image is calculated with the control point shifted, as in the position/size fitting process in step S202. The assessment function that indicates the highest degree of fitness is thus detected.

The same assessment function may or may not be used for the first through fifth shape fitting operations. For example, in the second fitting operation, the plurality of upper control points, from among the control points along the outer outline of the eye template, are shifted, and the plurality of lower control points, from among the control points along the outer outline of the eye template, are shifted. In this case, the assessment function may be changed from when the plurality of upper control points are shifted to when the plurality of lower control points are shifted. With appropriate assessment functions adopted for respective set of control points, the shape of the eye template can be fit into the normalized face image at a higher accuracy level.

Some or all of the plurality of control points to be shifted can be used to calculate the assessment function. Control points, even if not considered as a candidate to be shifted, can be used to calculate the assessment function. For example, in the first shape fitting operation, the plurality of control points corresponding to the corner of the eye, from among the control points along the outer outline of the eye template, are shifted. Some or all of the plurality of control points to be shifted, corresponding to the corner of the eye, in the normalized face image are sampled and used to calculate the assessment function. Furthermore, pixels in the normalized face image at the control points other than the plurality of control points corresponding to the corner of the eye can be sampled and used to calculate the assessment function.

When the shape fitting process in step S203 is complete, an eye template having the position, the size, and the shape thereof fitted into the eye of the normalized face image, is obtained. This template is hereinafter referred to as a fitness template as appropriate. The eye feature point detector 202 determines the feature point of the normalized face image from the fitness template, and supplies the feature point, as the detailed feature point, to the chin feature point detector 204 of FIG. 11 and the face model generator 136 of FIG. 2. Processing thus ends.

The eye feature point detector 202 determines some or all of the control points of the fitness eye template as the detailed feature points of the eye in the normalized face image. Alternatively, the eye feature point detector 202 can sample points in the line connecting the control points of the fitness eye template, and determine the sampled points as the detailed feature points of the eye in the normalized face image.

As described above, the eye feature point detector 202 fits the size and the position of the eye template to the eyes in the face displayed in the normalized face image, and fits the shape of the eye template to the eyes in the face in the normalized face image with respect to the eye template having the size and the position fitted. The processing of a limited area of the normalized face image easily results in a large number of accurate feature points.

After fitting the shape of the eye template to the normalized face image in step S203, the eye feature point detector 202 returns to step S202 as indicated by an arrow-headed broken line of FIG. 13. With respect to the eye template with the shape fitted, the eye feature point detector 202 fits the size and the position of the eye template to the normalized face image. Similarly, the eye feature point detector 202 repeat steps S202 and S203 by at least one cycle. A more accurate feature point is thus obtained.

Figure 14B:
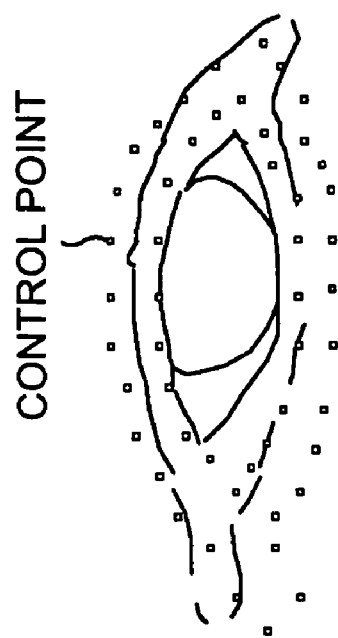
FIGS. 14A and 14B illustrate an eye template.
Figure 14A:
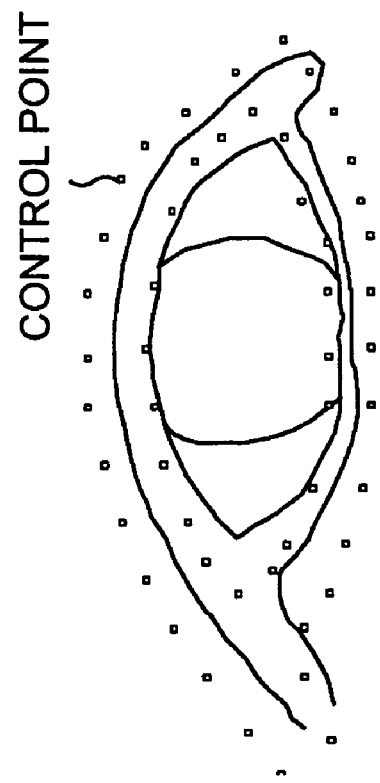

FIGS. 14A and 14B illustrate the eye template with the position and the size, fitted to the normalized face image, obtained in the position/size fitting process performed in step S202 of FIG. 13.

FIG. 14A illustrates an eye template with the position and the size thereof fitted to one normalized face image obtained in the position/size fitting process performed on the normalized face image. FIG. 14B illustrates an eye template with the position and the size thereof fitted to another normalized face image obtained in the position/size fitting process performed on the normalized face image.

In each of FIG. 14A and FIG. 14B, the size and the position of the eye template fit (match) the eyes of the normalized face image. In other words, the size and the position of the eye template approximately match the size and the position of the eyes in the normalized face image.

The shape of the eye template relatively well matches the eyes in the normalized face image as shown in FIG. 14A while the shape of the eye template fails to match well the eyes in the normalized face image as shown in FIG. 14B.

Figure 15B:
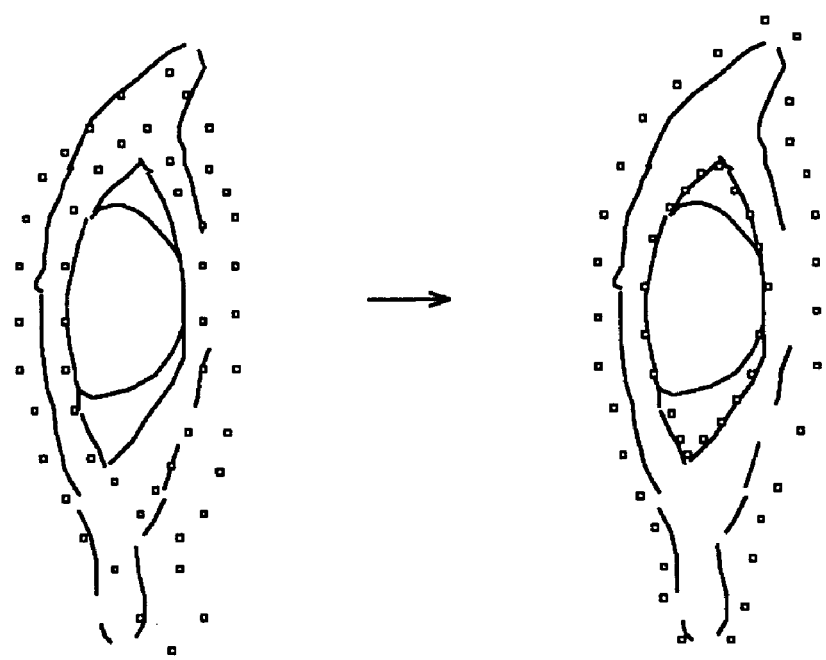
FIGS. 15A and 15B illustrate an eye template.
Figure 15A:
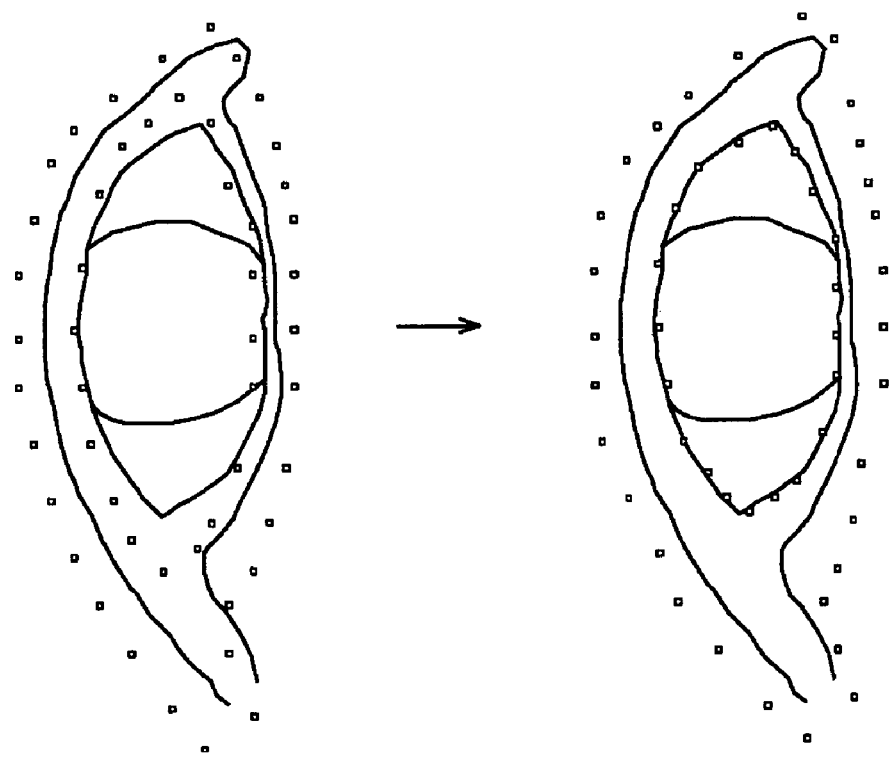

FIGS. 15A and 15B illustrate eye templates with the position, the size, and the shape fitted to the normalized face image. The eye templates are obtained by performing the shape fitting process in step S203 of FIG. 13 on the eye template with the position and the size thereof fitted to the normalized face image.

FIG. 15A illustrates the eye template that is obtained by performing the shape fitting process to the eye template of FIG. 14A. FIG. 15A illustrate the eye template that is obtained by performing the shape fitting process to the eye template of FIG. 14B.

In the resulting eye templates of FIGS. 15A and 15B, the position, the size, and the shape of the eye template fit the eyes of the normalized face image. More specifically, the position, the size, and the shape of the eye template approximately match the position, the size, and the shape of the normalized face image.

In step S203 of FIG. 13, the eye feature point detector 202 of FIG. 11 performs the shape fitting process. In the shape fitting process, the shape of the eye template is changed to fit the eyes of the face in the normalized face image. In one available method of changing the shape of the eye template, a plurality of control points forming the eye template are shifted independent of each other.

For example, an x axis extending from left to right and a y axis extending from bottom to top are assumed in the normalized face image. The displacement of a control point is represented by the position of the control point, after being shifted, expressed in coordinates (x,y) in an xy coordinate system. The shape of the eye template is defined by all coordinates (x,y) of a plurality of control points forming the eye template. Parameters defining the shape of the eye template are all coordinates (x,y) of the plurality of control points forming the eye template. The number of parameters is twice as many as the number of the control points forming the eye template (because of x coordinates and y coordinates).

If the plurality of control points forming the eye template are independently shifted, the coordinates (x,y) of the plurality of control points need to be independently provided.

As previously discussed, the eye template is composed a predetermined number of control points. The same is true of the mouth template and the chin template. It is inconvenient to independently provide coordinates (x,y) of all control points. If coordinates (x,y) of the plurality of control points are independently provided, the number of combinations of the coordinates (x,y) becomes numerous, and it takes a great deal of time to calculate the eye template having the shape fitting the eyes of the face in the normalized face image. Furthermore, if the plurality of control points forming the eye template are independently shifted, the shape of the eye template exceeds a range which the eye can take. The shape of the eye cannot fit the eyes in the normalized face image. Calculating the assessment function for the shape of the eye template unable to fit the eyes in the normalized face image is a useless task.

In the shape fitting process performed in step S203 of FIG. 13, the eye feature point detector 202 of FIG. 11 changes the shape of the eye template within a range which the eye can take by modifying coordinates (x,y) of a plurality of control points forming an eye template, as a plurality of parameters defining the eye template, based on parameters of the number that is smaller by 1 than the number of the plurality of parameters (twice the number of control points forming the eye template).

A method of modifying the coordinates (x,y) of the plurality of control points forming the eye template, based on a smaller number of parameters, is described below.

In step 203 of FIG. 13, the eye feature point detector 202 shifts the plurality of upper or lower control points, from among the control points along the outer outline of the eye template, up or down in position in the second shape fitting operation, or shifts the plurality of upper or lower control points, from among the control points along the inner outline of the eye template, up or down in position in the fifth shape fitting operation. In this case, the eye feature point detector 202 determines the coordinates $(x_n, y_n)$ of the control points to be shifted, out of the control points forming the eye template, in accordance with the following equation (2):

$$x_n = x_n',$$

$$y_n = (1-t)y_n' + t y_{max(n)} \text{ where } t \geq 0, \text{ and}$$

$$y_n = (1-(-t))y_n' + (-t)y_{min(n)} \text{ where } t < 0 \quad (2)$$

In equation (2), n is an index representing a n-th control point from among the plurality of control points to be shifted in position, $x_n$ and $y_n$ are respectively an x coordinate and a y coordinate of the n-th control point after being shifted in position, and $x_n'$ and $y_n'$ are respectively an x coordinate and a y coordinate of the n-th control point immediately before being shifted in position. Further, $y_{max(n)}$ represents a maximum value of the y coordinate of the n-th control point, and $y_{min(n)}$ is a minimum y coordinate of the n-th control point, and t represents a single parameter given to modify the coordinates (x,y) of each of the plurality of control points to be shifted in position, and is a real number falling within a range from −1 to +1.

In equation (2), $y_{max(n)}$ and $y_{min(n)}$ are predetermined values that cause the eye template to fall within the range of shape the eye can take as long as the parameter t falls within the range from −1 to +1. The shape of the eye template is represented by the control point at coordinates (x,y) provided by equation (2).

In accordance with equation (2), the plurality of control points to be shifted, namely, the plurality of upper or lower control points, from among the control points along the outer outline of the eye template, and the plurality of upper or lower control points, from among the control points along the inner outline of the eye template are shifted in coordinates (x,y) thereof in response to the modification of the single parameter t as shown in FIGS. 16A-16E. The plurality of control points are shifted in a manner such that the shape of the eye template varies within the range of shape the eye can take.

FIG. 16A illustrates control points of an eye template prior to shape changing, namely, an eye template having a position and a size thereof fitting the normalized face image. The shape of the eye template is thus similar to the shape of the eye template stored in the template memory 201 of FIG. 11.

FIG. 16B illustrates an eye template which is the one immediately prior to control point shifting, derived from the eye template of FIG. 16A, and has the control points thereof shifted to coordinates $(x_n, y_n)$ determined with the parameter t=0 in equation (2). The eye template of FIG. 16B is identical in shape to the eye template of FIG. 16A.

FIG. 16C illustrates an eye template which is the one immediately prior to control point shifting, derived from the eye template of FIG. 16A, and has the control points thereof shifted to coordinates $(x_n, y_n)$ determined by equation (2) with parameter t being 1. The eye template of FIG. 16C has a raised corner of the eye in comparison with the eye template of FIG. 16A.

FIG. 16D illustrates an eye template which is the one immediately prior to control point shifting, derived from the eye template of FIG. 16A, and has the control points thereof shifted to coordinates $(x_n, y_n)$ determined by equation (2) with parameter t being −1. The eye template of FIG. 16D has a lowered corner of the eye in comparison with the eye template of FIG. 16A.

FIG. 16E illustrates an eye template which is the one immediately prior to control point shifting, derived from the eye template of FIG. 16A, and has the control points thereof shifted to coordinates $(x_n, y_n)$ determined by equation (2) with parameter t being 0.45. The eye template of FIG. 16E has a slightly lowered corner of the eye in comparison with the eye template of FIG. 16A.

As shown in FIGS. 16A-16E, the shape of the eye template having a parameter t of 0.45 shown in FIG. 16E fits most closely the eyes of the normalized face image.

As shown in FIGS. 16A-16E, $y_{max(n)}$ is +1 and $y_{min(n)}$ is −1 in the n-th control point.

The equation of determining coordinates $(x_n, y_n)$ of the control point is not limited to equation (2). The set of control points is not limited to the plurality of upper or lower control points, from among the control points along the outer outline of the eye template, and the plurality of upper or lower control points, from among the control points along the inner outline of the eye template.

In the fourth shape fitting operation discussed with reference to step S203 of FIG. 13, the eye feature point detector 202 determines the coordinates $(x_n, y_n)$ of a plurality of control points closer to the nose in accordance with the following equation (3) if a plurality of control points closer to the nose, from among the control points along the inner outline of the eye template, are shifted:

$$x_n = (x_n' - X_{min(n)})t_x + x_{min(n)},$$

$$y_n = (1-t)y_n' + t_y y_{max(n)} \text{ where } t_y \geq 0, \text{ and}$$

$$y_n = (1-(-t))y_n' + (-t)y_{min(n)} \text{ where } t_y < 0 \quad (3)$$

where n, $x_n$, $y_n$, $x_n'$, $y_n'$, $y_{max(n)}$, and $y_{min(n)}$ are respectively identical to the counterparts in equation (2). Furthermore, $x_{min(n)}$ represents a minimum value of the x coordinate the n-th control point can take, and $t_x$ and $t_y$ are two parameters used to modify the coordinates (x,y) of each of the plurality of control points forming the eye template. The parameter $t_x$ is a real number falling within a range from 0 to +1, for example, and the parameter ty is a real number falling within a range from −1 to +1, for example.

In equation (3), $x_{min(n)}$, $y_{max(n)}$ and $y_{min(n)}$ are predetermined values that cause the eye template to fall within the range of shape the eye can take as long as the parameter $t_x$ varies within the range from 0 to +1, and the parameter $t_y$ varies within the range from −1 to +1. The shape of the eye template is represented by the control point at coordinates (x,y) provided by equation (3).

In accordance with equation (3), the plurality of control points to be shifted, namely, the plurality of control points, from among the control points along the inner outline of the eye template, are modified in coordinates (x,y) thereof based on the two parameters $t_x$ and $t_y$. As shown in FIGS. 16A-16E, the plurality of control points are shifted in a manner such that the shape of the eye template varies within the range of shape the eye can take.

Figure 17A:
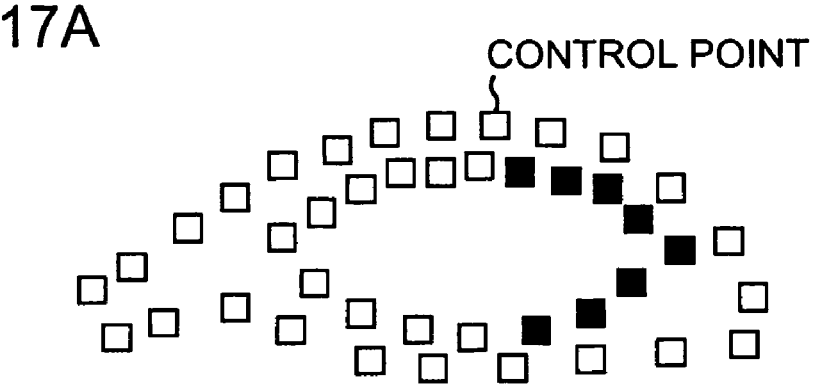
FIGS. 17A-17C illustrate a movement of the control point of the eye template.

As shown in FIG. 17A, a plurality of control points, represented solid square marks, from among the control points of the inner outline of the eye template, are closer to the nose. The plurality of control points closer the nose are shifted in position based on the two parameters $t_x$ and $t_y$ so that the shape of the eye template is shifted within a range of shape the eye can take.

Figure 17B:
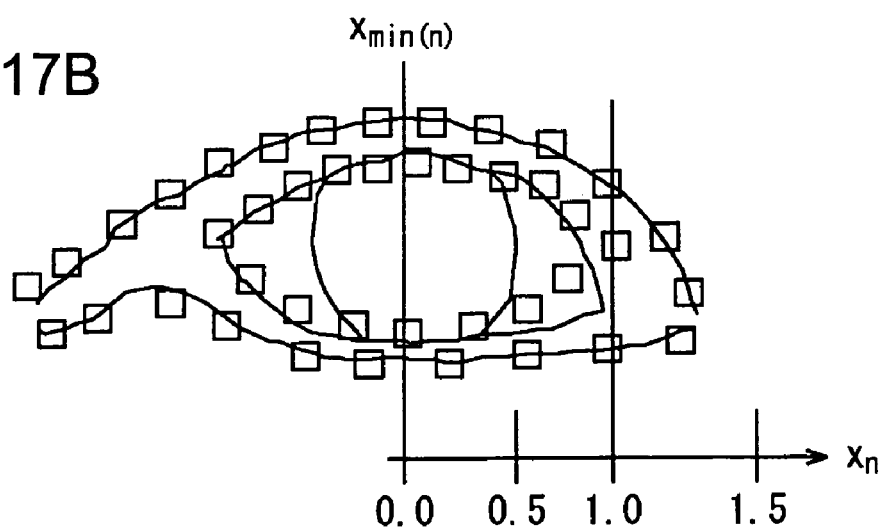

As shown in FIG. 17B, the n-th control point from among the plurality of control points closer to the nose is shifted in position in an x direction based on the parameter $t_x$ so that the x coordinate becomes $x_{min(n)}$ or larger. As shown in FIG. 17B, $x_{min(n)}$ is zero.

Figure 17C:
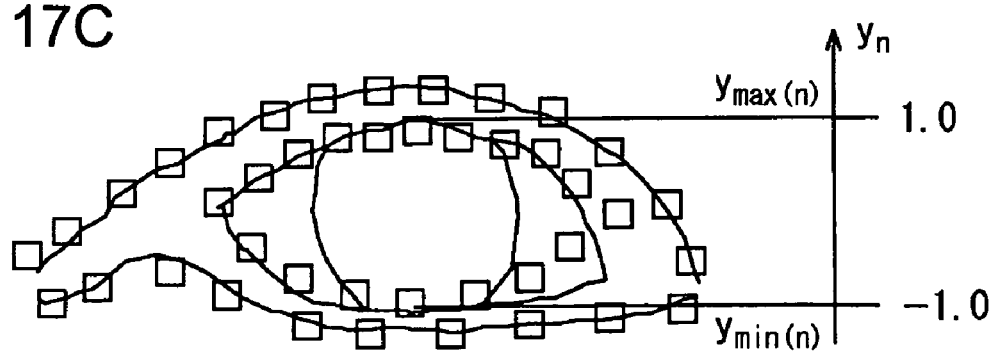

As shown in FIG. 17C, the n-th control point from among the plurality of control points closer to the nose is shifted in position in a y direction based on the parameter $t_y$ so that the y coordinate falls within a range from $y_{min(n)}$ or larger to $y_{max(n)}$ or smaller. As shown in FIG. 17C, $y_{max(n)}$ is +1 while $y_{min(n)}$ is −1.

The x coordinate and the y coordinate of the plurality of control points, as a plurality of parameters defining the shape of the eye template, are modified based on parameters t, $t_x$ and $t_y$, the number of which is smaller than the number of the plurality of parameters by at least one. The shape of the eye template having the position and the size fitting the normalized face image is changed in shape within the range of shape of the eye. More specifically, the plurality of control points forming the eye template are shifted in position in group (set). The operation of the smaller number of parameters causes the shape of the eye template to fit the normalized face image. The shape of the eye template is thus easily fitted to the normalized face image.

In the shape fitting process, the line connecting the control points of the outer outline, from the control points forming the eye template, is shifted to be in alignment with the outline of the eye socket in the normalized face image, and then, the line connecting the control points of the inner outline is shifted in position to be in alignment with the exposed portion of the eyeball in the normalized face image.

In this way, the line connecting the control points of the outer outline is shifted to be in alignment with the outline of the eye socket in the normalized face image, and then the line connecting the inner outline is shifted. The range of shifting of the control points of the inner outline is thus restricted, and the shape fitting process is thus further facilitated.

If the control points of the inner outline is placed outside the area defined by lines connecting the control points of the outer outline, the shape of the eye template falls outside the area of the eye shape. The position to which the control point of the inner outline is shifted is limited to the area enclosed by the line connecting the control points of the outer outline. In this way, the workload involved in the shape fitting process is reduced.

The process of the mouth feature point detector 203 of FIG. 11 is described below with reference to a flowchart of FIG. 18.

The process flow performed by the mouth feature point detector 203 is generally identical to the process of FIG. 13 performed by the eye feature point detector 202 except that the region of the face to be processed is the mouth rather than the eyes.

In step S211, the mouth feature point detector 203 determines the default values of the size and the position of the mouth template from the template memory 201, based on the normalized face image from the normalized face image memory 133 of FIG. 2 and the information of the mouth region out of the region information from the standard feature point extractor 134.

The mouth template is composed of many control points arranged in a horizontal line. The mouth feature point detector 203 expands or contracts the mouth template in size so that the horizontal length of the rectangular area represented by the information of the mouth region in the normalized face image matches the horizontal length of the mouth template. The mouth feature point detector 203 positions one of the expanded mouth template and the contracted mouth template in the normalized face image so that the one of the expanded mouth template and the contracted mouth template is centered on the vertical center point of the rectangular region represented by the mouth region information and is inscribed in the rectangular region. The size and the position of the mouth template arranged in the normalized face image in step S211 are respective default values thereof. The default values of the size and the position of the mouth template are respectively referred to as a default size and a default position.

Processing proceeds from step S211 to step S212. The mouth feature point detector 203 gradually varies the size and the position of the mouth template from the default size and the default position thereof so that the mouth template fits the face displayed in the normalized face image. This process is referred to as a position/size fitting process.

In the position/size fitting process in step S212, the mouth feature point detector 203 varies the size and the position of the mouth template with the similarity thereof maintained to the original shape, and calculates an assessment function. The assessment function assesses the degree of fitness of how closely the mouth template with the size and the position thereof varied fits the mouth (border between the upper lip and the lower lip) of the face displayed in the normalized face image.

The mouth feature point detector 203 expands or contracts the mouth template with the similarity to the original shape maintained, thereby changing the size of the mouth template. The mouth feature point detector 203 translates the control points of the entire mouth template with the shape thereof maintained, thereby shifting the position of the mouth template. In addition to the translation of the mouth template, the mouth feature point detector 203 can rotate the mouth template about any control point, thereby changing the position of the mouth template.

The mouth feature point detector 203 determines the size and the position of the mouth template when the assessment function results in the most closely fit value, in other words, when the assessment function becomes one of the maximum value and the minimum value thereof.

Processing proceeds from step S212 to step S213. The mouth feature point detector 203 changes the shape of the mouth template with respect to the size and the position of the mouth template determined in step S212. The mouth feature point detector 203 thus performs a shape fitting process to fit the shape of the mouth template to the mouth in the face displayed in the normalized face image.

In step S212, the mouth feature point detector 203 varies the size and the position of the mouth template, thereby fitting the mouth template to the mouth in the face displayed in the normalized face image. In step S213, the mouth feature point detector 203 performs a shape fitting process. In the shape fitting process, the mouth feature point detector 203 fits the shape of the mouth template to the mouth of the face displayed in the normalized face image.

More specifically, the mouth feature point detector 203 shifts at least one of the control points forming the mouth template, and gradually thereafter reduces the number of control points to be shifted.

In the shape fitting process, as the eye feature point detector 202, the mouth feature point detector 203 selects all control points forming the mouth template as control point candidates to be shifted, and shifts in unison all selected control points. More specifically, the mouth feature point detector 203 modifies the x coordinate and the y coordinate of each of the plurality of control points, as a plurality of parameters defining the mouth template, based on parameters, the number of which is at least 1 and smaller than the number of the plurality of parameters defining the mouth template. The mouth feature point detector 203 changes the shape of the mouth template (with the position and the size thereof fitting the normalized face image) within a range of shape of the mouth. The operation of the parameters of a smaller number thus causes the shape of the mouth template to match the mouth in the normalized face image as close as possible.

As the eye feature point detector 202, the mouth feature point detector 203 selects, as control point candidates to be shifted, left half of the plurality of control points, for example, and shifts all control point candidates in unison. The mouth feature point detector 203 thus causes the shape of the mouth template to fit the mouth in the normalized face image.

As the eye feature point detector 202, the mouth feature point detector 203 selects, as control point candidates to be shifted, right half of the plurality of control points, and shifts all control point candidates in unison. The mouth feature point detector 203 thus causes the shape of the mouth template to fit the mouth in the normalized face image.

The mouth feature point detector 203 successively selects, as control point candidates, a plurality of control points near the center of the mouth, a plurality of control points near the midway point between the left end of the mouth and the center of the mouth, and a plurality of control points near the midway point between the right end of the mouth and the center of the mouth, from among the control points forming the mouth template. As the eye feature point detector 202, the mouth feature point detector 203 shifts all control point candidates in unison to cause the shape of the mouth template to fit the mouth in the normalized face image.

The mouth feature point detector 203 selects and shifts, as a control point candidate, the control points forming the mouth template one by one to cause the shape of the mouth template to fit the mouth in the normalized face image. In this case, the movement of the control point is performed so that the shape of the mouth template falls within the region of the mouth in the normalized face image. Since the control points are shifted one by one, the shifting operation is performed by directly providing coordinates (x,y) of the control point to be shifted.

The process of fitting the shape of the mouth template to the mouth in the normalized face image is performed as previously discussed in the position/size fitting process in step S202 of FIG. 13. As for each shifted control point, the assessment function assessing the degree of fitness of how closely the mouth template fits the mouth of the face displayed in the normalized face image is calculated.

When the shape fitting process in step S213 is complete, the mouth template having the position, the size, and the shape fitting the mouth in the normalized face image is obtained (hereinafter referred to as a fitness mouth template). The mouth feature point detector 203 determines, from the fitness mouth template, a feature point of the mouth in the normalized face image, and supplies the feature point as a detailed feature point to the chin feature point detector 204 of FIG. 11 and the face model generator 136 of FIG. 2. Processing then ends.

The mouth feature point detector 203 determines some or all of the control points forming the fitness mouth template as the detailed feature points of the mouth in the normalized face image. Alternatively, the mouth feature point detector 203 can sample points in a line connecting the control points of the fitness mouth template, and determine the sampled points as the detailed feature points of the mouth in the normalized face image.

As the eye feature point detector 202 of FIG. 11, the mouth feature point detector 203 fits the size and the position of the mouth template to the mouth in the face displayed in the normalized face image, and fits the shape of the mouth template to the mouth in the face in the normalized face image with respect to the mouth template having the position and the size fitted. A large number of detailed feature points are thus easily acquired.

When a plurality of control points of the mouth template are shifted in position, the mouth feature point detector 203, as the eye feature point detector 202, modifies the x coordinate and the y coordinate of each of the plurality of control points, as a plurality of parameters defining the shape of the mouth template, based on parameters, the number of which is at least 1 and smaller than the number of the plurality of parameters defining the shape of the mouth template. The shape of the mouth template (having the position and the size fitting the normalized face image) is thus changed within the range of shape of the mouth. The shape of the mouth template is thus easily fitted to the normalized face image.

Since the mouth feature point detector 203 gradually reduces the control points to be shifted, the convergence of the assessment function is improved. The mouth feature point detector 203 prevents one control point from shifting to a position extremely distant from another control point.

When the mouth feature point detector 203 gradually reduces the number of control points in the mouth template to be shifted, the area within which a control point can be shifted is also gradually narrowed.

As the eye feature point detector 202 of FIG. 11, the mouth feature point detector 203 returns to step S212 as represented by an arrow-headed broken line after fitting the shape of the mouth template to the normalized face image in step S213. The mouth feature point detector 203 fits the size and the position of the mouth template to the normalized face image with reference to the mouth template having the shape thereof fitted. Likewise, steps S212 and S213 are repeated at least one cycle. Highly accurate feature points are thus obtained.

Figure 18:
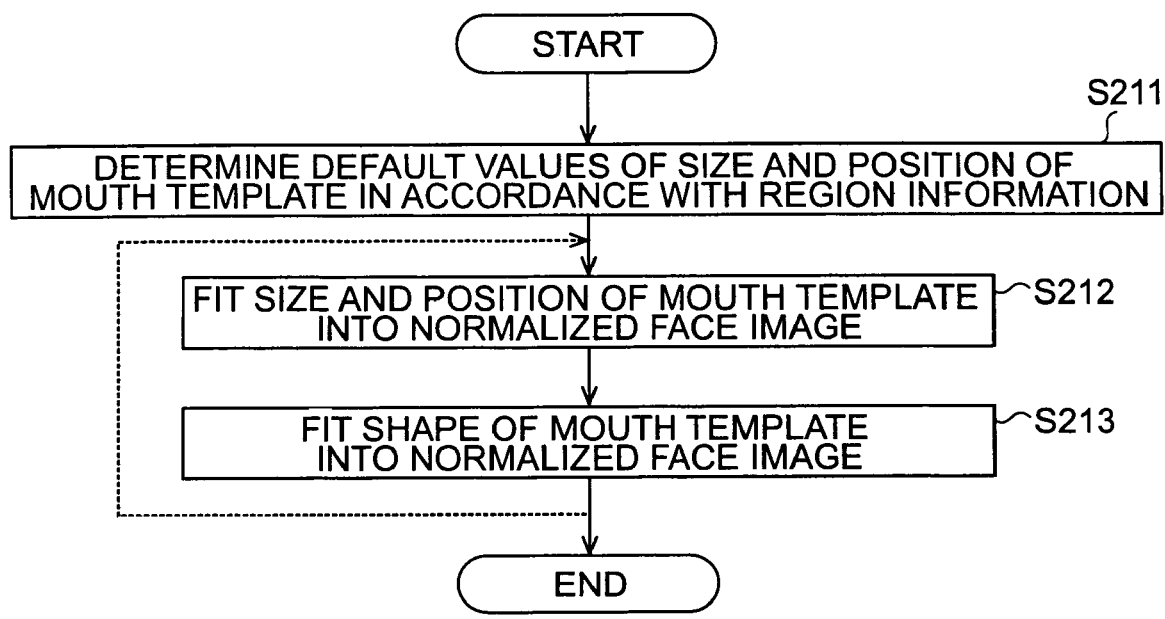
FIG. 18 is a flowchart illustrating the process of a mouth feature point detector.

As shown in FIG. 18, the mouth feature point detector 203 determines the default size and the default position of the mouth template from the template memory 201 based on the information of the mouth region out of the region information from the standard feature point extractor 134 of FIG. 2. The default size and the default position of the mouth template are determined based on the detailed feature points of the eyes obtained by the eye feature point detector 202.

For example, the midway point between the feature point at the center of the pupil of the right eye and the feature point at the center of the pupil of the left eye is regarded as the center of the eyes displayed in the normalized face image. The position of the horizontal center of the mouth template, namely, the point dividing the mouth template into two equal horizontal segments is aligned with the center of the eyes if viewed vertically. The vertically extending center line of the mouth template is aligned with the vertically extending center line of a rectangular area represented by the information of the mouth region. Furthermore, the size and the position of the mouth template not overextending the rectangular area represented by the information of the mouth region are handled as a default size and a default position.

The process of the eye feature point detector 202 can be performed prior to the process of the mouth feature point detector 203, or vice versa. The process of the eye feature point detector 202 and the process of the mouth feature point detector 203 can be concurrently performed. However, if the mouth feature point detector 203 determines the default size and the default position of the mouth template based on the detailed feature points of the eyes obtained by the eye feature point detector 202, the process of the eye feature point detector 202 is performed first, and after obtaining the detailed feature points of the eyes, the mouth feature point detector 203 performs the process thereof.

Figure 19B:
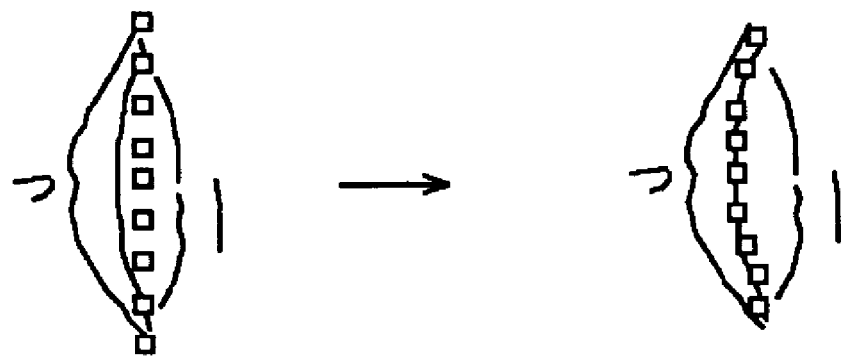
FIGS. 19A and 19B illustrate a mouth template.
Figure 19A:
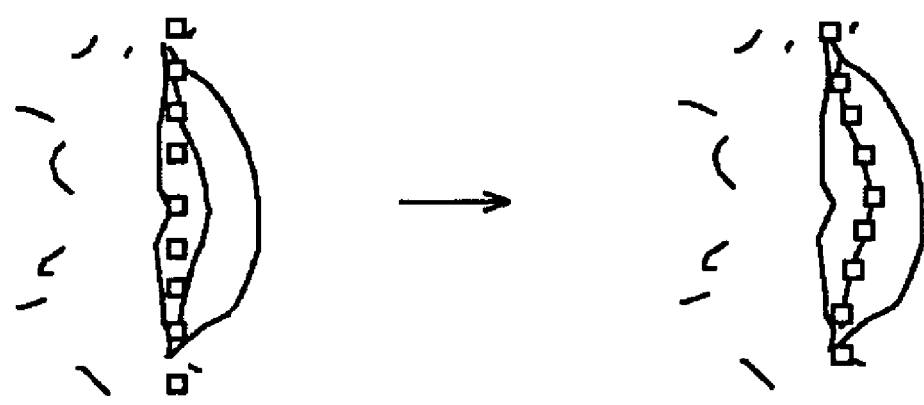

FIG. 19A illustrates a mouth template having the position and the size fitting the normalized face image and obtained in the position/size fitting process in step S212 of FIG. 18. FIG. 19B illustrates a mouth template having the position, the size, and the shape fitting the normalized face image, obtained in the shape fitting process in step S213 of FIG. 18 based on the mouth template of FIG. 19A.

More specifically, a top portion of FIG. 19A illustrates a mouth template having the position and the size thereof fitting one normalized face image, obtained in the position/size fitting process performed on the normalized face image. A top portion of FIG. 19B illustrates a mouth template having the position and the size thereof fitting another normalized face image, obtained in the position/size fitting process performed on the normalized face image.

In each of the top portions of FIGS. 19A and 19B, the size and the position of the mouth template fits the border between the upper lip and the lower lip (mouth) of the normalized face image. More specifically, the size and the position of the mouth template approximately match the size and the position of the normalized face image, respectively.

However, the shape of the mouth template fails to match the mouth in the normalized face image.

A bottom portion of FIG. 19A illustrates the mouth template that is obtained by performing the shape fitting process on the mouth template shown in the top portion of FIG. 19A. A bottom portion of FIG. 19B illustrates the mouth template that is obtained by performing the shape fitting process on the mouth template shown in the bottom portion of FIG. 19A.

In each of the mouth templates of the bottom portions of FIGS. 19A and 19B, the position, the size, and the shape of the mouth template fit the mouth in the normalized face image. More specifically, the position, the size, and the shape of the mouth template approximately match the position, the size, and the shape of the border between the upper lip and the lower lip (mouth) in the normalized face image, respectively.

Figure 20:
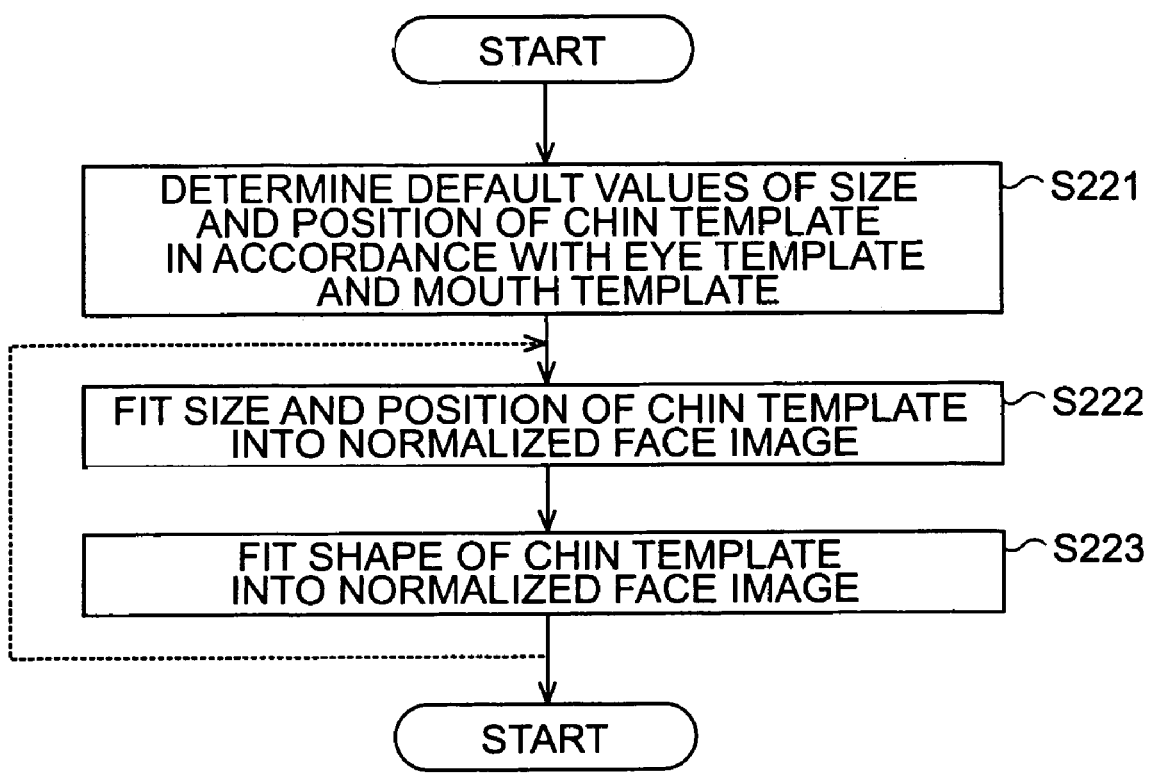
FIG. 20 is a flowchart illustrating the process of a chin feature point detector.

The process of the chin feature point detector 204 of FIG. 11 is described below with reference to a flowchart of FIG. 20.

The process of the chin feature point detector 204 is performed on the chin rather than the eyes in the face, and is generally similar to the process of the eye feature point detector 202 discussed with reference to FIG. 13.

In step S221, the chin feature point detector 204 determines default values of the size and the position of the chin template from the template memory 201, based on the normalized face image from the normalized face image memory 133 of FIG. 2, the detailed feature points of the eyes from the eye feature point detector 202 of FIG. 11, and the detailed feature points of the mouth from the mouth feature point detector 203.

The chin feature point detector 204 regards, as the center of the eyes displayed in the normalized face image, the midway point between the feature point at the center of the pupil of the right eye and the feature point at the center of the pupil of the left eye. The chin feature point detector 204 regards, as the center of the mouth of the person displayed in the normalized face image, the detailed feature point as the center control point, from among the detailed feature points of the mouth (for example, the control point positioned at the center of the mouth template before being fitted to the normalized face image). A line connecting the center of the eyes and the center of the mouth (hereinafter referred to as a center line) is determined.

The chin feature point detector 204 determines the length between the center of the eyes and the center of the mouth, and expands or contracts the chin template in response to the determined length.

The chin feature point detector 204 determines a point in a line extended along the center line from the center of the mouth. The point is distanced from the center of the mouth by a predetermined multiple of the determined length between the center of the eyes and the center of the mouth. The point is hereinafter referred to as a lower chin standard position. The chin template is placed in the normalized face image so that the control point at the center of the lower chin in the chin template is aligned with the lower chin standard position.

As described above, the chin template is composed of control points arranged in a semi-oval shape as a typical outline of the face. The number of control points needs to be sufficient enough to reproduce the outline of the lower chin. A control point referred to as the center of the lower chin is arranged at the lowest point of the semi-oval lower chin. The chin feature point detector 204 places the chin template in the normalized face image so that the control point is aligned with the lower chin standard position and so that the center line is perpendicular to a line tangential to the outline of the lower chin at the control point. The size and the position of the chin template arranged in the normalized face image in step S221 are respective default values thereof. The default values of the size and the position of the chin template are referred to as a default size and a default position, respectively.

Processing proceeds from step S221 to step S222. The chin feature point detector 204 gradually varies the size and the position of the chin template from the default size and the default position thereof so that the chin template fits the face displayed in the normalized face image. This process is referred to as a position/size fitting process.

In the position/size fitting process in step S222, the chin feature point detector 204 varies the size and the position of the chin template with the similarity thereof maintained to the original shape, and calculates an assessment function. The assessment function assesses the degree of fitness of how closely the chin template with the size and the position thereof varied fits the outline of the face, in particular, the lower chin of the face displayed in the normalized face image.

The chin feature point detector 204 expands or contracts the chin template with the similarity to the original shape maintained, thereby changing the size of the chin template. The chin feature point detector 204 translates the control points of the entire chin template with the shape thereof maintained, thereby shifting the position of the chin template. In addition to the translation of the chin template, the chin feature point detector 204 can rotate the chin template about any control point, thereby changing the position of the chin template.

The chin feature point detector 204 determines the size and the position of the chin template when the assessment function results in the most closely fitted value.

Processing proceeds from step S222 to step S223. The chin feature point detector 204 changes the shape of the chin template with respect to the size and the position of the chin template determined in step S222. The mouth chin feature point detector 204 thus performs a shape fitting process to fit the shape of the chin template to the outline of the face, in particular, the lower chin of the face displayed in the normalized face image.

In step S222, the chin feature point detector 204 varies the size and the position of the chin template, thereby fitting the chin template to the lower chin of the face displayed in the normalized face image. In step S223, the chin feature point detector 204 performs a shape fitting process. In the shape fitting process, the chin feature point detector 204 fits the shape of the chin template to the lower chin of the face displayed in the normalized face image.

In the shape fitting process, the chin feature point detector 204 shifts the plurality of control points of the chin template as the mouth feature point detector 203. More specifically, the chin feature point detector 204 modifies the x coordinate and the y coordinate of each of the plurality of control points, as a plurality of parameters defining the chin template, based on parameters, the number of which is at least 1 and smaller than the number of the plurality of parameters defining the chin template. The operation of the parameters of a smaller number thus causes the shape of the chin template to match the lower chin in the normalized face image as close as possible. This process is repeated with the number of control points to be shifted reduced each time.

When the chin feature point detector 204 has completed the shape fitting process in step S223, the chin template having the position, the size, and the shape fitting the lower chin in the normalized face image is obtained (hereinafter referred to as a fitness chin template). The chin feature point detector 204 determines, from the fitness chin template, a feature point of the outline of the face, in particular the lower chin of the face in the normalized face image, and supplies the feature point as a detailed feature point to the face model generator 136 of FIG. 2. Processing then ends.

The chin feature point detector 204 determines some or all of the control points forming the fitness chin template as the detailed feature points of the lower chin in the normalized face image. Alternatively, the chin feature point detector 204 can sample points in a line connecting the control points of the fitness chin template, and determine the sampled points as the detailed feature points of the lower chin in the normalized face image.

As the eye feature point detector 202 and the mouth feature point detector 203, the chin feature point detector 204 easily fits the chin template to the normalized face image. Many highly accurate feature points are easily obtained.

As the eye feature point detector 202 of FIG. 11, the chin feature point detector 204 returns to step S222 as represented by an arrow-headed broken line after fitting the shape of the chin template to the normalized face image in step S223. The chin feature point detector 204 fits the size and the position of the chin template to the normalized face image with reference to the chin template having the shape thereof fitted. Likewise, steps S222 and S223 are repeated at least one cycle. Highly accurate feature points are thus obtained.

Referring to FIGS. 21 through 24, the standard feature points obtained by the standard feature point extractor 134 of FIG. 2, and the detailed feature points obtained by the detailed feature point extractor 135 of FIG. 2 are further discussed.

Figure 21:
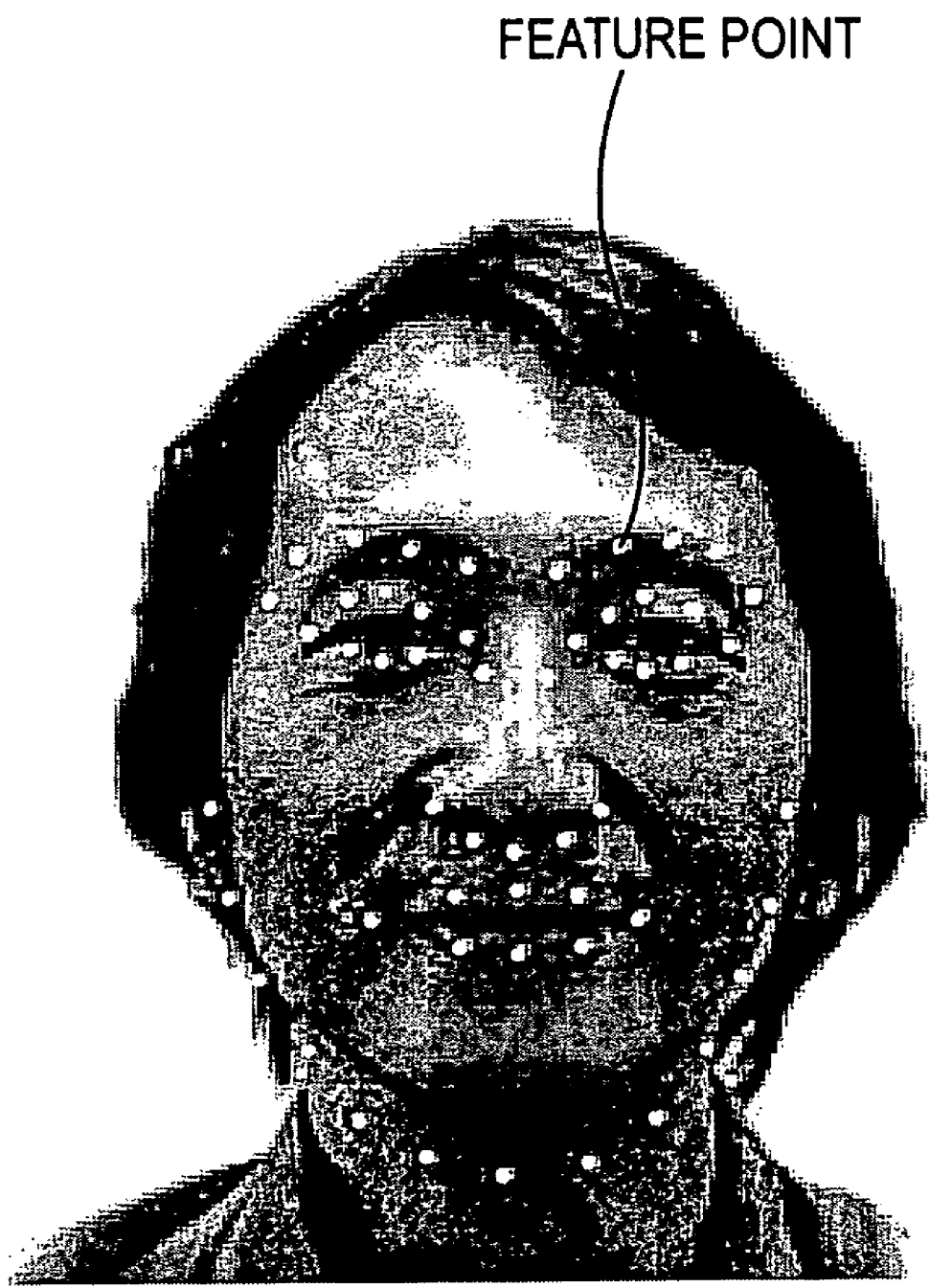
FIG. 21 illustrates standard feature points.
Figure 22:
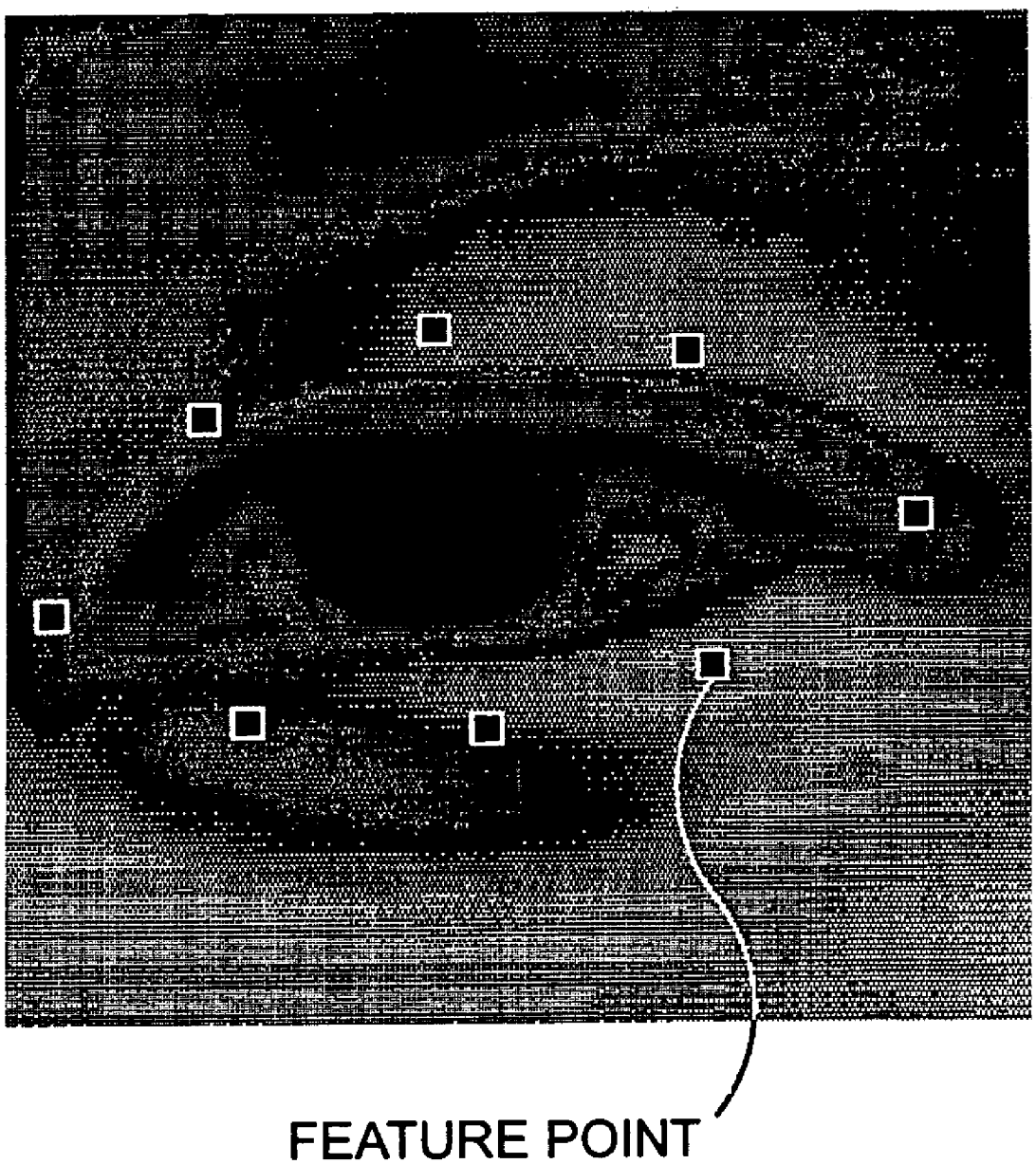
FIG. 22 illustrates standard feature points.

FIGS. 21 and 22 illustrate the standard feature points the standard feature point extractor 134 determines using the AAM technique, for example.

FIG. 21 illustrates the standard feature points of the entire face, and FIG. 22 illustrates the standard feature points of the eye region as one area of the face.

As shown in FIGS. 21 and 22, the standard feature points are not so many in number and not so high in accuracy. The eyes, the mouth, the lower chin, and the nose are sprinkled with the standard feature points as shown in FIG. 21. As for the eyes, the standard feature points are arranged in the vicinity of the eyes as shown in FIG. 22. The outline of the portion of the eyeball exposed from the eyelids and the outline of the eye socket are not accurately shown in position.

Figure 23:
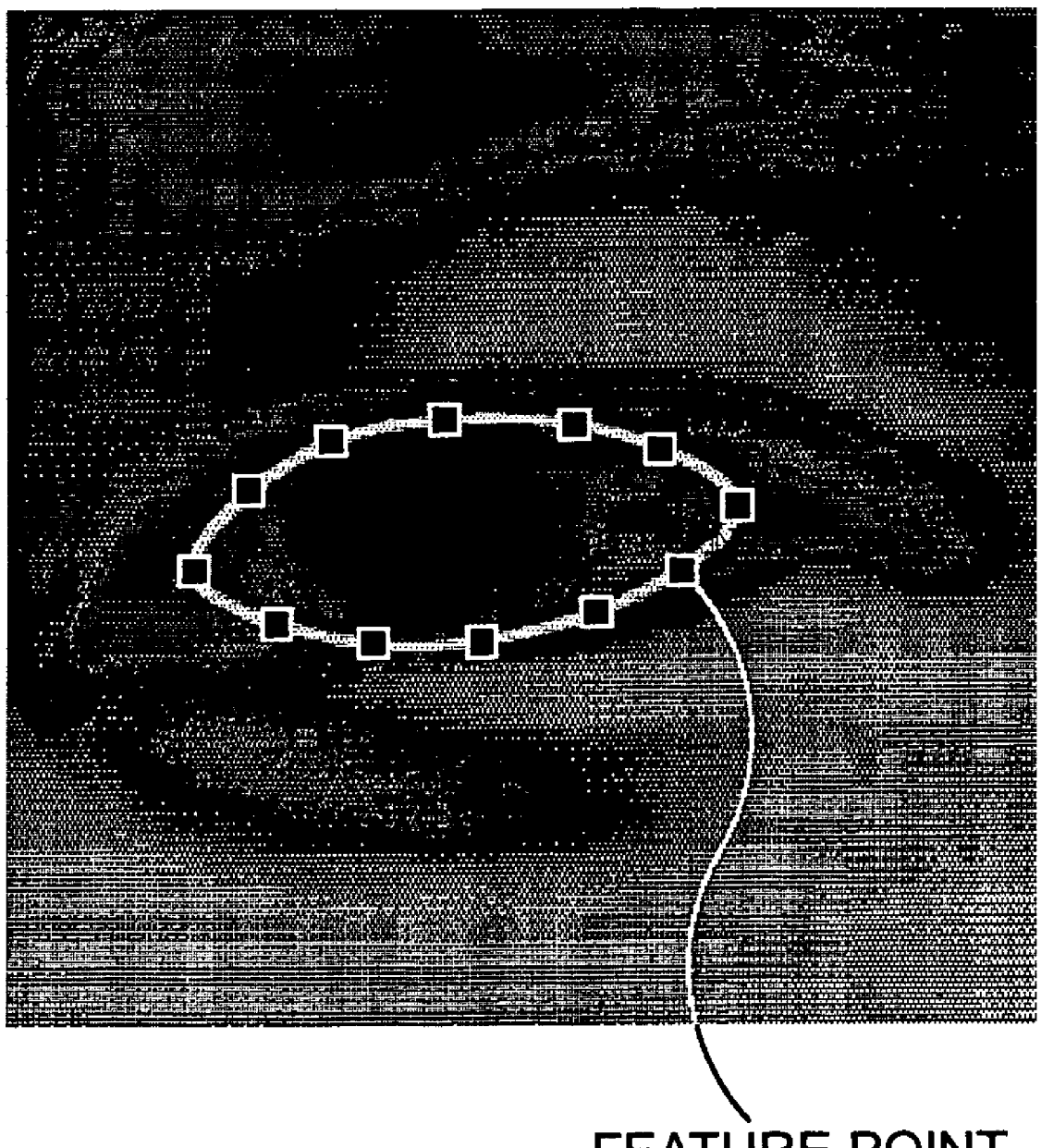
FIG. 23 illustrates detailed feature points.
Figure 24:
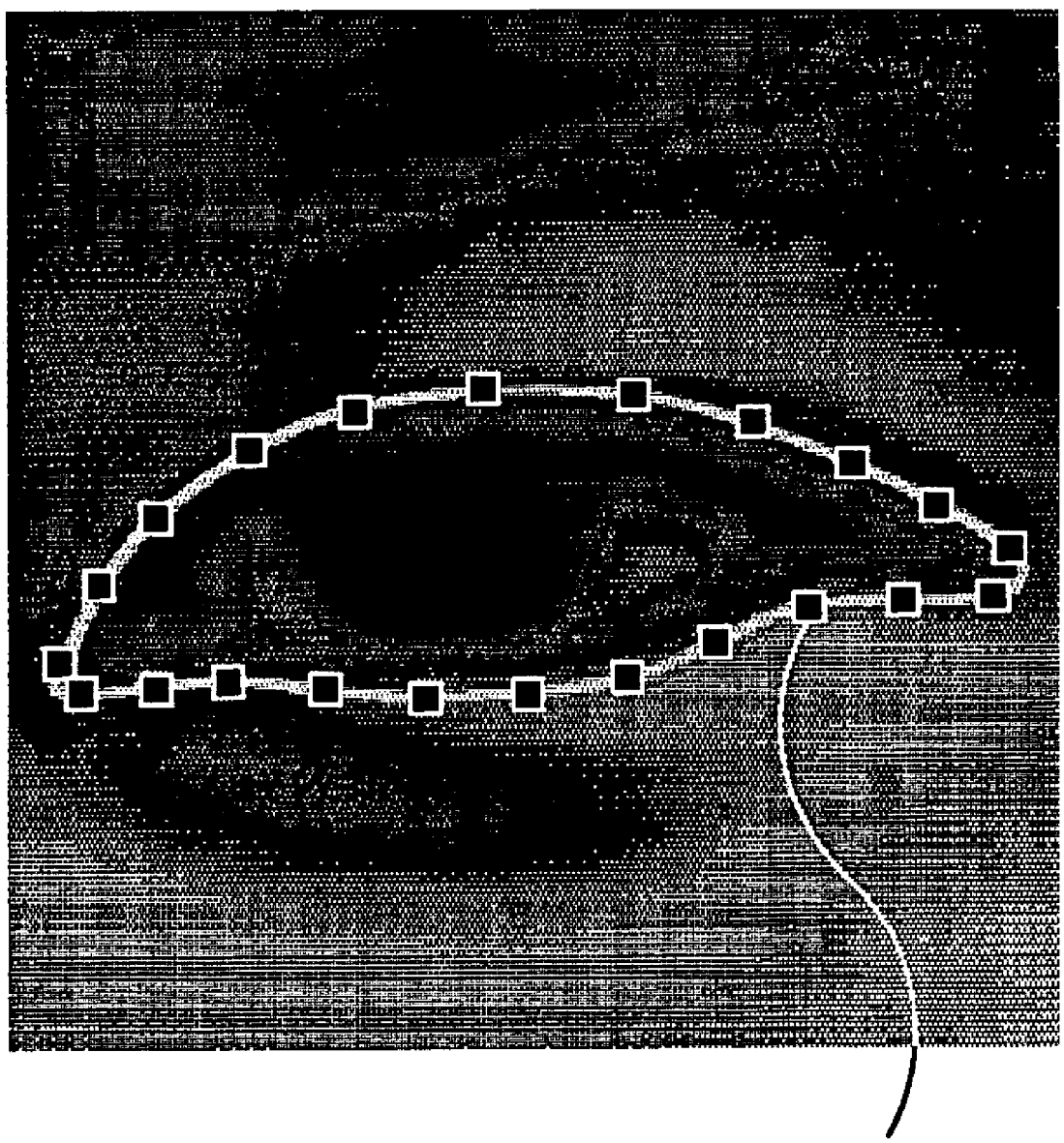
FIG. 24 illustrates detailed feature points.

FIGS. 23 and 24 illustrate the detailed feature points obtained by the detailed feature point extractor 135.

FIG. 23 illustrates the detailed feature points derived from the control points along the inner outline of the eye template, and FIG. 24 illustrates the detailed feature points derived from the control points along the outer outline of the eye template.

As shown in FIG. 23, the detailed feature points derived from the control points along the inner outline of the eye template accurately show the position of the outline of the exposed portion of the eyeball. The detailed feature points derived from the control points along the inner outline of the eye template are sufficient in number enough to reproduce the outline of the exposed portion of the eyeball with a line connecting the detailed feature points.

As shown in FIG. 24, the detailed feature points derived from the control points along the outer outline of the eye template accurately indicate the position of the border between the eye socket and the eyelids. Furthermore, the border between the eye socket and the eyelids is accurately reproduced by connecting the detailed feature points derived from the control points along the outer outline of the eye template.

Figure 25:
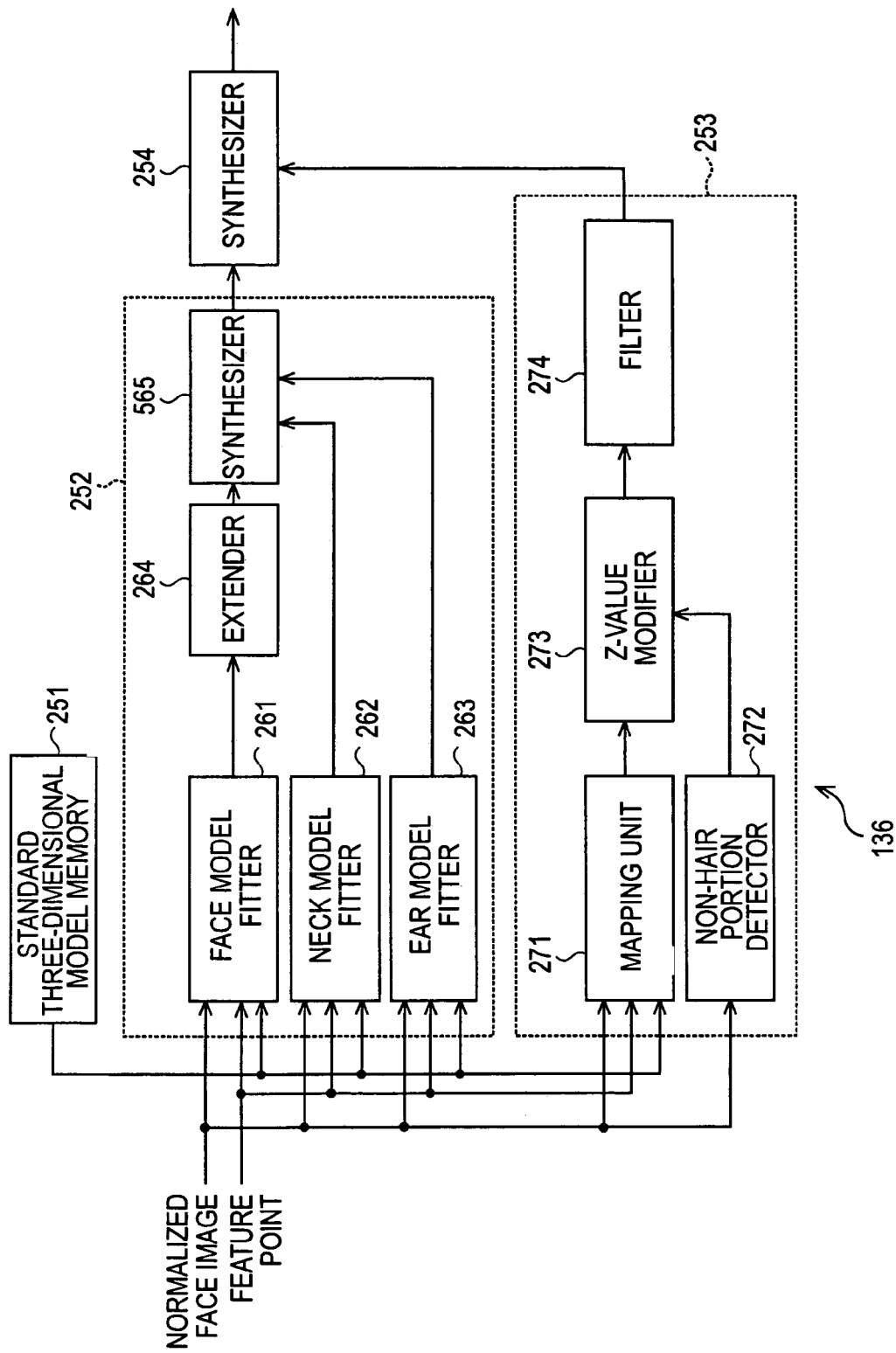
FIG. 25 is a block diagram illustrating a face model generator.

FIG. 25 is a block diagram illustrating the structure of the face model generator 136 of FIG. 2.

The face model generator 136 includes a standard 3D model memory 251, a face model processor 252, a hair model processor 253, and a synthesizer 254.

The standard 3D model memory 251 stores a face model having a 3D shape of a standard face, a neck model having a 3D shape of a standard neck, an ear model having a 3D shape of standard left and right ears, and a hair model having a 3D shape of standard hair. The face model, the neck model, the ear model, and the hair model are prepared beforehand, and stored in the standard 3D model memory 251. The face model, the neck model, and the ear model can be those modeling a real person, but are virtual models herein. For example, the face model used herein is perfectly bilaterally symmetrical.

The face model, the neck model, and the ear model, stored in the standard 3D model memory 251, are supplied to the face model processor 252, and the hair model is supplied to the hair model processor 253.

The face model processor 252 includes a face model fitter 261, a neck model fitter 262, an ear model fitter 263, an extender 264, and a synthesizer 265.

The face model fitter 261 receives the normalized face image from the normalized face image memory 133, the detailed feature point from the detailed feature point extractor 135, and the face model from the standard 3D model memory 251. The face model fitter 261 fits the face model from the standard 3D model memory 251 to the face displayed in the normalized face image from the normalized face image memory 133, based on the detailed feature points from the detailed feature point extractor 135. In this way, the face model as a 3D model of the face displayed in the normalized face image is generated and supplied to the extender 264.

The neck model fitter 262 receives the normalized face image from the normalized face image memory 133, the detailed feature points from the detailed feature point extractor 135, and the neck model from the standard 3D model memory 251. The neck model fitter 262 fits the neck model from the standard 3D model memory 251 to the neck displayed in the normalized face image from the normalized face image memory 133, based on the detailed feature points from the detailed feature point extractor 135. The neck model as a 3D model of the neck displayed in the normalized face image is thus generated and then supplied to the synthesizer 265.

The ear model fitter 263 receives the normalized face image from the normalized face image memory 133, the detailed feature points from the detailed feature point extractor 135, and the ear model from the standard 3D model memory 251. The ear model fitter 263 fits the ear model from the standard 3D model memory 251 to the ears displayed in the normalized face image from the normalized face image memory 133, based on the detailed feature points from the detailed feature point extractor 135. The ear model as a 3D model of the ears displayed in the normalized face image is thus generated, and then supplied to the synthesizer 265.

The extender 264 extends a lateral portion of the face model supplied from the face model fitter 261 in a Z direction as the direction of depth, and supplies the resulting face model to the synthesizer 265.

The synthesizer 265 synthesizes both the neck model supplied from the neck model fitter 262 and the ear model supplied from the ear model fitter 263 with the face model supplied from the extender 264, and supplies the face model with the neck model and the ear model synthesized therewith to the synthesizer 254.

The hair model processor 253 includes a mapping unit 271, a non-hair portion detector 272, a Z value modifier 273, and a filter 274.

The mapping unit 271 receives the normalized face image from the normalized face image memory 133 of FIG. 2, the detailed feature points from the detailed feature point extractor 135, and the hair model from the standard 3D model memory 251. Based on the detailed feature points from the detailed feature point extractor 135, the mapping unit 271 maps the hair model from the detailed feature point extractor 135 to a head displayed in the normalized face image from the normalized face image memory 133, and then supplies the resulting hair model to the Z value modifier 273.

The non-hair portion detector 272 receives the normalized face image from the normalized face image memory 133. The non-hair portion detector 272 detects a non-hair portion from the normalized face image supplied from the normalized face image memory 133, and supplies information of the non-hair portion to the Z value modifier 273.

The Z value modifier 273 detects a portion, mapped to the non-hair portion of the hair model supplied from the mapping unit 271 (namely, the hair model mapped to the head in the normalized face image), from information about the non-hair potion from the non-hair portion detector 272, modifies a Z value of the portion mapped to the non-hair portion, and supplies the Z value to the filter 274.

The filter 274 filters the Z value of the hair model modified by the Z value modifier 273 with a low-pass filter, and supplies a filtered hair model to the synthesizer 254.

The synthesizer 254 synthesizes the face model supplied from the synthesizer 265 in the face model processor 252 with the hair model supplied from the filter 274 in the hair model processor 253, and supplies the face model memory 137 of FIG. 2 with the face model with the hair model synthesized therewith for storage, as a finalized face model.

The process of the face model fitter 261 of FIG. 25 is described below with reference to FIGS. 26 through 28.

Figure 26:
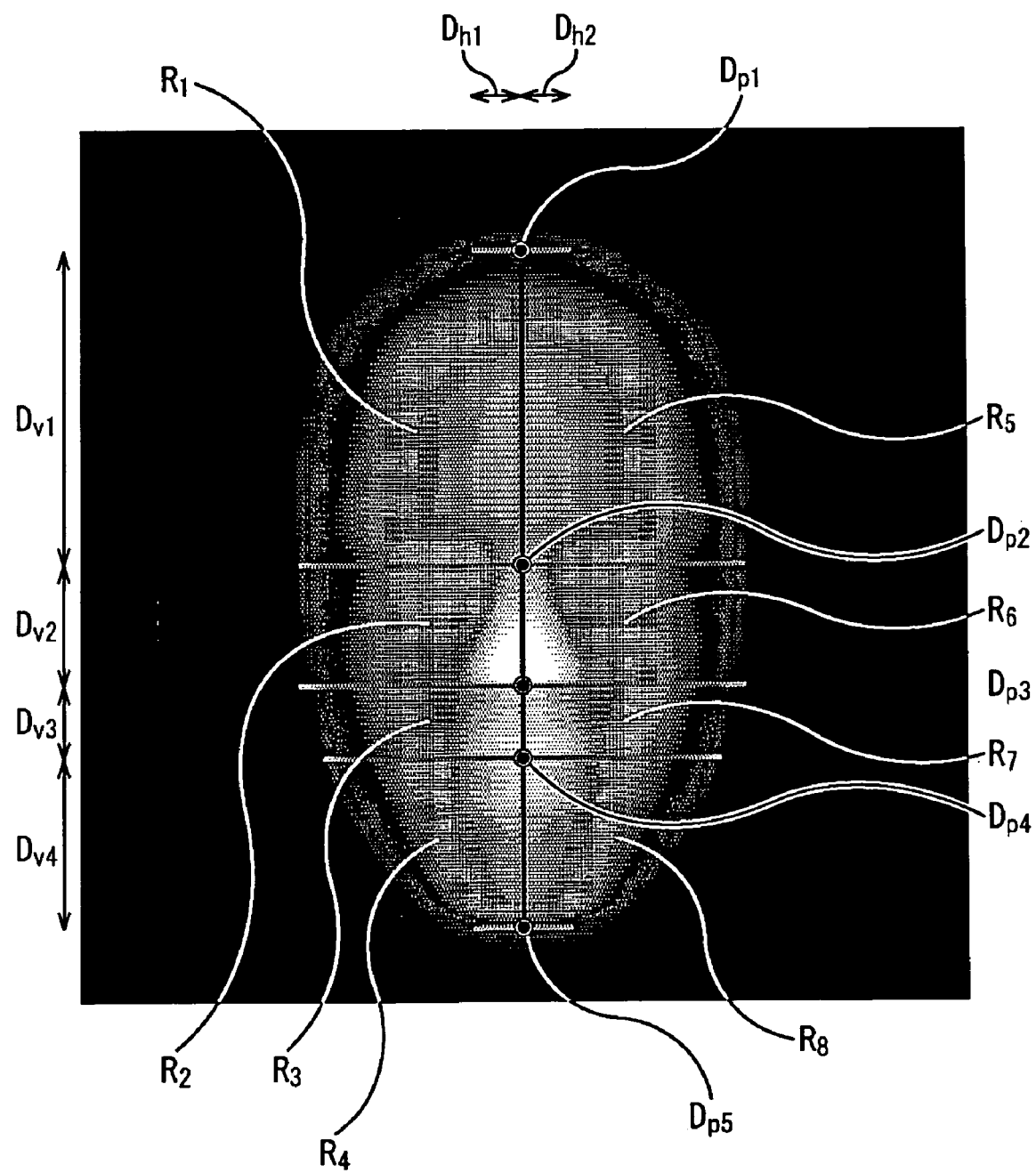
FIG. 26 illustrates a standard face model.

FIG. 26 illustrates a face model stored in the standard 3D model memory 251.

The face model stored in the standard 3D model memory 251 is a 3D model of a standard face looking fullface, and has xyz coordinates (x,y,z) at each point thereof. The coordinates (x,y,z) have the x axis aligned in a horizontal direction, the y axis aligned in a vertical direction, and the z axis aligned in the direction of depth. The z coordinate value is referred to as a Z value. In the coordinates (x,y) with the x axis aligned with the horizontal direction and the y axis aligned with the vertical direction as shown in FIG. 26, the Z value represents the shading at each point of the face model viewed from front.

For example, the z axis is extended from front to back away, and the Z value at the frontmost point of the face model is zero, a smaller Z value point (more frontward point) represents a light point, and a larger Z value point (deeper in the backward) represents a darker point.

As shown in FIG. 26, five reference points $Dp_1$, $Dp_2$, $Dp_3$, $Dp_4$, and $Dp_5$ are set to divide the face model (viewed from front), stored in the standard 3D model memory 251, into four vertical segments $Dv_1$, $Dv_2$, $Dv_3$, and $Dv_4$ in a vertical direction, and two horizontal segments $Dh_1$ and $Dh_2$.

The reference point $Dp_1$ is the topmost point along the border between the hair and the face, and the reference point $Dp_2$ is the center point of the eyes (midway point between the center of the pupil of the left eye and the center of the pupil of the right eye). The reference point $Dp_3$ is the point of the nose toward the upper lip side, and the reference point $Dp_4$ is a point on the mouth between the upper lip and the lower lip. The reference point $Dp_5$ is the bottommost point of the face, namely, the lowest point along the border between the lower chin and the neck.

The segment $Dv_1$ is an area interposed between a horizontal line (parallel to the x axis) passing through the reference point $Dp_1$ and a horizontal line passing through the reference point $Dp_2$, and the segment $Dv_2$ is an area interposed between the horizontal line passing through the reference point $Dp_2$ and a horizontal line passing through the reference point $Dp_3$. The segment $Dv_3$ is an area interposed between the horizontal line passing through the reference point $Dp_3$ and a horizontal line passing through the reference point $Dp_4$, and the segment $Dv_4$ is an area interposed between the horizontal line passing through the reference point $Dp_4$ and a horizontal line passing through the reference point $Dp_5$.

The face model stored in the standard 3D model memory 251 is bilaterally symmetrical as previously discussed, and the five reference points $Dp_1$, $Dp_2$, $Dp_3$, $Dp_4$, and $Dp_5$ are all present in the axis of symmetry.

The line connecting the five reference points $Dp_1$, $Dp_2$, $Dp_3$, $Dp_4$, and $Dp_5$ in that order divides the face model into the two horizontal segments $Dh_1$ and $Dh_2$.

The line connecting the five reference points $Dp_1$, $Dp_2$, $Dp_3$, $Dp_4$, and $Dp_5$ in that order coincides with the axis of symmetry. The two segments $Dh_1$ and $Dh_2$ of the face model are symmetrical with respect to the line of symmetry.

The face model stored in the standard 3D model memory 251 is divided into the five vertical segments $Dv_1$, $Dv_2$, $Dv_3$, $Dv_4$, and $Dv_5$ by the five reference points $Dp_1$, $Dp_2$, $Dp_3$, $Dp_4$, and $Dp_5$ and into the two horizontal segments $Dh_1$ and $Dh_2$. As a result, the face model is divided into eight segments $R_1$, $R_2$, $R_3$, $R_4$, $R_5$, $R_6$, $R_7$, and $R_8$.

The face model fitter 261 of FIG. 25 fits the face model from the standard 3D model memory 251 (hereinafter referred to as a standard face model) to the face displayed in the normalized face image from the normalized face image memory 133. To this end, the face model fitter 261 divides the face displayed in the normalized face image into the eight matching regions corresponding to the eight segments $R_1$ through $R_8$, based on the detailed feature points from the detailed feature point extractor 135.

Figure 27:
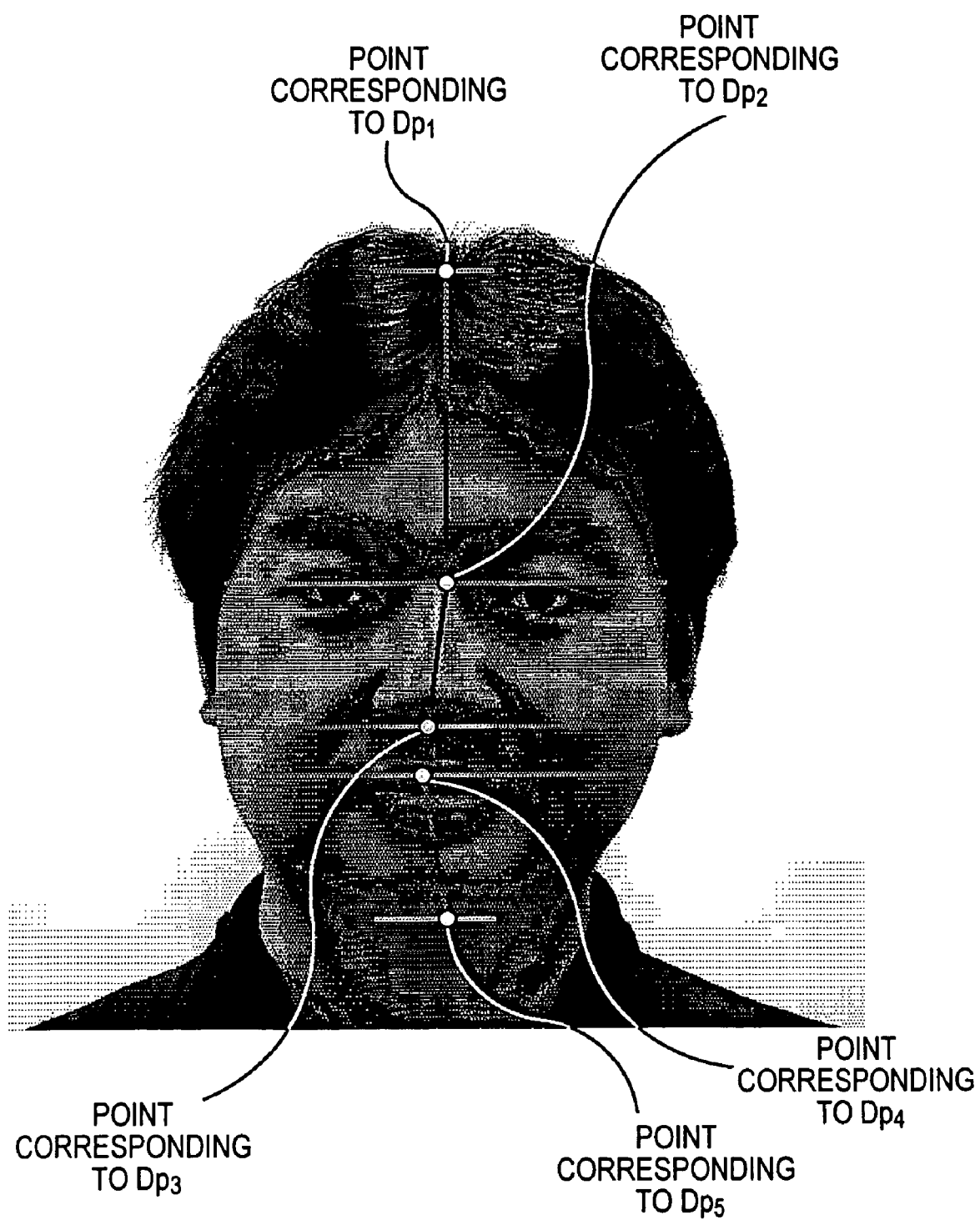
FIG. 27 illustrates a normalized face image.

FIG. 27 illustrates the face displayed in the normalized face image divided into the matching regions corresponding to the eight segments $R_1$ through $R_8$.

The face model fitter 261 detects, in the normalized face image, matching points corresponding to the five reference points $Dp_1$ through $Dp_5$ of FIG. 26.

The face model fitter 261 connects the detailed feature points of the chin, from among the detailed feature points from the detailed feature point extractor 135, thereby recognizing the outline of the face displayed in the normalized face image. From the outline of the face, the face model fitter 261 detects the topmost point of the face displayed in the normalized face image, corresponding to the reference point $Dp_1$ (the topmost point along the border between the forehead and the hair).

The face model fitter 261 determines the center point of the eyes, as the center point between the centers of the pupils of the left and right eyes, based on the detailed feature points of the eyes, from among the detailed feature points from the detailed feature point extractor 135, and detects the center point as the matching point to the reference point $Dp_2$, namely, the center of the eyes of the face displayed in the normalized face image.

The face model fitter 261 performs an image process on the normalized face image to detect the nostrils of the nose of the face displayed in the normalized face image, namely, two generally elliptical dark holes present between the level of the eyes and the level of the mouth. The face model fitter 261 then detects the center point between the centers of gravity of the two nostrils, as the matching point corresponding to the reference point $Dp_3$, namely, as a point of the nose bordering the upper lip of the face displayed in the normalized face image.

The face model fitter 261 detects the detailed feature point as the center control point of the detailed feature points of the mouth, from among the detailed feature points from the detailed feature point extractor 135 (for example, the control point positioned at the center of the mouth template prior to the fitting to the normalized face image). The face model fitter 261 then sets the detected detailed feature point as the matching point corresponding to the reference point $Dp_4$, namely, a point in the mouth (between the upper lip and the lower lip) of the face displayed in the normalized face image.

The face model fitter 261 detects the detailed feature point, as the control point at the center of the lower chin, of the detailed feature points of the chin, from among the detailed feature points from the detailed feature point extractor 135. The face model fitter 261 sets the detected detailed feature point as the matching point corresponding to the reference point $Dp_5$, namely, the lowermost point of the face (the lowermost point along the border between the face and the neck) displayed in the normalized face image.

As shown in FIG. 27, the face model fitter 261 divides the normalized face image into the areas corresponding to the four vertical segments $Dv_1$ through $Dv_4$ (see FIG. 26) by the five horizontal lines respectively passing through the five reference points $Dp_1$ through $Dp_5$.

As shown in FIG. 27, the face model fitter 261 divides the normalized face image into the two regions corresponding to the two horizontal segments $Dh_1$ and $Dh_2$ (see FIG. 26) by connecting the matching points respectively corresponding to the five reference points $Dp_1$ through $Dp_5$.

In this way, the face model fitter 261 divides the normalized face image into the four vertical segments and the two horizontal segments. The face displayed in the normalized face image is divided into a total of eight matching regions corresponding to the eight segments $R_1$ through $R_8$ (see FIG. 26).

The face model fitter 261 fits the face model of FIG. 26 to the face displayed in the normalized face image from the normalized face image memory 133 in each of the segments $R_1$ through $R_8$ on a segment by segment basis.

The face model fitter 261 modifies the x coordinate and the y coordinate of each point (x,y,z) in the segment $R_1$ so that the reference points $Dp_1$ and $Dp_2$ (see FIG. 26) on the border of the region $R_1$ of the standard face model, from among the reference points $Dp_1$ through $Dp_5$ coincide with the matching points in the normalized face image, and so that the segment $R_1$ matches the matching region in the normalized face image. The face model fitter 261 thus maps (changes shape of) the segment $R_1$ in the standard face model.

The face model fitter 261 maps the other segments $R_2$ through $R_8$, thereby resulting in a face model with the entire standard face model fitted to the whole face displayed in the normalized face image. The resulting face model is then supplied to the extender 264.

Figure 28:
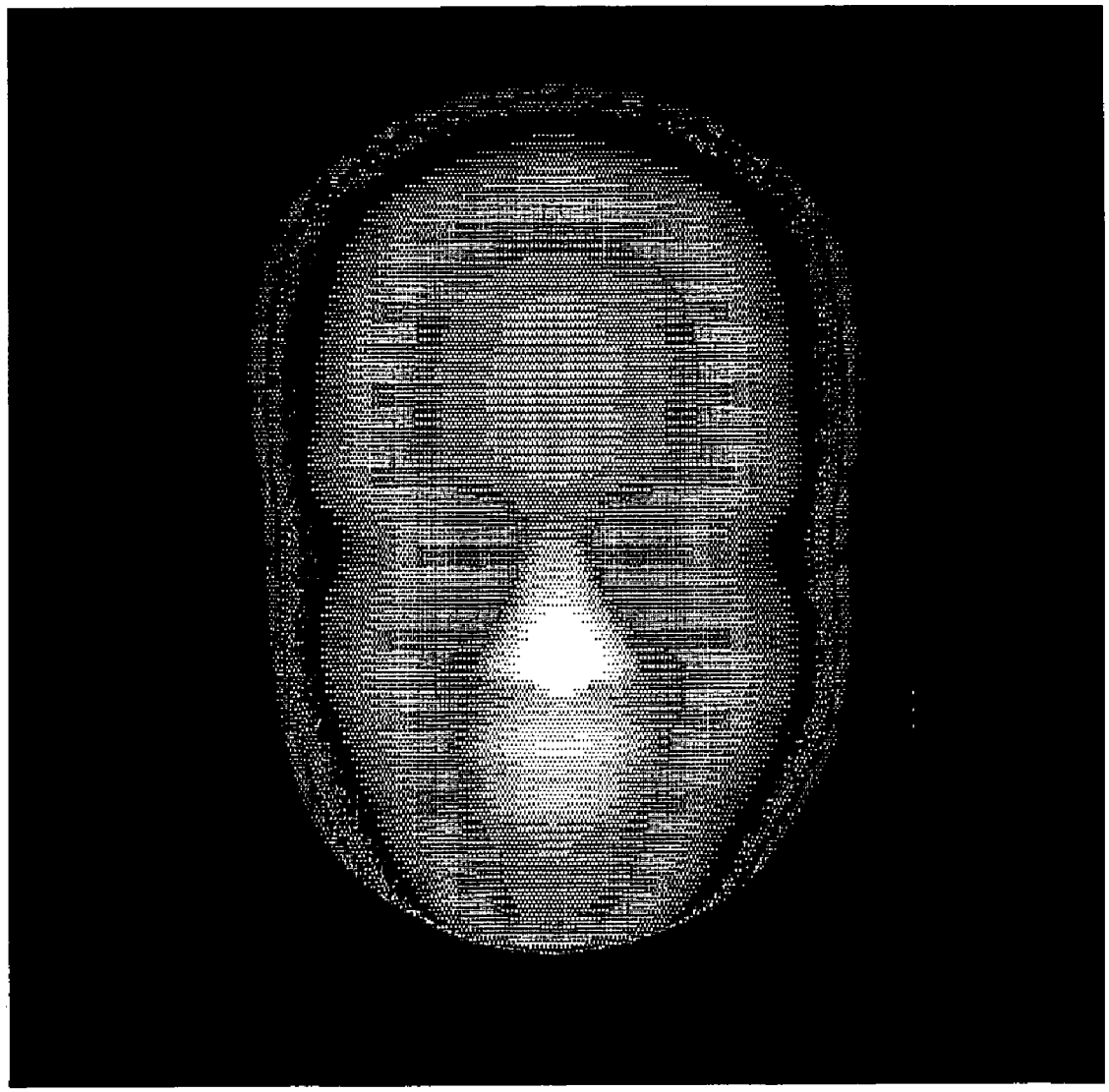
FIG. 28 illustrates a face model.

FIG. 28 illustrates the face model that is obtained by fitting the standard face model of FIG. 26 to the face displayed in the normalized face image of FIG. 27. In FIG. 28, as in FIG. 26, the Z value at each point on the face model represented by the coordinate (x,y) represents the shading of the face model in the xy coordinates with the x axis aligned with the horizontal direction and the y axis aligned with the vertical direction.

In the face model fitted to the face displayed in the normalized face image, a point corresponding to each point (pixel) of the face displayed in the normalized face image is present. The face model fitter 261 provides each point of the face model with a pixel value at the corresponding point of the face displayed in the normalized face image. The face model fitted to the face displayed in the normalized face image contains a pixel value (color) in addition to the coordinates (x,y,z) in the xyz coordinate system.

The process of the neck model fitter 262 of FIG. 25 is described below with reference to FIG. 29.

The neck model fitter 262 determines the center of the pupil of each of the left and right eyes in the face displayed in the normalized face image, based on the detailed feature points of the eyes from among the detailed feature points from the detailed feature point extractor 135. The neck model fitter 262 determines the center of the mouth of the face displayed in the normalized face image, based on the detailed feature points of the mouth, from among the detailed feature points from the detailed feature point extractor 135.

Figure 29:
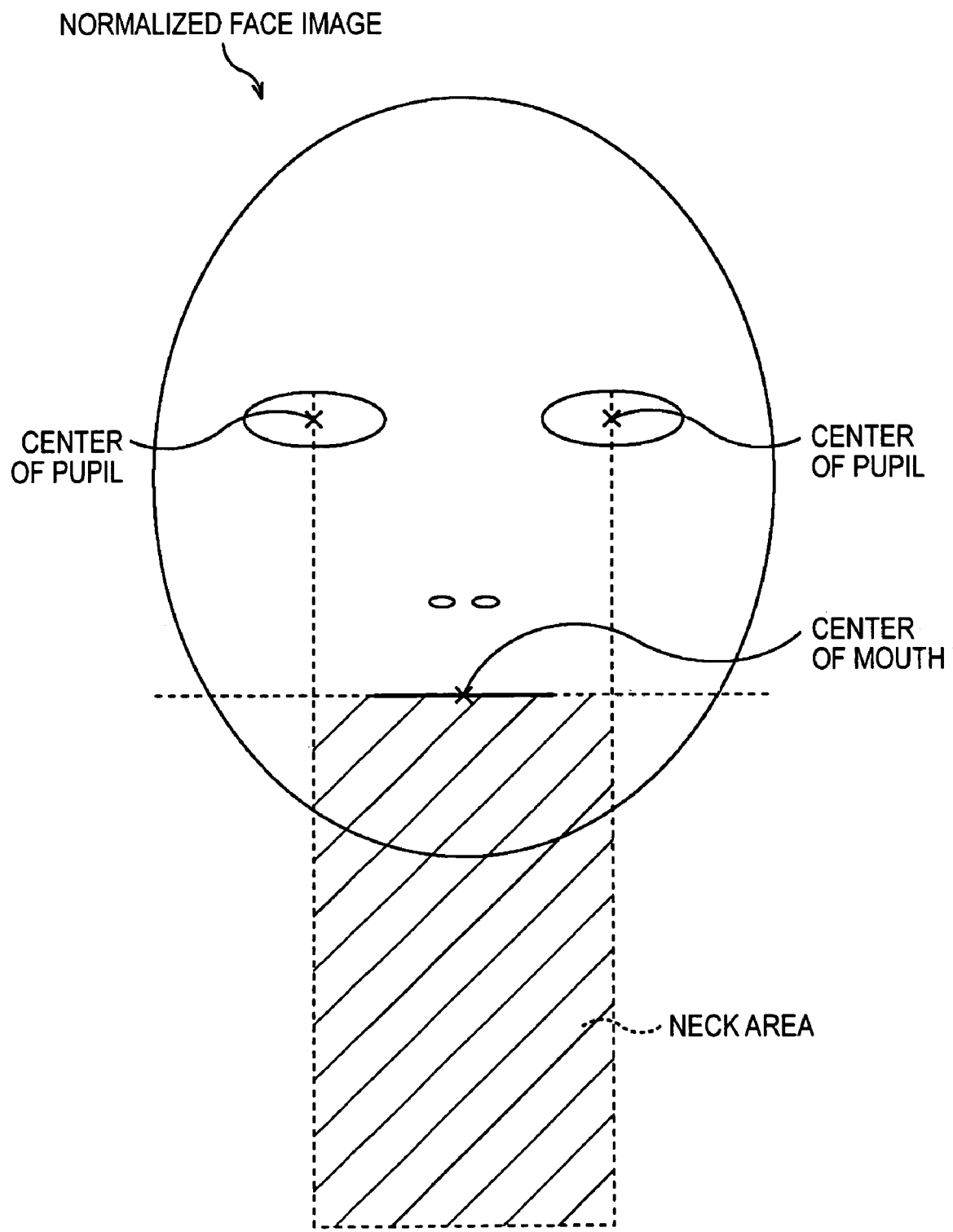
FIG. 29 illustrates the process of a neck model fitter.

The neck model fitter 262 determines a hatched region shown in FIG. 29 as a region where the neck is present in the normalized face image. The hatched region is defined by an area between two vertical lines passing through the centers of the pupils of the left and right eyes, and blow a horizontal line passing through the center of the mouth. The neck model fitter 262 fits the neck model from the standard 3D model memory 251 to the neck region. More specifically, the neck model fitter 262 maps the neck model to the neck area in a manner such that each point in the neck model corresponds to a respective point in the neck region.

The neck model fitter 262 supplies the neck model fitted to the neck region to the synthesizer 265 of FIG. 25 as a model fitted to the neck displayed in the normalized face image.

The process of the ear model fitter 263 of FIG. 25 is discussed below with reference to FIG. 30.

The ear model fitter 263 determines the center of the eyes of the face displayed in the normalized face image, based on the detailed feature points of the eyes from among the detailed feature points from the detailed feature point extractor 135. The ear model fitter 263 determines the nostrils of the nose in the face displayed in the normalized face image. The ear model fitter 263 determines a maximum width of the face from the outline of the face displayed in the normalized face image. The outline of the face is obtained by connecting the detailed feature points of the chin, from among the detailed feature points from the detailed feature point extractor 135.

Figure 30:
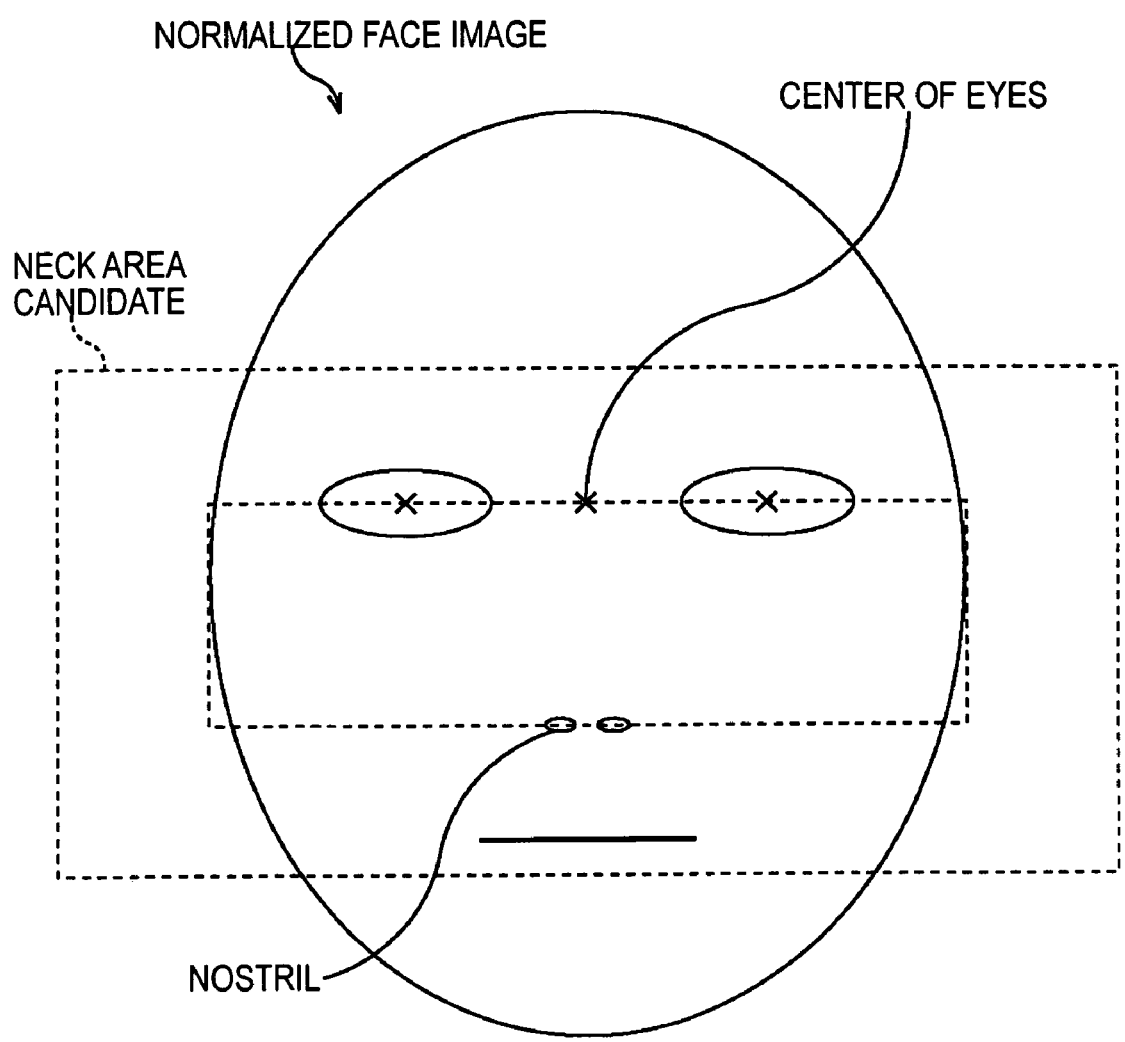
FIG. 30 illustrates the process of an ear model fitter.

As shown in FIG. 30, the ear model fitter 263 determines an ear containing area where the ears can be present (hereinafter referred to as an ear containing candidate area). The ear containing candidate area is a rectangular shape defined by a vertical length between the center of the eyes and the nostrils, and a horizontal length equal to an integer multiple of the width horizontally across the face.

The ear model fitter 263 scans horizontally the ear containing candidate area from the outside of the face leftward or rightward to the outline of the face to read the pixel values of the normalized face image. The ear model fitter 263 thus detects the pixel value of the flesh color.

The ear model fitter 263 determines a horizontal distance from the first detected pixel value of the flesh color to the outline of the face displayed in the normalized face image. If the distance is above a predetermined distance, the ear model fitter 263 determines that the ear is present toward the outline of the face, and then scans the pixels of the normalized face image to the outline of the face. The ear model fitter 263 detects a pixel having a flesh color pixel value as a pixel representing the ear. The ear model fitter 263 performs the above process on each of the rows of the rectangular ear containing candidate area. The ear region composed of the pixels displaying the ear is thus detected.

After the detection of the ear region, the ear model fitter 263 fits the ear model from the standard 3D model memory 251 to the ear region. More specifically, the ear model fitter 263 maps the ear model so that each point in the ear model maps to a respective point in the ear region.

The ear model fitter 263 supplies the ear model fitted to the ear region to the synthesizer 265 of FIG. 25 as an ear model fitted to the ear displayed in the normalized face image.

The process of the extender 264 of FIG. 25 is described below with reference to FIGS. 31 through 37.

The extender 264 extends the lateral portion of the face model, supplied from the face model fitter 261 of FIG. 25, in the Z direction as the direction of depth.

Figure 31:
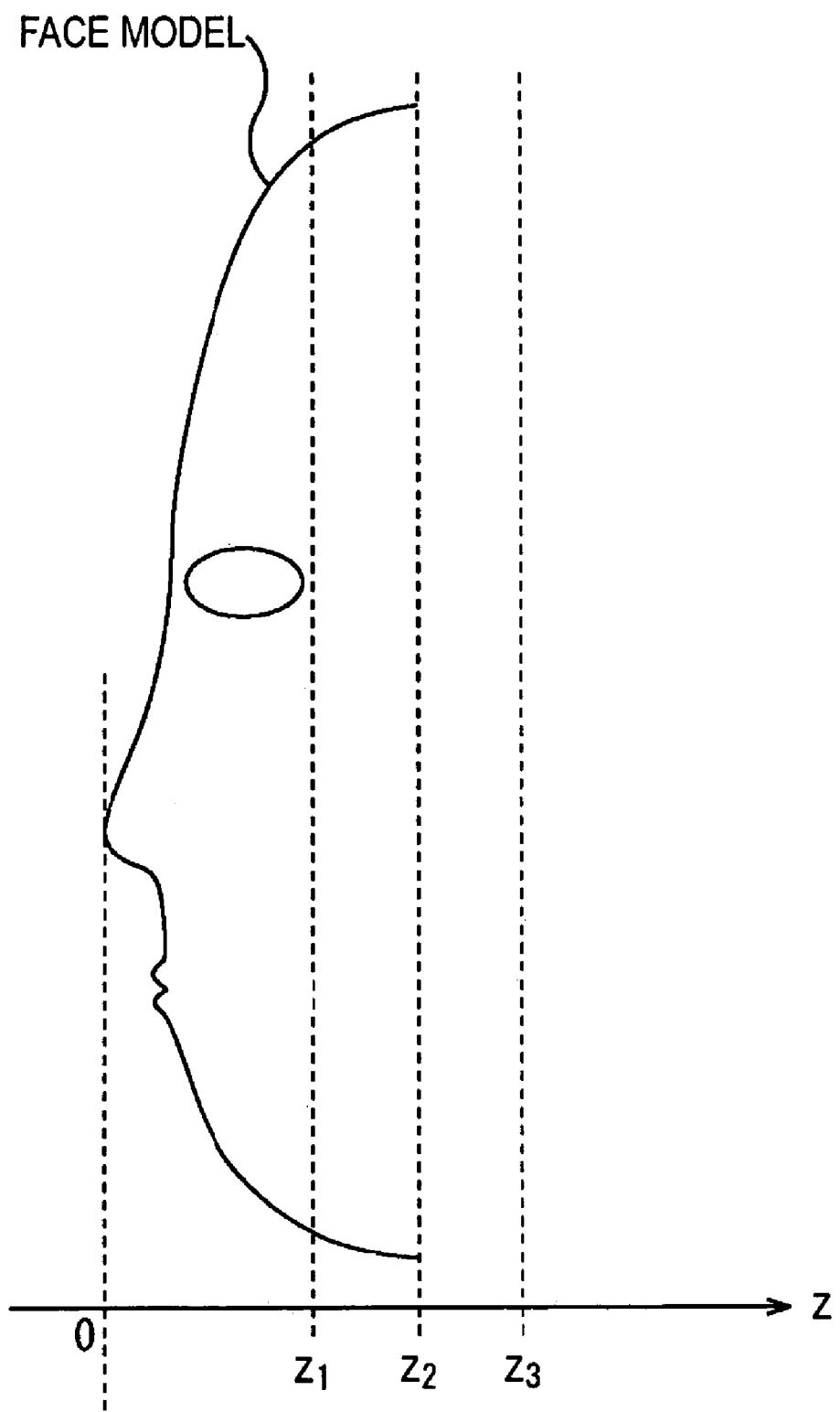
FIG. 31 illustrates a face model.

FIG. 31 diagrammatically illustrates the face model obtained by the face model fitter 261. In FIG. 31, the z axis is aligned with the horizontal direction.

Since the face image is the one taken fullface, the face of the person is photographed only within a coverage that is viewed from the front. Neither the face image nor the normalized face image contains any portions not appearing in a front view. In other words, the lateral portion of the face, and the head top portion of the face are not contained.

As shown in FIG. 31, the lateral portion of the face and the head top portion, namely, depth portions of the face, appear to be marginal in the face model fitted to the normalized face image.

As shown in FIG. 31, the Z value (z coordinate) is zero at the frontmost point of the face model, and Z values $z_1$, $z_2$, and $z_3$ have a relationship of $0<z_1<z_2<z_3$. The face model has the depth portion to $z_2$. The larger the Z value, the more the depth portion of the face image becomes.

To impart a modest depth to the face model, the extender 264 converts the Z value (z coordinate) of the face model in accordance with a non-linear function to extend the face model in the Z direction in a non-linear fashion. The lateral portion of the face model is extended in the Z direction.

Figure 32:
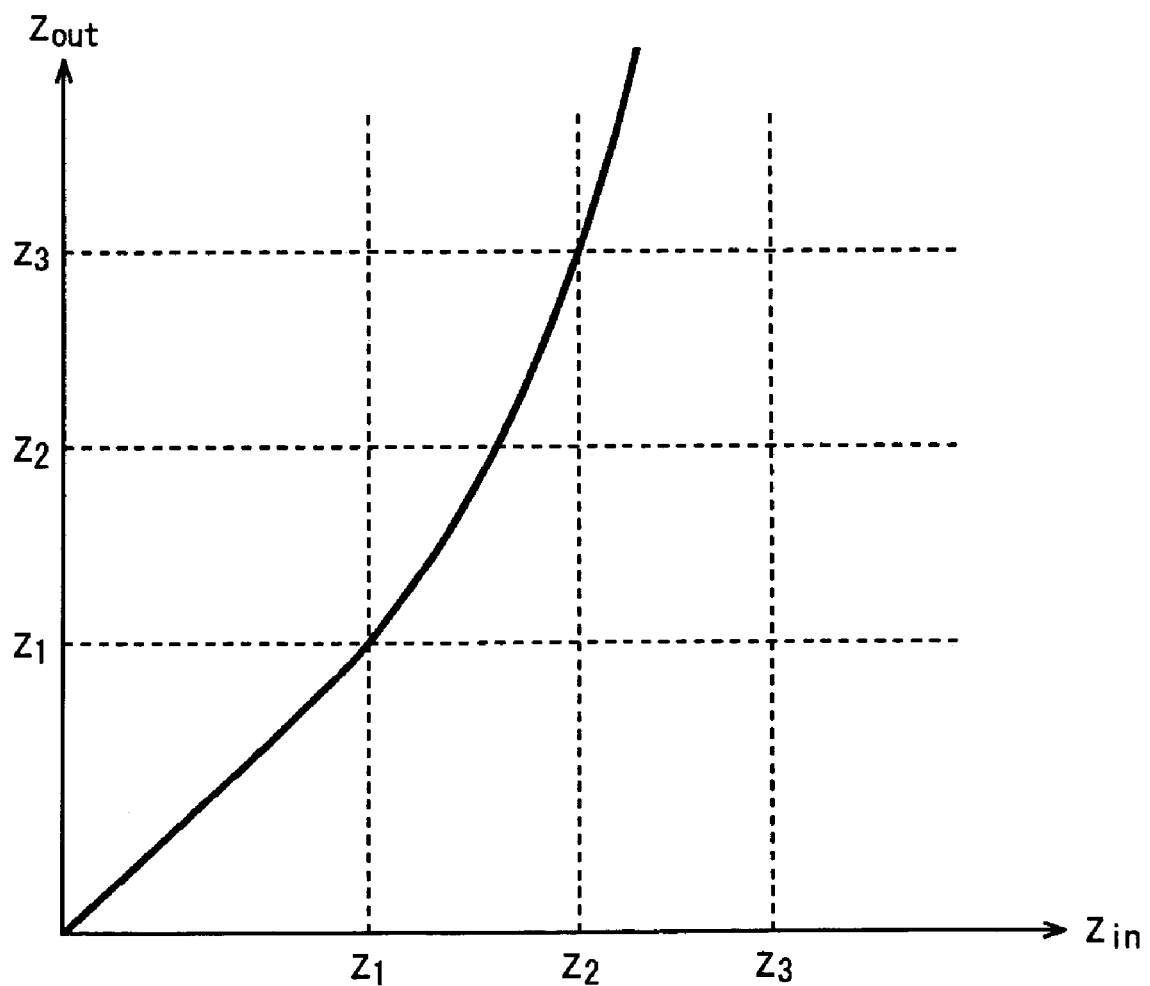
FIG. 32 illustrates a Z value converting function.

FIG. 32 illustrates a function the extender 264 uses to convert the Z value of the face model. The function is hereinafter referred to as a Z value converting function.

As shown in FIG. 32, the abscissa represents $z_{in}$ as the original Z value of the face model, as a parameter of the Z value converting function, while the ordinate represents $z_{out}$ as the Z value subsequent to the conversion of the Z value converting function.

In accordance with the Z value converting function of FIG. 32, $z_{in}$ having a value, equal to or larger than 0 and equal to or smaller than $z_1$, is converted to $z_{out}$ having the same value, and $z_{in}$ having a value larger than $z_1$ is converted into $z_{out}$ larger than $z_{in}$. For example, $z_{in}$, larger than $z_1$ and equal to or smaller than $z_2$, is converted into $z_{out}$ that is larger than $z_1$ and equal to or smaller than $z_3$, but still larger than $z_{in}$.

Figure 33:
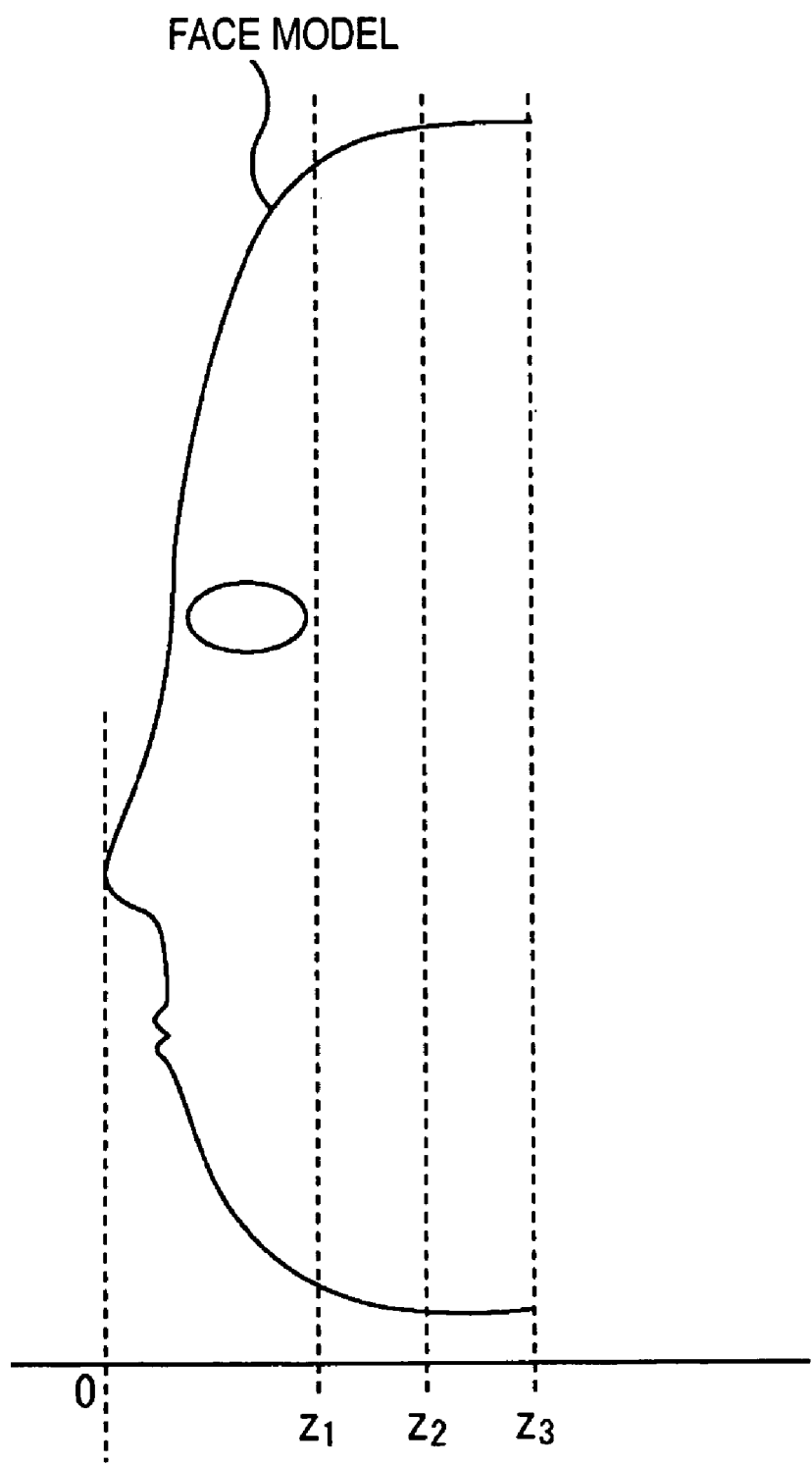
FIG. 33 illustrates a face model.

In accordance with the Z value converting function of FIG. 32, the face model of FIG. 31 is extended in the Z direction (deeper in backward) as shown in FIG. 33.

In a similar manner as in FIG. 31, FIG. 33 illustrates a face model that is obtained by extending the face model of FIG. 31 in the Z direction in accordance with the Z value converting function of FIG. 32.

In accordance with the Z value converting function of FIG. 32, the Z value of the face model of FIG. 31 is converted. For example, the Z value equal to or larger than 0 but equal to or smaller than $z_1$ is converted into the same Z value, and the Z value above $z_1$ is converted into a Z value larger than the input Z value.

In the face model of FIG. 31, the Z value, larger than $z_1$ and equal to or smaller than $Z_2$, is converted into a Z value larger than $z_1$ and equal to or smaller than $z_3$, but still larger than the input Z value. As a result, the Z value of the face model of FIG. 31 having the Z value originally taking a value within a range from zero to $z_2$ is converted into the face model of FIG. 33 having the Z value taking a value falling within a range from zero to $z_3$.

FIGS. 34A-34C and FIGS. 35A-35D diagrammatically illustrate a person (subject) photographed in the face image, and the face models generated from the face image, viewed from the above.

Figure 34C:
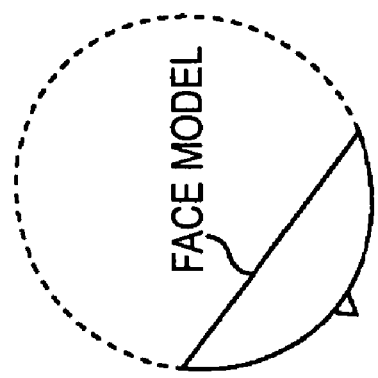
FIGS. 34A-34C illustrate the process of an extender.
Figure 34B:
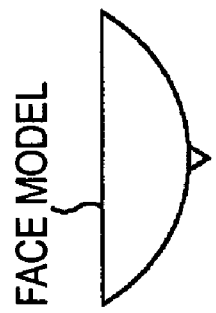
Figure 34A:
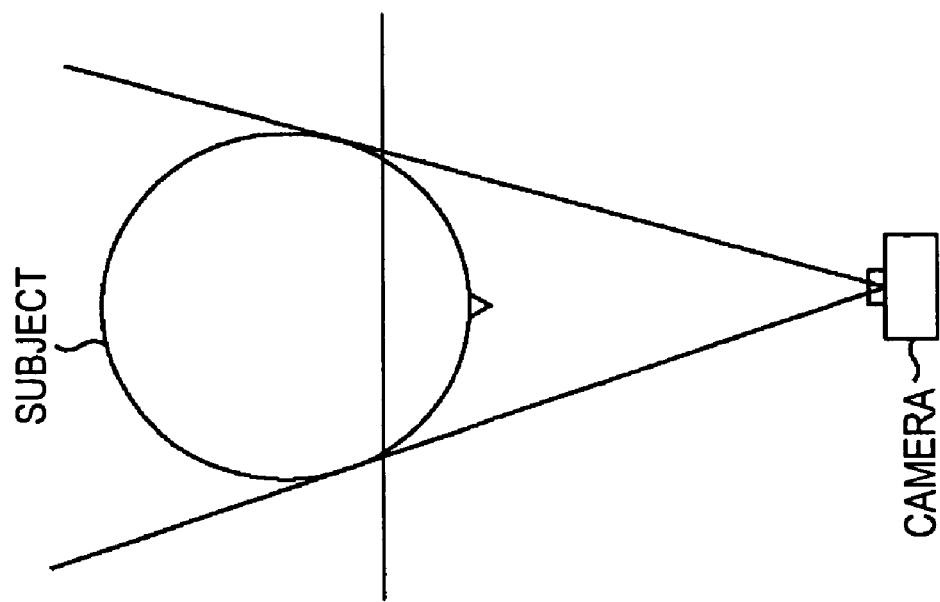
Figure 35D:
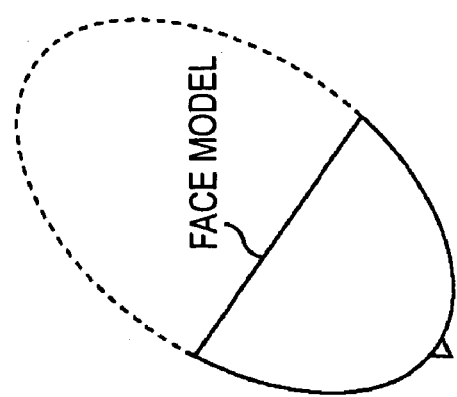
FIGS. 35A-35D illustrate the process of the extender.
Figure 35C:
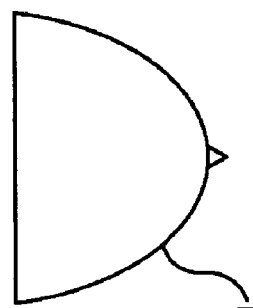
Figure 35B:
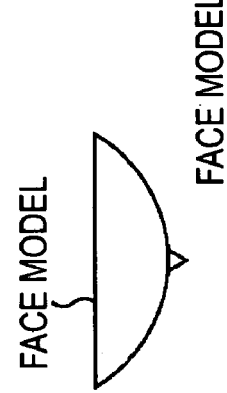
Figure 35A:
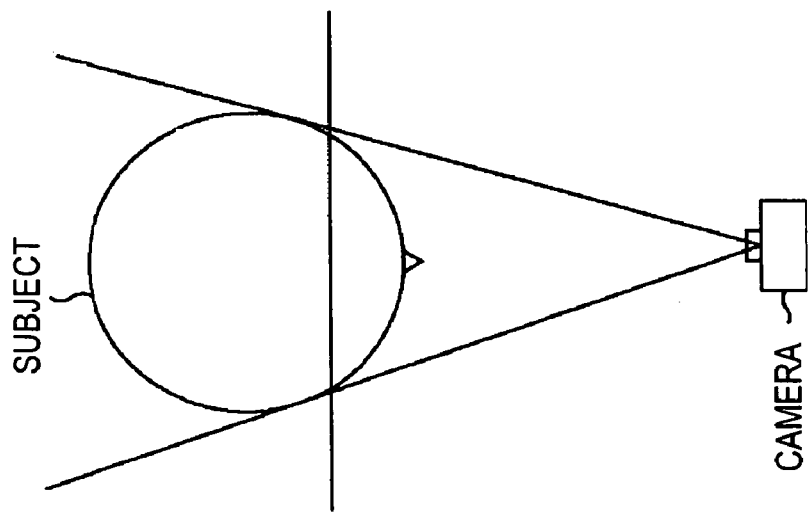

As shown in FIGS. 34A and 35A, the face is photographed fullface, and the face image covers only a portion of the face viewed from the front. Neither the face image nor the normalized face image derived from the face image shows any portions that cannot be viewed from the front, for example, the lateral portion of the face and the head top portion.

As shown in FIGS. 34B and 35B, the face model fitted to the normalized face image has marginal lateral portion of the face or marginal depth portion of the face.

A CG animation of the face is now generated based on such a face model. If the face is rotated slightly clockwise or counterclockwise as shown in FIG. 34C, a lateral portion, namely, a non-existent portion of the face looks frontward and the CG animation is thus destroyed.

As shown in FIG. 35C, the lateral portion of the face originally having no large depth area is extended in the Z direction to form a face model having a depth portion. A CG animation of the face is generated based on such a face model. Even if the face is slightly rotated clockwise or counterclockwise as shown in FIG. 35D, the extended lateral portion prevents the CG animation from being destroyed.

Figure 36:
FIG. 36 illustrates a CG animation generated from a face model with a lateral portion thereof not extended in the Z direction.

FIG. 36 illustrates a face CG animation that is generated based on the face model having the lateral portion not extended in the Z direction and slightly clockwise rotated to the left.

Figure 37:
FIG. 37 illustrates a CG animation generated from a face model with a lateral portion thereof extended in the Z direction.

FIG. 37 illustrates a face CG animation that is generated based on the face model having the lateral portion extended in the Z direction and slightly clockwise rotated to the left.

As shown in FIG. 36, the clockwise rotation destroys the face unnaturally because no lateral portion of the face model is present. As shown in FIG. 37, in contrast, the CG animation of the natural and realistic face looking leftward is displayed because the lateral portion of the face is present.

The Z value converting function used to convert the Z value of the face model is not limited to the function shown in FIG. 32. In accordance with the present embodiment, the Z value converting function is a non-linear function. Alternatively, the Z value converting function may be a linear function. As shown in FIG. 32, the Z value converting function preferably converts the Z value, if small, to a Z value of the same value as the input Z value, and if large, to a Z value larger than the input Z value. More specifically, a frontward point in the face model remains unchanged in position, and a deep point in the face model is moved to a deeper position.

The process of the synthesizer 265 of FIG. 25 is described below with reference to FIGS. 38 through 40.

The synthesizer 265 synthesizes, with the face model supplied from the extender 264, a portion of the neck model supplied from the neck model fitter 262 and the ear model supplied from the ear model fitter 263, more frontward than the face model.

Figure 38:
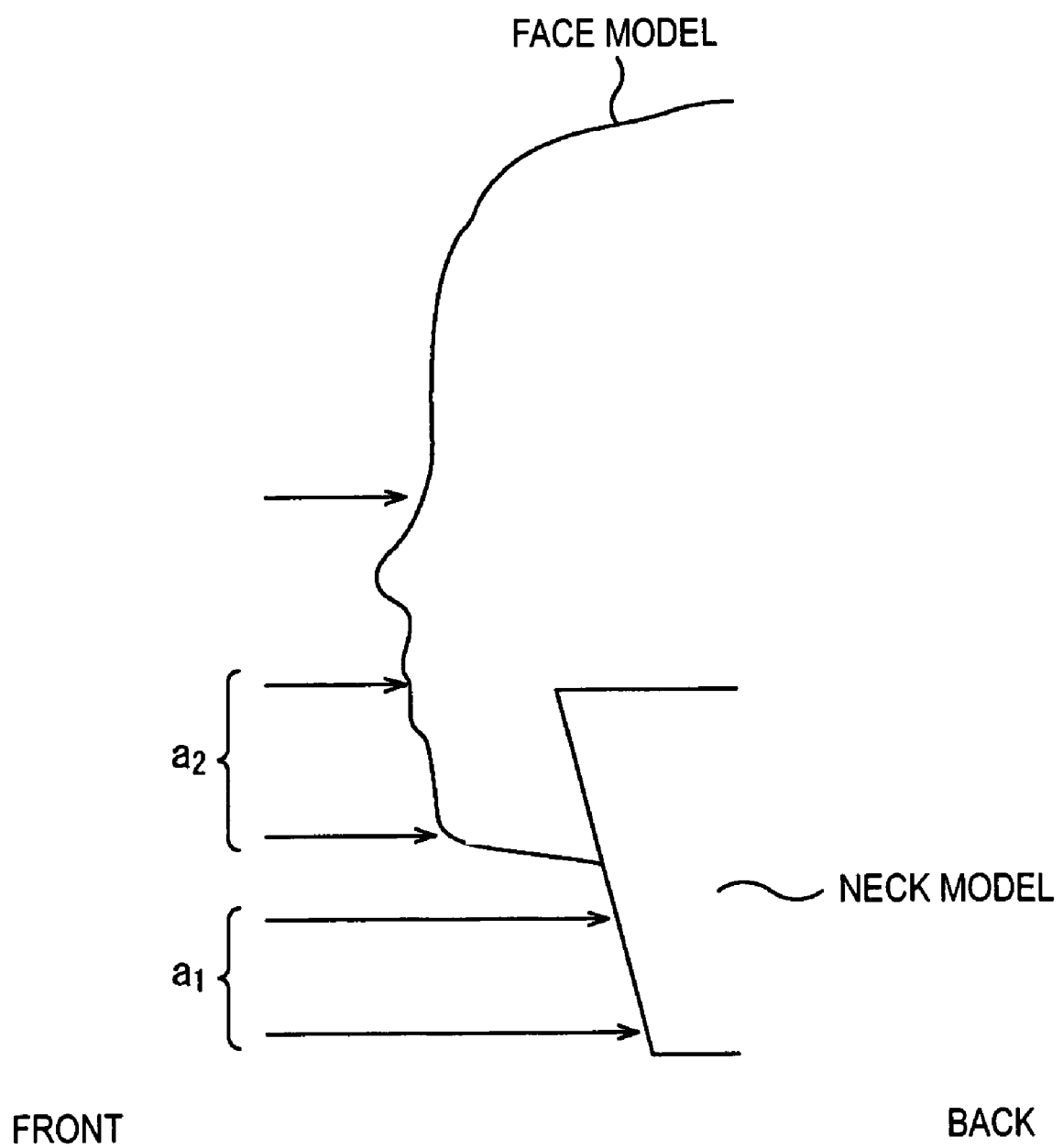
FIG. 38 illustrates a synthesizer.

FIG. 38 diagrammatically illustrates the synthesis of the portion of the neck model more frontward than the face model to the face model.

As shown in FIG. 38, the Z direction is horizontally aligned, namely, in parallel with the sheet of FIG. 38 with the left-hand side being the front of the face and the right-hand side being the deep side of the face.

The synthesizer 265 compares the Z value at each point of the neck model with the Z value at the corresponding point in the face model having the same coordinates (x,y) as the point of the neck model. If the Z value at the point in the neck model is less than the Z value at the corresponding point in the face model, in other words, if the point in the neck model is positioned more frontward than the corresponding point in the face model as represented by an arrow-headed line $a_1$ in FIG. 38 (the face model is not present more frontward than the neck model), the point of the neck model is synthesized with the face model.

If the Z value at the point in the neck model is more than the Z value at the corresponding point in the face model, in other words if the point in the neck model is positioned back deeper than the corresponding point in the face model (the corresponding points are positioned at the same position in the Z direction) as represented by an arrow-headed $a_2$, the neck model is not synthesized with the face model.

Likewise, the synthesizer 265 synthesizes a portion of the ear model, which is positioned more frontward than the face model, with the face model.

When a person as a subject is photographed with a digital camera or the like, the image of the neck, the ears, etc. in the resulting photograph are substantially different depending on the individual characteristics (including the hair style, physique, posture), and an even slight change in camera angle. Merely fitting the standard face model to the face displayed in the normalized face image can achieve a face model with unnatural neck and ears, and a generally unnatural face model can thus result.

The face model processor 252 of FIG. 25 produces a natural face model by synthesizing the neck model and the ear model with the face model, independent of the face model of the face (the face model without 3D ears and neck).

Figure 39:
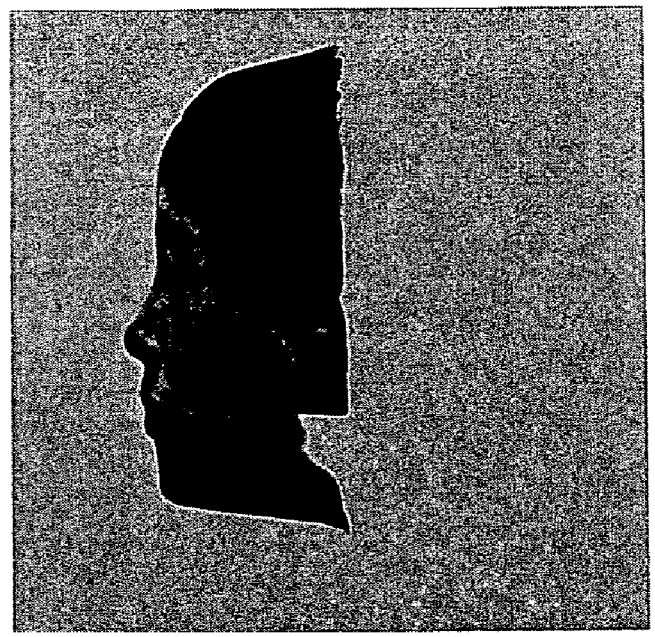
FIG. 39 illustrates a CG that is generated from a face model with a neck model and an ear model not synthesized therewith.
Figure 40:
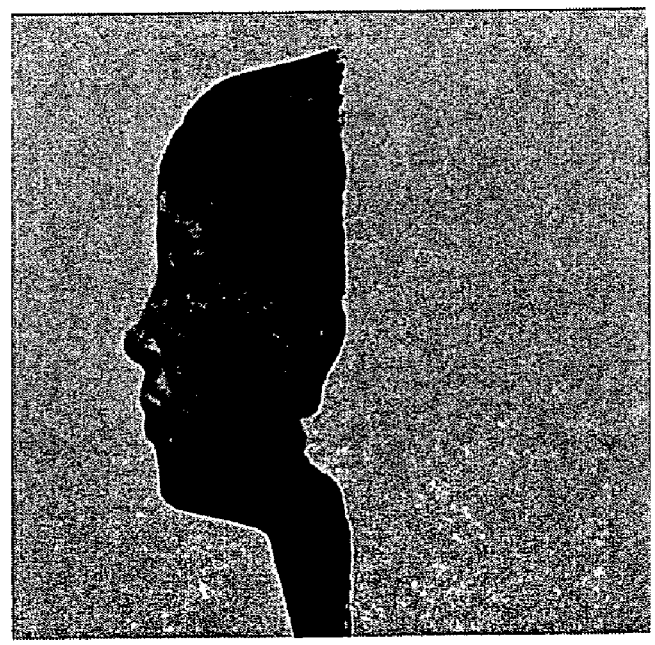
FIG. 40 illustrates a CG that is generated from a face model with a neck model and an ear model synthesized therewith.

FIG. 39 is a left-side view of the face model that is obtained by fitting the standard face model to the face displayed in the normalized face image. FIG. 40 is a left-side view of the face model that is obtained by synthesizing a neck model and an ear model with the face model of FIG. 39.

As shown in FIG. 39, the left ear is unnaturally deformed and the neck is almost non-existent. FIG. 40 shows a generally natural face model with the naturally looking ear and neck.

The process of the hair model processor 253 of FIG. 25 is described below with reference to FIGS. 41 through 46.

The hair is typically present in areas external and internal to the outline of the face. The hair style is substantially different from person to person. Independent of the face model, the hair model processor 253 generates the hair model having a 3D shape. The hair model processor 253 thus produces a face model with hair having the same hair style and texture as those of the hair of the person displayed in the normalized face image.

The mapping unit 271 of FIG. 25 in the hair model processor 253 recognizes the outline of the face displayed in the normalized face image based on the detailed feature points from the detailed feature point extractor 135 of FIG. 2. In response to the outline of the face, the mapping unit 271 sets a hair containing area enclosed in a hair area outline in the normalized face image from the normalized face image memory 133 of FIG. 2.

The hair area outline encloses an area where the hair is expected to be present.

The mapping unit 271 maps the hair model (hereinafter referred to as a standard hair model) stored in the standard 3D model memory 251 to the hair containing area in the normalized face image.

At least one mapping point for use in mapping is set up in the hair containing area, and a matching point corresponding to the mapping point is set up in the standard hair model. The mapping unit 271 performs the mapping process to the standard hair model so that the mapping point in the hair containing area in the normalized face image coincides with the matching point in the standard hair model.

Figure 41A:
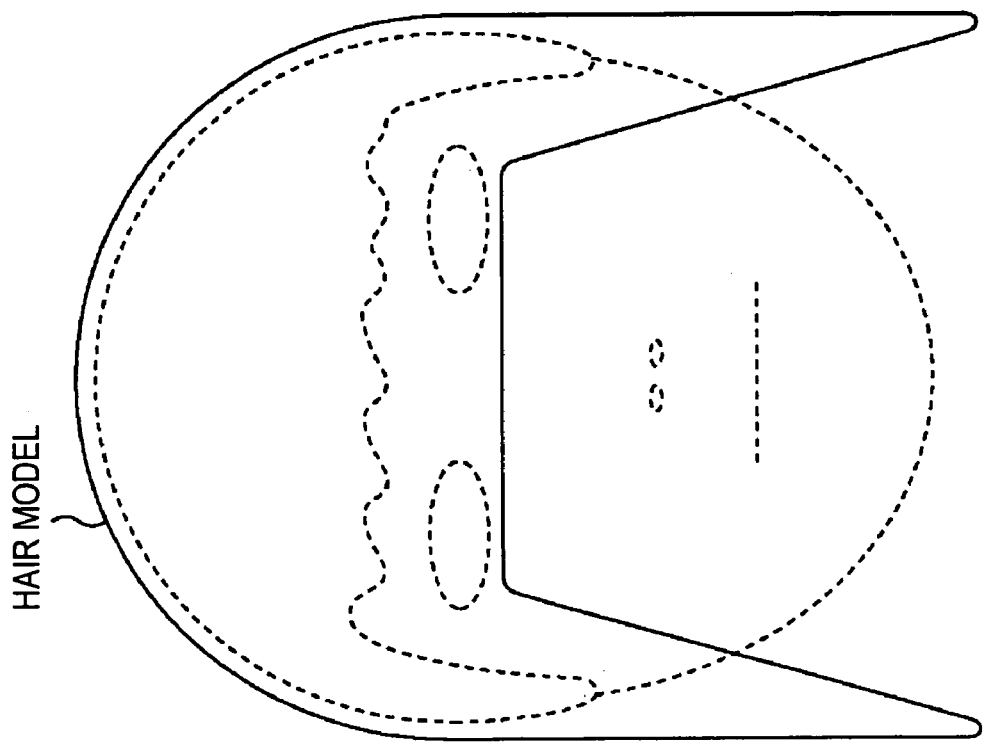
FIGS. 41A and 41B illustrate a hair model obtained as a result of mapping a standard hair model to a normalized face image.
Figure 41B:
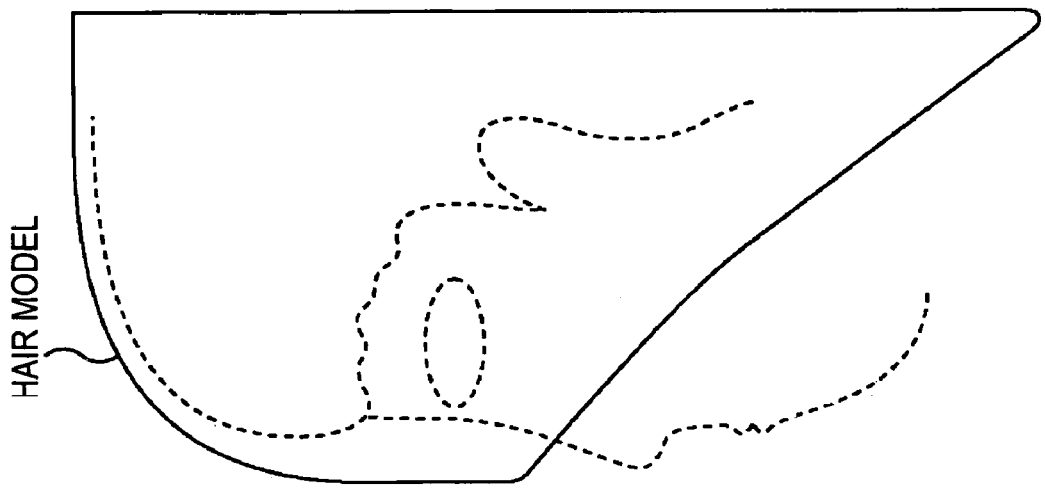

FIGS. 41A and 41B illustrate a hair model that is obtained by mapping the standard hair model to the hair containing area of the normalized face image.

FIG. 41A is a front view of the hair model and FIG. 41B is a left-side view of the hair model.

As shown in FIGS. 41A and 41B, the hair model, having a 3D shape, covers the upper front portion of the face from the heat top down to the forehead, and to the lateral portions of the face.

The mapping unit 271 maps the hair model to the normalized face image as shown in FIGS. 41A and 41B, and supplies the mapped hair model to the Z value modifier 273 of FIG. 25.

The non-hair portion detector 272 in the hair model processor 253 of FIG. 25 detects non-dark areas and flesh colored areas, as a non-hair portion, from the normalized face image stored in the normalized face image memory 133, and supplies the information of the non-hair portion to the Z value modifier 273.

The Z value modifier 273 recognizes the non-hair portion in the normalized face image from the information supplied from the non-hair portion detector 272, and modifies the Z value in the hair model from the mapping unit 271 mapped to the non-hair portion. In other words, the Z value modifier 273 modifies the Z value of the hair model so that the portion of the hair model mapped to the non-hair portion is positioned frontward than the face model when the hair model is synthesized with the face model obtained by the face model processor 252 of FIG. 25. More specifically, the Z value modifier 273 modifies the Z value of the portion mapped to the non-hair portion, out of the hair model, to an extremely larger number, to infinity, for example.

Figure 42A:
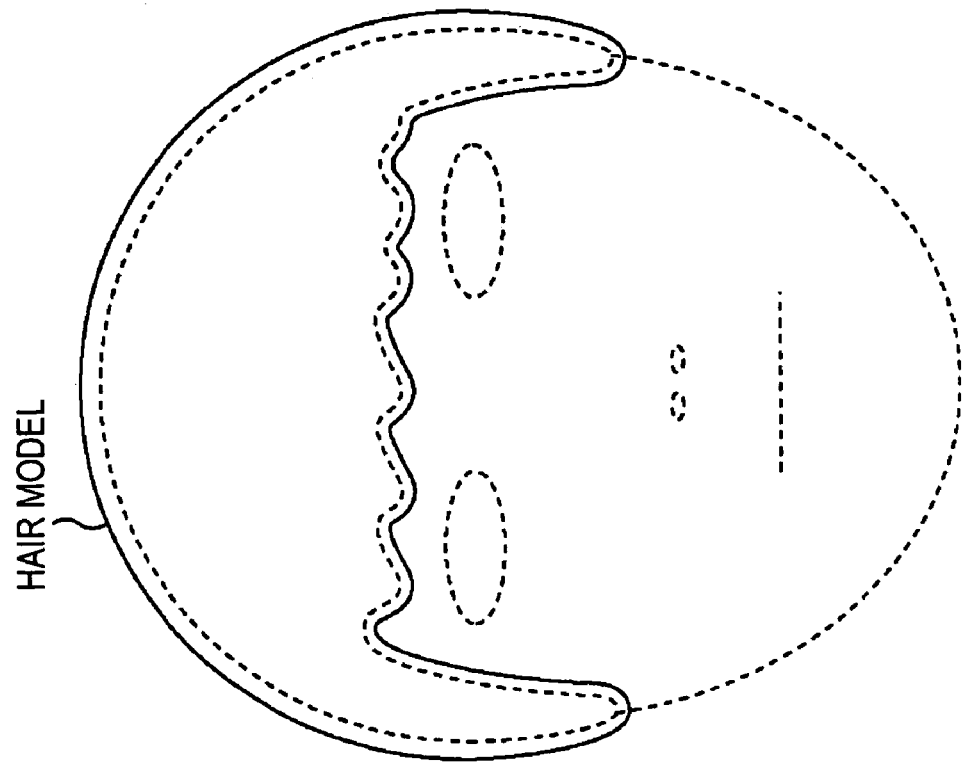
FIGS. 42A and 42B illustrate a hair model with the Z value modified.
Figure 42B:
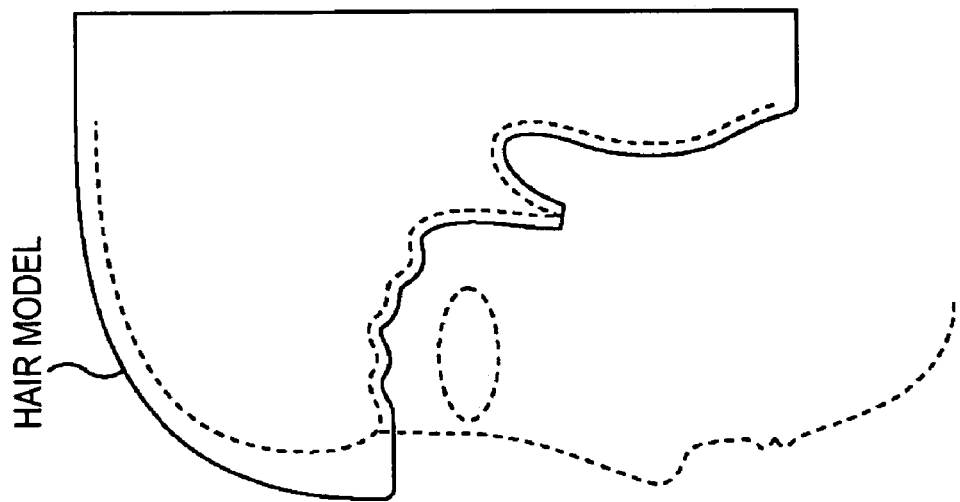

The hair model of FIGS. 41A and 41B becomes a hair model as shown in FIGS. 42A and 42B.

FIGS. 42A and 42B illustrate the hair model that is obtained by modifying the Z value of the portion of the hair model of FIGS. 41A and 41B mapped to the non-hair portion.

As shown in FIGS. 41A and 41B, FIG. 42A is a front view of the hair model and FIG. 42B is a left-side view of the hair model.

As shown in FIGS. 42A and 42B, the resulting hair model has the same hair style and texture as those of the person displayed in the normalized face image.

Figure 43:
FIG. 43 illustrates a CG that is generated from a face model with a hair model not synthesized therewith.
Figure 44:
FIG. 44 illustrates a CG that is generated from a face model with a hair model synthesized therewith.
Figure 45:
FIG. 45 illustrates a CG that is generated from a face model with a hair model not synthesized therewith.
Figure 46:
FIG. 46 illustrates a CG that is generated from a face model with a hair model synthesized therewith.

FIG. 43 illustrates a CG that is generated with the face model from the normalized face image not synthesized with the hair model. FIG. 44 illustrates a CG that is generated with the hair model synthesized with the face model. FIG. 45 illustrates a CG that is generated with the hair model not synthesized with the face model resulting from another normalized face image. FIG. 46 illustrates a CG that is generated with the hair model synthesized with the face model of FIG. 45.

The hair unnaturally sticks to the surface of the face in the CG generated with no hair model as shown in FIGS. 43 and 45. In contrast, the hair has natural texture in the CG with the hair model as shown in FIGS. 44 and 46.

The generation process of the face model performed by the face model generator 136 of FIG. 2 in step S105 of FIG. 3 is described below with reference to a flowchart of FIG. 47.

In step S251, the face model fitter 261 in the face model processor 252 of FIG. 25 in the face model generator 136 fits the standard face model stored in the standard 3D model memory 251 to the face displayed in the normalized face image stored in the normalized face image memory 133, based on the detailed feature points supplied from the detailed feature point extractor 135. The face model fitter 261 thus generates the face model as a 3D model of the face displayed in the normalized face image, and supplies the face model to the extender 264. Processing proceeds to step S252.

In step S252, the extender 264 extends the lateral portion of the face model supplied from the face model fitter 261, and supplies the resulting face model to the synthesizer 265. Processing proceeds to step S253.

In step S253, the neck model fitter 262 fits the neck model stored in the standard 3D model memory 251 to the neck displayed in the normalized face image from the normalized face image memory 133, based on the detailed feature points supplied from the detailed feature point extractor 135. The face model processor 252 thus generates the neck model as a 3D model of the neck displayed in the normalized face image, and supplies the resulting neck model to the synthesizer 265. Processing proceeds to step S254.

In step S254, the ear model fitter 263 fits the ear model from the standard 3D model memory 251 to the left and right ears displayed in the normalized face image from the normalized face image memory 133, based on the detailed feature points from the detailed feature point extractor 135. The ear model fitter 263 generates the ear model as a 3D model of the ears displayed in the normalized face image, and supplies the resulting ear model to the synthesizer 265. Processing proceeds to step S255.

In step S255, the synthesizer 265 synthesizes a portion of the neck model supplied from the neck model fitter 262 and the ear model supplied from the ear model fitter 263, positioned more frontward than the face model, with the face model supplied from the extender 264. The synthesizer 265 then supplies the synthesized face model to the synthesizer 254. Processing returns.

The face model synthesis process of generating the hair model performed by the face model generator 136 of FIG. 2 in step S106 is described below with reference to a flowchart of FIG. 48.

In step S271, the mapping unit 271 in the hair model processor 253 of FIG. 25 in the face model generator 136 sets the hair containing area in the normalized face image stored in the normalized face image memory 133 of FIG. 2, based on the detailed feature points from the detailed feature point extractor 135. The mapping unit 271 thus recognizes the hair containing area enclosed by the hair area outline. Processing proceeds to step S272.

In step S272, the mapping unit 271 maps the standard hair model stored in the standard 3D model memory 251 to the hair containing area in the normalized face image, and supplies the mapped hair model to the Z value modifier 273. Processing proceeds to step S273.

In step S273, the non-hair portion detector 272 detects the non-hair portion from the normalized face image stored in the normalized face image memory 133, and supplies the information about the non-hair portion to the Z value modifier 273. Processing proceeds to step S274.

In step S274, the Z value modifier 273 recognizes the non-hair portion in the normalized face image from the information supplied from the non-hair portion detector 272. The Z value modifier 273 detects the portion of the hair model supplied from the mapping unit 271 mapped to the non-hair portion, and modifies the Z value of the portion mapped to the non-hair portion. The Z value modifier 273 supplies the hair model with the Z value modified to the filter 274. Processing proceeds from step S274 to S275.

In step S275, the filter 274 low-pass filters the Z value of the hair model from the Z value modifier 273. With the Z value low-pass filtered, a sharp change in the hair model in the Z direction becomes smoother, and the hair model has more natural hair. The filter 274 supplies the hair model with the Z value low-pass filtered to the synthesizer 254. Processing proceeds to step S276.

In step S276, the synthesizer 254 of FIG. 25 in the face model generator 136 synthesizes a portion of the hair model, supplied from the filter 274 in the hair model processor 253, and positioned more frontward than the face model, with the face model supplied from the synthesizer 265 in the face model processor 252. Processing then returns.

As previously discussed with reference to step S107 of FIG. 3, the synthesizer 254 in the face model generator 136 embeds the eye model and tooth model into the face model having the hair model synthesized therewithin, based on the detailed feature points supplied from the detailed feature point extractor 135. The synthesizer 254 supplies the resulting face model as a finalized face model to the face model memory 137 of FIG. 2 for storage.

The pixel values in the white of the eyes of the eye model embedded in the face model are corrected to the same pixel values as the white of the eyes in the eyes in the face displayed in the normalized face image so that the face model having the eye model embedded therewithin may not look unnatural.

As previously discussed with reference to step S108 of FIG. 3, when the face model is stored in the face model memory 137, the animation processor 138 of FIG. 2 generates, based on the face model stored in the face model memory 137, data of a CG animation with the region of the face moving in response to the operation of the operation unit 139. The face model memory 137 then supplies the CG animation data to the display 140. The display 140 displays a CG animation of the face displayed in the face image stored in the storage unit 131 and moving in response to the operation of the operation unit 139.

FIGS. 49-53 illustrate the CG animations displayed in the display 140.

Figure 49:
FIG. 49 illustrates a CG.

FIG. 49 illustrates a CG animation in the same state as the original face image (namely, the face model and the face image used to generate the CG animation).

Figure 50:
FIG. 50 illustrates a CG.
Figure 51:
FIG. 51 illustrates a CG.
Figure 52:
FIG. 52 illustrates a CG.

FIG. 50 illustrates a CG animation with the eyelids closed, and FIG. 51 illustrates a CG animation with the mouth opened. FIG. 52 illustrates a CG animation with the face (neck) turned to left and the pupils looking leftward.

FIGS. 49 through 52 show that realistic CG animations are achieved.

The twinkling of the eyes is performed based on the detailed feature points of the eyes. The opening and closing of the mouth are performed on the detailed feature points of the mouth. The turning of the face is performed based on the detailed feature points with the face and the neck being separate.

The image processing apparatus of FIG. 2 easily generates very realistic CG animations.

A CG animation can be produced from a single frame of face image. A CG animation can be generated from a photograph of a person, who may be currently difficult to photograph, such as an actor, or a historical person. A video of that person can be produced.

A user may operate a mouse to click any point in a screen of a CG animation of the face to cause the line of sight and the neck in the CG animation of the face to look to a direction to the clicked point.

In response to the user operation of any of a plurality buttons, the expression of the face (such as the degree of opening of the eyes and the mouth, and the direction of the line of sight) can be changed or the neck (face) can be turned in the CG animation of the face.

The CG animation of the face can be moved in response to a signal of a sensor that detects the gesture of the user.

A camera photographs the face of the user to detect the movement of a feature point of the face, and the CG animation of the face can be moved in a fashion similar to the movement of the feature point of the user.

A variety of decorations and processes may be added to the CG animation of the face. For example, the CG animation of the face has any background. A cap, a crown, a tiara can be put on the CG animation. One of a necklace, earrings, piercing jewelry can be put on the CG animation. The CG animation can put on eye wear, such glasses and color contact lens. The CG animation can be face painted. The CG animation can be comically arranged with sweat, blood vessels, and symbols representing a white-faced state. A variety of hair styles are prepared beforehand, and a CG animation is produced using any of the hair styles. CG animations of insects such as a butterfly and a bee may be displayed together with the CG animation of the face. The face may keep track of the movement of the insect, and may even eat the insect.

In accordance with the above-described embodiment of the present invention, the general-purpose computer of FIG. 1 performs the modeling process to generate the face model, and then performs the animation process to generate a realistic CG animation. The modeling process and the animation process can be performed by any apparatus other than the computer.

An image pickup device picking up an image and a display displaying the image, such as a cellular phone, a digital camera, a video phone, capture the face image, perform the modeling process on the face image, perform the animation process on the face model obtained in the modeling process, and then display the CG animation obtained in the animation process.

If an apparatus having communication function, such as a video phone, performs the modeling process and the animation process, the apparatus displays a CG animation obtained in the animation process instead of an actual image of a communication partner to perform a so-called character communication.

A great deal of information can be transmitted at low cost. More specifically, when the image of an actual user is displayed in a video phone, the image of the user needs to be transmitted to a partner apparatus at relatively short intervals. In the case of the CG animation, once data of the CG animation is transmitted, transmitting only data required to move the CG animation is sufficient. Without the need for transmitting the current image of the user, the presence of the user can be recognized by the partner of the telephone. The user, freed from transmitting the current image of the user, keeps privacy particularly when the user does not want the communication partner to see the current user's own image. The CG animation is realistic enough to reflect the user's own expression therein. Persons usually quickly recognize the expression of the facial expression. The user can transmit a CG animation having a certain facial expression to the communication partner, thereby conveying information intended by the user effectively and efficiently to the communication partner. With the facial expression added to the CG animation, memorable communication is performed.

The realistic face animation described above finds applications as a call signal with animation and an idle screen with animation in the cellular phone. The cellular phone displays a CG animation at the reception of a call, triggers a song, and causes the CG animation to look like singing the song. The cellular phone transmits the face model of the face of the holder to the cellular phone of a communication partner, and generates a CG animation based on the face model and displays the CG animation on the partner's cellar phone.

The CG animation of the face can also be used in game playing. For example, in role playing game, a CG animation having the face of the user can be used as a CG of a protagonist. In action games, racing games, and fighting games, the CG animation having the face of the user is used for the CG of a character operated by the user.

In such a case, the user may feel more about the character in the game playing, and enjoy the game more.

The process of extracting the detailed feature point in the modeling process is used to control the progress of game playing and the movement of a character based on the detailed feature point. For example, the detailed feature point of the user's face can be extracted from the image of the face photographed by a camera, and the progress of game playing and the movement of the face CG animation are controlled in response to the feature point.

The process of game playing is controlled in response to the detailed feature point extracted from the face image that is obtained by photographing the user's face with a camera. In this course of game playing, the user tries to make a change in facial expression, and exercise muscles of the face, thereby gaining rich facial expression, and leading to rejuvenation of the muscles of the face.

The modeling process and the animation process (including an interaction process for moving a CG animation in response to an operational input from a button or other input device) can be provided in development middleware for developing game and other application software programs. More specifically, a program for performing the modeling process and the animation process can be supplied as an application program interface (API) for use in application development. For example, with the API, the following processes are easily performed, including the generation of the face model from the face image photographed with a camera, the generation of a CG animation from the face model, the attachment of a facial expression to the CG animation, and the control of the movement of the CG animation.

The CG animation of the face may be used as a virtual news caster in a TV news program. For example, a news program can be edited using text voice synthesizing without the need for an actual announcer voicing news.

The CG animation of the face can be used as an agent providing a variety of services in web sites, apparatuses, and applications. More specifically, a face CG animation is used as an agent working as a receptionist in a web site of a corporation. The face CG animation can serve as an agent guiding contents of web sites, an agent introducing commercial products in online shopping web sites, and an agent introducing an individual in the individual web page. The face CG animation can serve as an agent displaying and presenting functions of an apparatus having a display function. The face CG animation, installed in a computer, serves as an agent providing a help, response in an application running in the computer.

CG animations of persons (including grandfather, grandmother, grandchild, celebrity, etc.) familiar to a user may be set up as an agent. Familiar interfaces are thus established to make life enjoyable.

The face CG animation can be used as an avatar representing a character of a user in virtual space. If a chat function is available in virtual space, a CG animation as an avatar can be displayed on an apparatus of a chatting partner for conversation.

A variety of hair styles are prepared beforehand. Using any of the hair styles, a CG animation is generated and displayed. For example, a hair style expected after cutting can be checked before actually cutting hair in a beauty parlor.

By selecting CG glasses from a variety of CG glasses prepared beforehand and adding the selected CG to the face CG animation, the user can check the user's own glass wearing face before the glasses are actually worn.

When a general-purpose computer captures a face image photographed by a digital camera, and generates an CG animation from the face image, an album of CG animations can be produced. For example, templates of a variety of stories (store templates) are stored in the computer. The user's own face image or images of friends are glued onto story templates. A short file of CG animation is thus produced offhandedly. Face images of the family may be glued onto a story template to make a family drama of CG animation.

The CG animation can be synthesized with another image of animals, insects, non-living matter, etc. to produce video.

In accordance with embodiments of the present invention, the 3D model is generated from the faces of persons, and the CG animation is further generated from the 3D model. The generation of the 3D model, and the generation of the CG animation can be performed on the face of an animal, and other objects.

In accordance with embodiments of the present invention, the face model is generated from one frame of face image. The face model can be generated from a plurality of frames of image.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus for generating a three-dimensional model of a three-dimensional object from an image displaying the object in two dimensions, the image processing apparatus comprising:
    three-dimensional model generating means for generating the three-dimensional model of the object from the image; and
    extending means for extending a lateral region of the three-dimensional model, generated by the three-dimensional model generating means, in a Z direction representing a depth direction orthogonal to the two dimensions, the extending means, in response to an initial Z value having a value greater than zero and smaller than or equal to a first predefined Z value, not extending the lateral region of the three-dimensional model in the Z direction, and in response to the initial Z value having a value greater than the first predefined Z value but smaller than or equal to a second predefined Z value, extending the lateral region of the three-dimensional model in the Z direction in accordance with a non-linear function that converts initial Z values into extended Z values that are greater than the second predefined Z value but smaller than or equal to a third predefined Z value.

2. The image processing apparatus according to claim 1, wherein the three-dimensional model generating means generates the three-dimensional model from a normalized face image.

3. The image processing apparatus according to claim 1, wherein the object represents a face, and the three-dimensional model generating means generates a face model as the three-dimensional model.

4. The image processing apparatus according to claim 3, further comprising:
    mapping means for mapping a previously prepared hair model to the image;
    non-hair portion detecting means for detecting a portion of the image having no hair;
    Z value modifying means for modifying the Z value representing the position in the depth direction of a region mapped to the non-hair portion of the hair model mapped to the image; and
    synthesizing means for synthesizing the hair model having the modified Z value with the face model.

5. The image processing apparatus according to claim 4, further comprising filter means for low-pass filtering the Z value of the hair model having the modified Z value.

6. The image processing apparatus according to claim 4, wherein the Z value modifying means modifies the Z value so that a region of the hair model mapped to the non-hair portion is located behind the face model if the hair model and the face model are synthesized with each other.

7. The image processing apparatus according to claim 3, further comprising:
    first fitting means for fitting a position and a size of a template of a predetermined region of the face to the face displayed in the image; and
    second fitting means for fitting a shape of the template to the face displayed in the image by changing the shape of the template within a range of shapes of the predetermined region, with a plurality of parameters defining the shape of the template being modified based on at least one parameter of a number smaller than the number of the plurality of parameters, wherein the three-dimensional model generating means generates the face model based on a feature point of the face obtained from the template having the position, the size, and the shape thereof fitted to the face displayed in the image.

8. An image processing method of generating a three-dimensional model of a three-dimensional object from an image displaying the object in two dimensions, the image processing method comprising:
using a processor to execute the following:
generating the three-dimensional model of the object from the image, and
extending a lateral region of the generated three-dimensional model in a Z direction representing a depth direction orthogonal to the two dimensions, the extending step including, in response to an initial Z value having a value greater than zero and smaller than or equal to a first predefined Z value, not extending the lateral region of the three-dimensional model in the Z direction, and in response to the initial Z value having a value greater than the first predefined Z value but smaller than or equal to a second predefined Z value, extending the lateral region of the three-dimensional model in the Z direction in accordance with a non-linear function that converts initial Z values into extended Z values that are greater than the second predefined Z value but smaller than or equal to a third predefined Z value.

9. A recording medium recorded with a computer program for causing a computer to execute a method of generating a three-dimensional model of a three-dimensional object from an image displaying the object in two dimensions, the method comprising:
generating the three-dimensional model of the object from the image; and
extending a lateral region of the generated three-dimensional model in a Z direction representing a depth direction orthogonal to the two dimensions, the extending step including, in response to an initial Z value having a value greater than zero and smaller than or equal to a first predefined Z value, not extending the lateral region of the three-dimensional model in the Z direction, and in response to the initial Z value having a value greater than the first predefined Z value but smaller than or equal to a second predefined Z value, extending the lateral region of the three-dimensional model in the Z direction in accordance with a non-linear function that converts initial Z values into extended Z values that are greater than the second predefined Z value but smaller than or equal to a third predefined Z value.

10. An image processing apparatus for generating a three-dimensional model from a normalized face image displaying the face in two dimensions, the image processing apparatus comprising:
three-dimensional model generating means for generating a three-dimensional face model from the normalized face image using at least a standard face model;
mapping means for mapping a previously prepared standard hair model to the normalized face image to generate a mapped hair model;
non-hair portion detecting means for detecting a portion of the normalized face image having no hair;
Z value modifying means for modifying a Z value representing the position, in a Z direction that is a depth direction orthogonal to the two dimensions, of the mapped hair model, the Z value modifying means, in response to an initial Z value having a value greater than zero and smaller than or equal to a first predefined Z value, not modifying the Z value representing the position, and in response to the initial Z value having a value greater than the first predefined Z value but smaller than or equal to a second predefined Z value, modifying the Z value representing the position in accordance with a non-linear function that converts the initial Z value into an extended Z value that is greater than the second predefined Z value but smaller than or equal to a third predefined Z value; and
synthesizing means for synthesizing the mapped hair model having the modified Z value with the three-dimensional face model.

11. The image processing apparatus according to claim 10, further comprising filter means for low-pass filtering the Z value of the mapped hair model having the modified Z value.

12. The image processing apparatus according to claim 10, wherein the Z value modifying means modifies the Z value so that a region of the hair model mapped to the non-hair portion is located behind the three-dimensional model if the hair model and the three-dimensional face model are synthesized with each other.

13. An image processing method of generating a three-dimensional model from a normalized face image displaying the face in two dimensions, the image processing method comprising:
using a processor to execute the following:
generating a three-dimensional face model from the normalized face image using at least a standard face model,
mapping a previously prepared standard hair model to the normalized face image to generate a mapped hair model,
detecting a portion of the normalized face image having no hair,
modifying a Z value representing the position, in a Z direction that is a depth direction orthogonal to the two dimensions, of the mapped hair model, the Z value modifying step, in response to an initial Z value having a value greater than zero and smaller than or equal to a first predefined Z value, not modifying the Z value representing the position, and in response to the initial Z value having a value greater than the first predefined Z value but smaller than or equal to a second predefined Z value, modifying the Z value representing the position in accordance with a non-linear function that converts the initial Z value into an extended Z value that is greater than the second predefined Z value but smaller than or equal to a third predefined Z value, and
synthesizing the mapped hair model having the modified Z value with the three-dimensional face model.

14. A recording medium recorded with a computer program for causing a computer to execute a method of generating a three-dimensional model from a normalized face image displaying the face in two dimensions, the method comprising:
generating a three-dimensional face model from the normalized face image using at least a standard face model;
mapping a previously prepared standard hair model to the normalized face image to generate a mapped hair model;
detecting a portion of the normalized face image having no hair;
modifying a Z value representing the position, in a Z direction that is a depth direction orthogonal to the two dimensions, of the mapped hair model, the Z value modifying step, in response to an initial Z value having a value greater than zero and smaller than or equal to a first predefined Z value, not modifying the Z value representing the position, and in response to the initial Z value having a value greater than the first predefined Z value but smaller than or equal to a second predefined Z value, modifying the Z value representing the position in accordance with a non-linear function that converts the initial Z value into an extended Z value that is greater than the second predefined Z value but smaller than or equal to a third predefined Z value, and synthesizing the mapped hair model having the modified Z value with the three-dimensional face model.

15. An image processing apparatus for determining a feature point of a three-dimensional face from an image displaying the face in two dimensions, the image processing apparatus comprising:

pre-processing means for pre-processing a face image to obtain a normalized face image, including detecting edge pixels by comparing RGB squared errors of pixels of interest with a predetermined threshold value;

standard feature point extracting means for extracting one or more standard feature points in the normalized face image;

first fitting means for fitting a position and a size of a template of a predetermined region of the face to the normalized face image;

second fitting means for fitting a shape of the template to the normalized face image and for determining one or more detailed feature points of the predetermined region of the face from the template having the position and the size fitted to the normalized face image by changing the shape of the template within a range of shapes of the predetermined region, with a plurality of parameters defining the shape of the template being based on at least one parameter of a number smaller than the number of the plurality of parameters; and third fitting means for fitting a standard face model having a 3D shape of a standard face to the normalized face image based on the one or more detailed feature points.

16. The image processing apparatus according to claim 15, wherein the first and second fitting means fit the template to the face displayed in a frame of the image.

17. The image processing apparatus according to claim 15, wherein the predetermined region comprises an eye including an eyeball, an eye socket, and eyelids, and the feature point comprises a point along an outline of the eyeball exposed through the eyelids and a point along a border between the eye socket and the eyelids.

18. An image processing method of determining a feature point of a three-dimensional face from an image displaying the face in two dimensions, the image processing method comprising:

using a processor to execute the following:

pre-processing a face image to obtain a normalized face image, including detecting edge pixels by comparing RGB squared errors of pixels of interest with a predetermined threshold value, extracting one or more standard feature points in the normalized face image, fitting a position and a size of a template of a predetermined region of the face to the normalized face image, fitting a shape of the template to the normalized face image and determining one or more detailed feature points of the predetermined region of the face from the template having the position and the size fitted to the normalized face image by changing the shape of the template within a range of shapes of the predetermined region, with a plurality of parameters defining the shape of the template being modified based on at least one parameter of a number smaller than the number of the plurality of parameters, and fitting a standard face model having a 3D shape of a standard face to the normalized face image based on the one or more detailed feature points.

19. A recording medium recorded with a computer program for causing a computer to execute a method of determining a feature point of a three-dimensional face from an image displaying the face in two dimensions, the method comprising:

pre-processing a face image to obtain a normalized face image, including detecting edge pixels by comparing RGB squared errors of pixels of interest with a predetermined threshold value;

extracting one or more standard feature points in the normalized face image;

fitting a position and a size of a template of a predetermined region of the face to the normalized face image;

fitting a shape of the template to the normalized face image and determining one or more detailed feature points of the predetermined region of the face from the template having the position and the size fitted to the normalized face image by changing the shape of the template within a range of shapes of the predetermined region, with a plurality of parameters defining the shape of the template being modified based on at least one parameter of a number smaller than the number of the plurality of parameters; and fitting a standard face model having a 3D shape of a standard face to the normalized face image based on the one or more detailed feature points.

20. An image processing apparatus for generating a three-dimensional model of a three-dimensional object from an image displaying the object in two dimensions, the image processing apparatus comprising:

a three-dimensional model generator operable to generate the three-dimensional model of the object from the image; and an extender operable to extend a lateral region of the three-dimensional model, generated by the three-dimensional model generator, in a Z direction representing a depth direction orthogonal to the two dimensions, the extender, in response to an initial Z value having a value greater than zero and smaller than or equal to a first predefined Z value, not extending the lateral region of the three-dimensional model in the Z direction, and in response to the initial Z value having a value greater than the first predefined Z value but smaller than or equal to a second predefined Z value, extending the lateral region of the three-dimensional model in the Z direction in accordance with a non-linear function that converts initial Z values into extended Z values that are greater than the second predefined Z value but smaller than or equal to a third predefined Z value.

21. An image processing apparatus for generating a three-dimensional model from a normalized face image displaying the face in two dimensions, the image processing apparatus comprising:

a three-dimensional model generator operable to generate a three-dimensional face model from the normalized face image using at least a standard face model;

a mapping unit operable to map a previously prepared standard hair model to the normalized face image to generate a mapped hair model;

a non-hair portion detecting unit operable to detect a portion of the normalized face image having no hai;

a Z value modifying unit operable to modify a Z value representing the position, in a Z direction that is a depth direction orthogonal to the two dimensions, of the mapped hair model, the Z value modifying unit, in response to an initial Z value having a value greater than zero and smaller than or equal to a first predefined Z value, not modifying the Z value representing the position, and in response to the initial Z value having a value greater than the first predefined Z value but smaller than or equal to a second predefined Z value, modifying the Z value representing the position in accordance with a non-linear function that converts the initial Z value into an extended Z value that is greater than the second predefined Z value but smaller than or equal to a third predefined Z value; and a synthesizing unit operable to synthesize the mapped hair model having the modified Z value with the three-dimensional face model.

* * * * *